US012284243B2

(12) United States Patent
Sharma et al.

(10) Patent No.: US 12,284,243 B2
(45) Date of Patent: Apr. 22, 2025

(54) MULTI-DEVICE GAZE TRACKING

(71) Applicant: Microsoft Technology Licensing, LLC, Redmond, WA (US)

(72) Inventors: Jatin Sharma, Sammamish, WA (US); Kenneth P. Hinckley, Kirkland, WA (US); Jay C. Beavers, Duvall, WA (US); Michel Pahud, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/701,633

(22) Filed: Mar. 22, 2022

(65) Prior Publication Data

US 2023/0308505 A1    Sep. 28, 2023

(51) Int. Cl.
*G06F 3/01* (2006.01)
*H04L 67/1008* (2022.01)
*H04L 67/50* (2022.01)

(52) U.S. Cl.
CPC .......... *H04L 67/1008* (2013.01); *G06F 3/013* (2013.01); *G06F 3/017* (2013.01); *H04L 67/535* (2022.05)

(58) Field of Classification Search
CPC ....... G06F 3/013; G06F 3/017; H04L 67/535; H04L 67/1008
See application file for complete search history.

(56) References Cited

U.S. PATENT DOCUMENTS

| | | | |
|---|---|---|---|
| 9,122,537 B2* | 9/2015 | Patel | G06F 9/5088 |
| 10,063,560 B2* | 8/2018 | Gordon | H04L 63/102 |
| 10,546,509 B2* | 1/2020 | Dey | G09B 5/12 |
| 10,732,826 B2* | 8/2020 | Klein | G06F 3/011 |
| 2015/0346814 A1* | 12/2015 | Thukral | H04N 7/18 345/156 |
| 2018/0081431 A1* | 3/2018 | Dow | G06F 3/012 |
| 2019/0086999 A1* | 3/2019 | Ricknäs | G06F 3/017 |
| 2020/0089855 A1* | 3/2020 | Chou | H04L 9/32 |

(Continued)

FOREIGN PATENT DOCUMENTS

WO    2020141344 A2    7/2020

OTHER PUBLICATIONS

"Invitation to Pay Additional Fees Issued in PCT Application No. PCT/US23/012876", Mailed Date: May 4, 2023, 11 Pages.

(Continued)

*Primary Examiner* — Amare Mengistu
*Assistant Examiner* — Jennifer L Zubajlo

(57) ABSTRACT

Aspects of the present disclosure relate to multi-user, multi-device gaze tracking. In examples, a system includes at least one processor, and memory storing instructions that, when executed by the at least one processor, causes the system to perform a set of operations. The set of operations include identifying a plurality of computing devices, and identifying one or more users. The set of operations may further include receiving gaze input data and load data, from two or more of the plurality of computing devices. The set of operations may further include performing load balancing between the plurality of devices, wherein the load balancing comprises assigning one or more tasks from a first of the plurality of computing devices to a second of the plurality of computing devices based upon the gaze input data.

20 Claims, 45 Drawing Sheets

(56) References Cited

U.S. PATENT DOCUMENTS

| | | | | |
|---|---|---|---|---|
| 2020/0371673 | A1* | 11/2020 | Faulkner | G06F 3/017 |
| 2021/0004081 | A1* | 1/2021 | Sugihara | G06F 3/013 |
| 2021/0124168 | A1* | 4/2021 | Xiao | G06F 3/013 |
| 2021/0174589 | A1* | 6/2021 | Emery | G06F 3/04815 |
| 2021/0209633 | A1* | 7/2021 | Podgorny | G06V 40/174 |
| 2021/0350550 | A1* | 11/2021 | Stengel | G06V 40/19 |
| 2022/0191515 | A1* | 6/2022 | Walters | H04N 19/85 |

OTHER PUBLICATIONS

"International Search Report and Written Opinion Issued in PCT Application No. PCT/US23/012876", Mailed Date: Jun. 26, 2023, 18 Pages.

* cited by examiner

MULTI-DEVICE GAZE TRACKING

BACKGROUND

Computing devices may include optical sensors (e.g., cameras, RGB sensors, infrared sensors, LIDAR sensors), acoustic sensors (e.g., ultrasonic), or other sensors (e.g., radar sensors, optical flow sensors, motion sensors), that can monitor a user's gaze. Further, computing devices may have limited capacity for completing certain tasks, thereby leading to decreased productivity, and increased frustration, among other detriments.

It is with respect to these and other general considerations that aspects of the present disclosure have been described. Also, although relatively specific problems have been discussed, it should be understood that the embodiments should not be limited to solving the specific problems identified in the background.

SUMMARY

Aspects of the present disclosure relate to systems, methods, and media for processing gaze input data to adapt behavior of one or more computing devices. Further aspects of the present disclosure relate to systems, methods, and media for processing load data to assign tasks across a plurality of computing devices, based on gaze input data corresponding to one or more users.

In some aspects of the present disclosure a system is provided. The system includes at least one processor; and memory storing instructions that, when executed by at least one processor, causes the system to perform a set of operations. The set of operations include identifying a plurality of computing devices, and identifying one or more users. The set of operations may further include receiving gaze input data and load data, from two or more of the plurality of computing devices. The set of operations may further include performing load balancing between the plurality of devices, wherein the load balancing comprises assigning one or more tasks from a first of the plurality of computing devices to a second of the plurality of computing devices based upon the gaze input data.

In some aspects of the present disclosure a system is provided. The system includes at least one processor, and memory storing instructions that, when executed by at least one processor, causes the system to perform a set of operations. The set of operations include identifying two or more computing devices, and identifying two or more users. The set of operations may further include receiving gaze input data, corresponding to the one or more users, from the two or more computing devices. The set of operations may further include determining, based on the gaze input data, an action associated with the particular computing device. The set of operations may still further include adapting the two or more computing devices, based on the determined action.

In some aspects of the present disclosure a method for processing gaze input data to control a computing device is provided. The method includes identifying one or more computing devices, and identifying one or more users. The method may further include displaying one or more elements on the one or more computing devices. The method may further include receiving gaze input data from one or more users, corresponding to the one or more users, from the one or more computing device. The method may further include identifying metadata corresponding to the one or more elements, based on the gaze input data. The method may further include adapting the one or more computing devices to alter their display, based on the metadata.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following FIGS.

DETAILED DESCRIPTION

Figure 1:
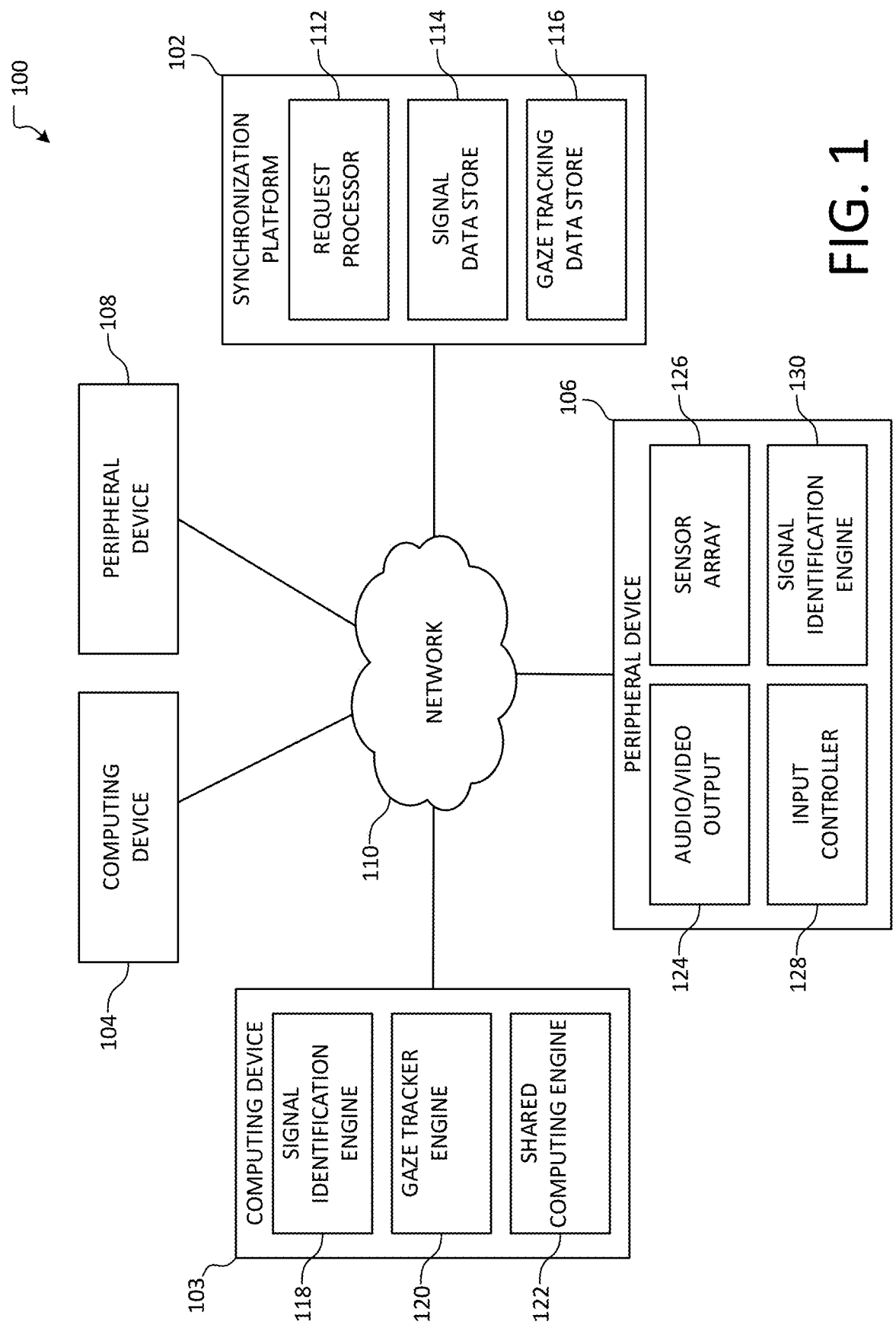
FIG. 1 illustrates an overview of an example system for multi-device gaze tracking according to aspects described herein.

In the following Detailed Description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, computing devices may include optical sensors, such as cameras, that can monitor a user's gaze. Further, computing devices may have limited capacity for completing certain tasks, thereby leading to decreased productivity, and increased frustration, among other detriments.

Generally, conventional computing devices receive input from users by way of a plurality of input devices. Conventional input devices may include a mouse, camera, joystick, keyboard, trackpad, or microphone. For example, a plurality of users may be sitting around a desk on which a computer is located. A first of the plurality of users may have control over a mouse that is coupled to the computer. The first of the plurality of users may use the mouse to navigate to an application on the computer. However, if a second of the plurality of users desires to navigate to a different application, then they will have to take control of the mouse, from the first of the plurality of users, to navigate to the different application. When different users are working on the same computing devices, sharing input devices to control the computing devices can be inefficient, frustrating, and interfere with users' ability to provide a constant stream of feedback to the computing devices.

In other examples, a plurality of users may be standing in front of a computer screen, during a presentation. Conventional presentation methods, such as, for example, marketing presentations may require market research or focus groups to gain feedback regarding how users viewed the presentation. Such feedback may be inaccurate, such research may be expensive to gather, and such feedback may be imprecise regarding specific aspects of the presentation. Accordingly, and as discussed herein, it may be useful to gather metadata regarding where the plurality of users are looking, such that the presentation can be updated to increase engagement from the plurality of users.

In other examples, a user may be sitting at a desk on which a computer is located. The user may have one hand on a mouse that is coupled to the computer, and another hand that is on the keyboard of the computer. When performing tasks on the computer, the user may be required move both hands to the keyboard (e.g., to type in a document). Alternatively, the user may have to remove one hand from the keyboard, wiggle their mouse to visually locate a cursor on the display screen of the computer, and then navigate to an application or element displayed on the computer. Such conventional examples are inefficient, frustrating, and interfere with a user's ability to provide a constant stream of feedback to a computing device.

In other examples, a user may have one hand on a keyboard, and a second hand holding a writing utensil, food, or a beverage, etc. Therefore, to navigate to another application that is shown on the display screen, or to select an element shown on the display screen, the user may have to put down their writing utensil, food, or beverage to operate an input device (e.g., a mouse) using their second hand. After successfully navigating to the other application, or selecting the element, the user may then remove their hand from the input device (e.g., the mouse), and pick back up their writing utensil, food, or beverage. Again, such conventional examples are inefficient, frustrating, and interfere with a user's ability to provide a constant stream of feedback to a computing device.

The inefficiencies and frustrations discussed above may be further compounded when a plurality of users are working across multiple devices. For example, if the plurality of users are sitting at a desk that includes both a desktop computer, and a laptop disposed thereon, then both the desktop computer, and the laptop may include their own input devices. Therefore, if one of the plurality of users is working on a desktop computer, and desires to navigate to an application on their laptop, they will have to remove one or both hands from their desktop computer and operate an input device (e.g., a mouse, keyboard, or trackpad) of their laptop to navigate to the desired application. Then, to navigate to an application on their desktop computer, they will have to remove one or both hands from their laptop and operate an input device (e.g., a mouse, keyboard, or trackpad) of their desktop computer to navigate to the desired application. At the same time, a second of the plurality of users may be physically crossing arms and hands over the first of the plurality of users in an effort to navigate to a different application than that toward which the first of the plurality of users desires to navigate. Therefore, the inefficiencies and frustrations discussed above with respect to a single computing device may be compounded when working across multiple computing devices.

Still referring to conventional examples of users working across multiple devices, computing resources may be inefficiently allocated. For example, if a user is running a video game with high definition graphics on a first computing device (e.g., their laptop), and has a number of background applications running (e.g., email, Internet browsers, video streams, or other applications), then a user may experience a decrease in quality of the video game due to inadequate capacity in a processor or memory of the first computing device that is running the video game with high definition graphics. Such an experience can be frustrating, particularly if there are a plurality of other computing devices (e.g., a second computing device, and/or third computing device) in proximity to, or in communication with the first computing device that have adequate capacity in their processors or memory to offset some of the load being handled by the first computing device, particular the load of the background processes (e.g., the abovementioned email application, Internet browsers, or video streams).

Aspects of the present disclosure may be beneficial to resolve some of the abovementioned deficiencies, frustrations, and inefficiencies. Further aspects of the present disclosure may provide additional advantages and benefits that will become apparent in light of the below discussion.

For example, aspects of the present disclosure may generally include one or more computing devices that are configured to interface with one or more users. The computing devices may interface with the one or more users via optical devices (e.g., cameras) that receive visual data or gaze data. The visual data may be used to track the one or more user's gazes. The one or more computing devices may include a gaze tracker component or engine that monitors the one or more user's gazes with respect to the display screens of the one or more computing devices.

The gaze tracker component may further determine one or more actions to be performed across the one or more computing devices, based on the gaze data corresponding to the one or more users. In this respect, users may be able to navigate to applications, open applications, select elements that are displayed on a computing device, or perform any other tasks, based on where they are looking, relative to a display screen of a computing device. Such capabilities provide a streamlined user-interface with a computing device that improves efficiency and productivity.

The computing devices may further include a shared computing component, such as a shared memory space, that monitors load capacity (e.g., processor availability, or memory availability) across a plurality of computing devices to allocate tasks across the computing devices. The shared computing component may prioritize tasks that are determined to be of interest, based on gaze data, corresponding to one or more users, which is received, or generated, by the gaze tracker component. The shared computing component may further de-prioritize tasks that are determined not to be of interest (e.g., immediate interest), based on gaze data, corresponding to one or more users, that is received, or generated, by the gaze tracker component.

Generally, the shared computing component seeks to optimize load capability across computing devices, by reducing non-essential tasks on a primary computing device (e.g., the computing device at which one or more users are found to be looking), and offloading the non-essential tasks to other computing devices. For example, in the scenario discussed above, wherein a user is frustrated at the poor quality of their video game with high definition graphics, a shared computing component according to examples disclosed herein may offload background processes being completed for the email application, Internet browsers, and/or video streams onto other computing devices that are in communication with the first computing device, thereby freeing up resources for execution of the video game on the device which is currently the focus of the user. In this respect, the shared computing component may allocate tasks across a plurality of computing devices based on available load capacity (e.g., processor availability, or memory availability) of the computing devices.

FIG. 1 illustrates an overview of an example system 100 for multi-device gaze tracking according to aspects described herein. As illustrated, system 100 includes synchronization platform 102, computing device 103, computing device 104, peripheral device 106, peripheral device 108, and network 110. As illustrated, synchronization platform 102, computing device 103, computing device 104, peripheral device 106, and peripheral device 108 communicate via network 110, which may comprise a local area network, a wireless network, or the Internet, or any combination thereof, among other examples.

While system 100 is illustrated in an example where computing devices 103 and 104 may communicate with peripheral devices 106 and 108 via network 110, it will be appreciated that, in other examples, peripheral device 106 and/or 108 may be directly connected to a computing device, for example using a wired (e.g., universal serial bus (USB) or other electrical connection) and/or wireless (e.g., Bluetooth Low Energy (BTLE) or Wi-Fi Direct) connection, or the like. Devices 103-108 may each be any of a variety of devices, including, but not limited to, a mobile computing device, a tablet computing device, a laptop computing device, a desktop computing device, an IoT ("Internet of Things") device, a smart computing device, or a server computing device, among other examples. For example, computing device 103 may be a mobile computing device, peripheral device 106 may be a VR computing device, computing device 104 may be a desktop computing device, and peripheral device 108 may be a tablet device, among other examples. One or more of the devices 103, 104, 108 may include, or be coupled to, gaze tracking hardware, such as optical sensors (e.g., cameras, RGB sensors, infrared sensors, LIDAR sensors), acoustic sensors (e.g., ultrasonic), or other sensors (e.g., radar sensors, optical flow sensors, motion sensors) that may be used to perform gaze tracking of one or more users.

Synchronization platform 102 comprises request processor 112, signal data store 114, and gaze tracking data store 116. In examples, synchronization platform 102 synchronizes a set of gaze tracking data among a set of devices (e.g., computing device 103, computing device 104, peripheral device 106, and/or peripheral device 108). Accordingly, request processor 112 may receive requests from devices 103-108 for synchronization data, including, but not limited to, the set of gaze tracking data, training data associated with identified user signals and associated actions to be performed by one or more computing devices, and/or environmental context information (e.g., software applications currently being run, or hardware currently attached), among other examples. Such data may be stored by signal data store 114 and gaze tracking data store 116. In examples, synchronization may be performed by one or more of devices 103-108 as an alternative to or in addition to using centralized synchronization (e.g., as may be provided by synchronization platform 102).

Computing device 103 is illustrated as comprising signal identification component or engine 118, gaze tracker component or engine 120, and shared computing component or engine 122. In examples, signal identification component 118 processes gaze tracking data (e.g., visual data) to generate a set of signals according to aspects described herein. For example, signal identification component 118 may process gaze tracking data obtained from sensors (e.g., cameras), software, or any of a variety of other sources of computing device 103, computing device 104, peripheral device 106, and/or peripheral device 108. In some examples, at least a part of the obtained data may have already been processed on the device from which it was received, for example by signal identification component 130 of peripheral device 106. Signal identification component 118 may process the gaze tracking data according to any of a variety of techniques, including, but not limited to, using a set of rules, a machine learning model, according to computer vision techniques, and/or mechanisms disclosed herein. The generated set of user signals may be processed by gaze tracker component 120 and/or shared computing component 122, as discussed below.

Gaze tracker component 120 may obtain, receive, update, or otherwise determine gaze tracking data of one or more users, from an environment in which computing device 103 is located. For example, the environment may be a room, a building, or a geographic region having a given radius or other area, among other examples. For instance, one or more of devices 103-108 may be located within the environment for which the gaze tracking data is determined. Similar to signal identification component 118, gaze tracking component 120 may generate gaze tracking data based at least in part on data received from one or more devices 104-108. For example, the gaze tracking component 120 may receive visual data corresponding to one or more users from a camera on the one or more devices 104-108. In some instances, at least a part of the data processed by signal identification component 118 may be processed by gaze tracking component 120 (or vice versa, in other examples).

According to some examples, the gaze tracker component 120 may obtain, receive, update, or otherwise determine gaze tracking data of a plurality of users, from an environment in which a plurality of computing devices 103-108 are located. The plurality of users may be identified by the plurality of computing devices (e.g., devices 103-108). Gaze tracking component 120 may receive visual data corresponding to each of the plurality of users, from sensors (e.g., cameras) located on the plurality of computing devices. In this respect, systems disclosed herein may identify a plurality of computing devices, identify a plurality of users, receive gaze data associated with each of the plurality of users, from the plurality of computing devices, determine an action based on the gaze data corresponding to the plurality of users, and/or adapt behavior of the plurality of computing devices based on the determined action.

Shared computing component 122 processes a set of signal (e.g., as was generated by signal identification component 118, or as may be received from devices 104-108) to facilitate pooling of computing resources, from, for example, computing device 103, computing device 104, peripheral device 106, and/or peripheral device 108. Shared computing component 122 further balances computational load and may pass information (e.g., transient, state, and key value pairs of information) across devices (e.g., devices 103, 104, 106, and 108) to facilitate processing and/or execution of various tasks.

Shared computing component 122 may pass transient information across devices, such as information that is synchronized, but not stored. For example, transient information may be information indicative of mouse movements, mouse clicks, keyboard clicks, touch locations on a touch screen, etc. Generally, transient information is used relatively instantaneously by subroutines of software applications that perform certain processes. The transient information may get stale immediately after it is used by such subroutines, and therefore does not need to be stored. For example, if a user moves their mouse over a file to highlight the file, and then moves their mouse off of the file to un-highlight the file, then the mouse movement was used to perform a subroutine that either highlighted or un-highlighted the file, but the mouse movement did not need to be stored for further processing. Other examples of transient information may include copy and paste commands, cut and paste commands, select commands, scroll commands, and other similar input commands that do not need to be stored for further processing after corresponding subroutines are completed.

Shared computing component 122 may pass state information across devices. The state information may be information that is immediately synchronized and that is stored short-term. State information indicates information that describes a state of an overall system (e.g., system 100), and maintains consistency. The state information may be updated and/or overridden as the system is used over time. For example, state information may include an ID of a computing device that is being focused on, a selected color, a brush size, an active/disabled component, etc. For example, if a computing device is not a primary computing device (i.e., not a device currently being gazed at, or focused on), and has its display brightness turned all of the way up, then the shared computing component 122 may dim the display brightness of the computing device, and assign another task to the computing device. As another example, shared computing component 122 may store the state of specific documents or applications in memory. Shared computing component 122 monitor which application is currently selected (e.g., in focus, or being gazed at). A user may select a first application on a first computing device, thereby changing the state of the first application to a first ("IN FOCUS") state. If a user were to gaze at a second application on a second computing device, then the shared computing component 122 would already have stored in memory that the first application on the first computing device is currently in the first (e.g., "IN FOCUS") state. Therefore, the shared computing component 122, through interaction with the gaze tracker component 120, may change the first application to a second (e.g., "NOT IN FOCUS") state, and change the second application to the first (e.g., "IN FOCUS") state.

Shared computing component 122 may pass key value pairs of information across devices. Key value information may be synchronized and stored long term. Further, key value pairs of information can indicate information that can be searched or looked up by a search key or search string or key. Examples of information that can be synchronized using key value pairs may be text, numerical values, images, messages, files, etc. Relevant key value pairs of information can be retrieved from a first computing device and used by a second computing device and/or peripheral device. In some examples, the key value pairs of information may be relatively large in size (e.g., data size in memory) and may not need to be synchronized immediately, but rather stored until it is requested for use. For example, a user may provide an image input to a first computing device. The image input may be stored in memory and accessed via the shared computing component 122. A user may select or retrieve the image, via their gaze, and transfer the image to a second computing device.

While examples are provided in which computing tasks are assigned to specific devices based on computing load, it will be appreciated that a variety of additional or alternative techniques may be used. For example, a set of rules, heuristics, and/or machine learning may be used. In some instances, a task may have an associated default action, which may be modified or removed based on interaction data. Similarly, new tasks may be generated, for example as a result of identifying a set of gaze tracking data that are associated with a user requesting that one or more actions be performed by a computing device.

As noted above, a software application may utilize a framework (e.g., as may be provided by an operating system of computing device 103) to associate software application functionality with determined gaze tracking data from a user. For example, the software application may register a function or other functionality of the application with the framework, such that when it is determined to perform an action associated with the gaze tracking data, the registered functionality of the software application is invoked (e.g., as a result of determining that the software application is the active application of the computing device or that the software application is the intended target of the gaze tracking data).

Peripheral device 106 is illustrated as comprising audio/video output 124, sensor array 126, input controller 128, and signal identification component 130. In examples, audio/video output 124 includes one or more speakers and/or displays. Accordingly, data may be received from computing device 103 and used to provide auditory and/or visual output to a user via audio/video output 124. Sensor array 126 includes one or more sensors as described herein and may generate gaze tracking data (e.g., as may be processed by a signal identification component, such as signal identification component 118 and/or signal identification component 130). In examples, signal identification component 130 processes at least a part of the gaze tracking data from sensor array 126 (and/or software executing on peripheral device 106) to generate a set of user signals, such that the gaze tracking data itself need not leave peripheral device 106. In aspects, the set of user signals may include gaze tracking data for multiple users. Alternatively, each individual user, in a multi-user environment, may be associated with a set of user signals. Such aspects may improve user privacy and reduce bandwidth utilization by reducing or eliminating the amount of gaze tracking data that is transmitted by peripheral device 106. As another example, such processing may be performed by a computing device (e.g., computing device 103) to reduce resource utilization by peripheral device 106. Input controller 128 may provide an indication of the interaction data and/or generated set of user signals to a computing device, such as computing device 103.

In some instances, peripheral device 106 may include a shared computing component, aspects of which were discussed above with respect to shared computing component 122 of computing device 103. Thus, it will be appreciated that user signals may be used to determine actions associated with a user's gaze at any of a variety of devices. Further, such processing need not be limited to data generated or otherwise obtained by the computing device at which the processing is performed. For example, a shared computing component of peripheral device 106 may use gaze tracking data from sensor array 126 and/or one or more of devices 103, 104, and/or 106, as well as computational load data generated by peripheral device 106 or another device to assign tasks to the devices 104-108. Aspects of computing device 104 and peripheral device 108 are similar to computing device 103 and peripheral device 106, respectively, and are therefore not necessarily re-described below in detail.

Generally, the shared computing component 122 may assign tasks across computing devices to balance load (e.g., processor use, memory use, storage use, network use, and/or general resource requirements, etc.) across the computing devices. Additionally, or alternatively, the shared computing component 122 may assign tasks across computing devices to reduce load (e.g., increase processing resources, memory resources, etc.) on a primary computing device. In this respect, the shared computing component 122 may reduce assignment of non-essential tasks to a primary computing device, and offload the non-essential tasks to other computing devices. Specifically, the shared computing component 122 may receive gaze tracking data from, for example, gaze tracker component 120, and/or gaze tracking data store 116. The shared computing component 122 may determine which of a plurality of computing devices is a primary computing device, based on the gaze tracking data (e.g., by identifying at which of a plurality of computing devices, one or more users are looking). Further, the gaze tracking data may be used to determine which tasks are essential (e.g., an application that is the focus of the one or more user's gaze).

Similarly, the shared computing component 122 may assign tasks across computing devices to increase load (e.g., decrease processing resources, memory resources, etc.) on secondary computing devices (e.g., computing devices that are found to not be the attention of users' gaze). In this respect, the shared computing component 122 may increase assignment of tasks to the secondary computing device, thereby offloading tasks from a primary computing device (e.g., a computing device that is found to be the attention of user's gaze). Specifically, the shared computing component 122 may receive gaze tracking data from, for example, gaze tracker component 120, and/or gaze tracking data store 116. The shared computing component 122 may determine which of a plurality of computing devices are secondary computing devices, based on the gaze tracking data (e.g., by identifying at which of a plurality of computing devices, one or more users are not looking). Further, the gaze tracking data may be used to determine which tasks are not essential (e.g., an application that is not the focus of the one or more user's gaze).

Additionally, or alternatively, the shared computing component 122 may assign tasks across computing devices based on the type of computing device. For example, the shared computing component 122 can reassign a task from a low compute device (e.g., a smartphone, or a smartwatch) to a high compute device (e.g., a GPU enabled laptop, or desktop computer). In this regard, the shared computing component 122 may reference the processing capabilities of each of the plurality of computing device as a factor in determining to which computing device a task will be assigned.

Figure 2:
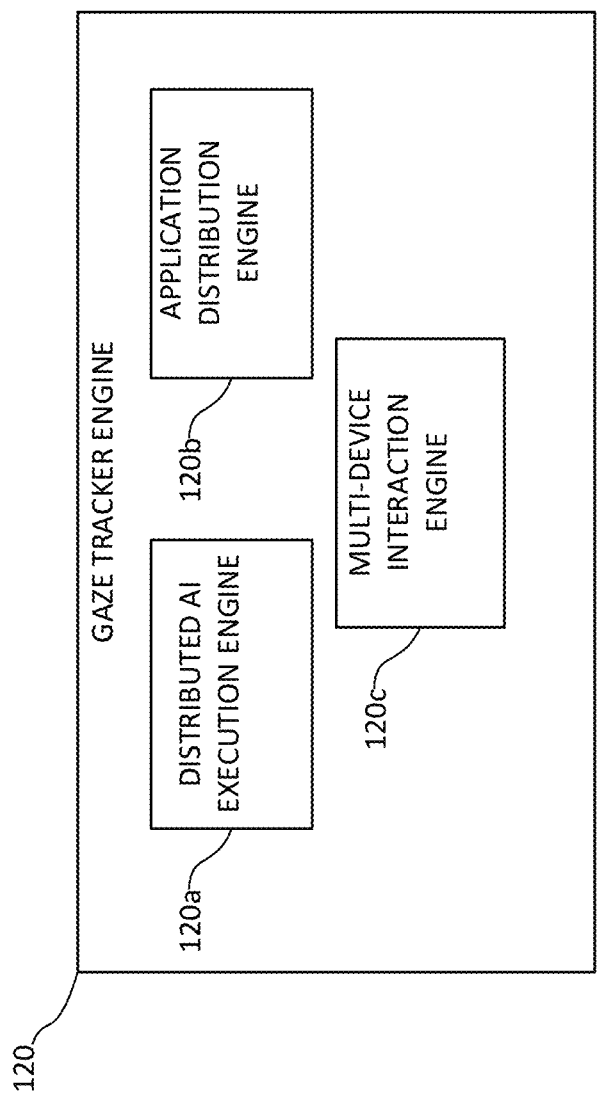
FIG. 2 illustrates a detailed schematic view of the gaze tracker engine of FIG. 1.

FIG. 2 illustrates a detailed schematic view of the gaze tracker component 120 of FIG. 1. As shown in FIG. 2, the gaze tracker component 120 includes a distributed AI (artificial intelligence) execution component or engine 120a, an application distribution component or engine 120b, and a multi-device interaction component or engine 120c.

Generally, distributed AI refers to an approach to solving complex learning, planning and decision making problems by distributing the problems to autonomous processed node (e.g., functional agents) and/or via the use of machine learning models. The distributed AI execution component 120a may be in communication with the shared computing component 122 to coordinate execution of tasks across heterogeneous devices (e.g., devices 103-108). The term "heterogeneous devices," as used herein, refers to devices that may have diverse make, model, operating system, or location. The heterogeneous devices may interact to share each other's computing resources. Examples disclosed herein may use machine learning algorithms to determine how applications are to be executed across heterogeneous devices. Such determinations may be made within the AI execution component 120a.

The application distribution component 120b may handle migration of one or more applications between a plurality of computing devices. For example, a first computing device may be running a word processing application. A user may desire to migrate the word processing application from the first computing device to a second computing device. Using gaze input and corresponding commands disclosed herein, the system may migrate the word processing application from the primary computing device to the secondary computing device based upon the current, or recent, gaze data. Such an operation may be executed by, or within, the application distribution component 120b.

Additionally, or alternatively, the application distribution component 120b may handle distribution of one or more applications across a plurality of computing devices. For example, a user may desire to display a presentation across multiple devices. Such an operation may be executed by the application distribution component 120b. Specifically, the application distribution component may receive gaze input data indicating that a plurality of users are gazing at a plurality of computing devices. Therefore, the application distribution component 120b may display an application that is desired to be viewed by the users, across each of the plurality of computing devices at which the plurality of users are gazing.

Generally, a multi-device interaction component facilitates communication between multiple computing devices. The multi-device interaction component 120c enables interaction between computing devices (e.g., devices 103-108). For example, if a plurality of users desire for their gazes to adapt a plurality of computing device's behavior based on determined actions that correspond to the gazes, then the plurality of computing devices may communicate gaze data corresponding to the users gazes to each other, by way of the multi-device interaction component 120c. Additionally, or alternatively, the plurality of computing devices may communicate actions based on the gaze data to each other, by way of the multi-device interaction component 120c such that the actions can be executed by one or more of the plurality of computing devices.

Figure 3:
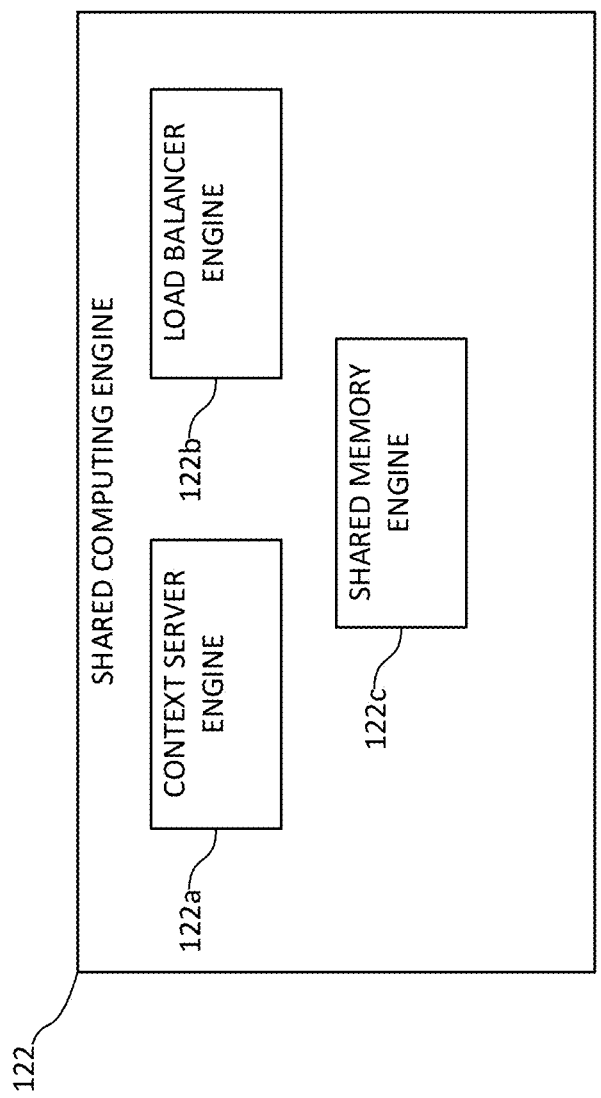
FIG. 3 illustrates a detailed schematic view of the shared computing engine of FIG. 1.

FIG. 3 illustrates a detailed schematic view of the shared computing component 122 of FIG. 1. As shown in FIG. 3, the shared computing component 122 includes a context server component or engine 122a, a load balancer component or engine 122b, and a shared memory component or engine 122c.

Generally, a context server component manages resource pooling. The context server component 122a may receive information corresponding to resources that are available across a plurality of computing devices. For example, the context server component 122a may receive information corresponding to how much processor capacity is available across a plurality of computing devices. Additionally, or alternatively, the context server component 122a may receive information corresponding to how much memory is available across a plurality of computing devices. The context server component 122a may further access, or claim, resources (e.g., processor capacity, memory capacity, and/or specialized hardware, such as a graphical processing unit (GPU), neural processing unit (NPU), tensor processing unit (TPU), holographic processing unit (HPU), infrared camera, LIDAR sensor, other types of specialized hardware (xPU), etc.) across the plurality of computing devices. For example, the context server component 122a may contain a set of access management policies that allow read and/or write access to processors or memory across a plurality of computing devices.

Generally, a load balancer component handles work-load distribution. The load balancer component 122b may handle work-load distribution across a plurality of computing devices (e.g., devices 103-108). The load balancer component 122b may facilitate balancing computing resources (e.g., processor, or memory) based on factors such as time, space, user, and/or device. For example, if a user is known to use a smartphone during the morning, and a laptop during the afternoon, then the load balancer component 122b may offload tasks from the smartphone, to the laptop, in the morning. Similarly, the load balancer component 122b may offload tasks from the laptop, to the smartphone, in the afternoon.

As another example, the load balancer component 122b may offload a task from a smartphone to a laptop, if the laptop contains more resource capacity (e.g., processor capacity, and/or memory capacity) than another form of computing device. As another example, mechanisms described herein may identify a user that is known to use a first computing device (e.g., a gaming console) more often than a second computing device (e.g., a desktop computer). Therefore, mechanisms described herein may identify the user, and the load balancer component may receive instructions to offload tasks from the first computing device to the second computing device, such that the first computing device is able to run at a relatively higher performance (e.g., complete operations faster, display high quality graphics, process applications relatively quickly, etc.).

The load balancer component 122b may facilitate computing resources based on gaze data that is received by the system 100 (e.g., from one or more users). Specifically, the load balancer component 122b may move unnecessary tasks from a device that is the focus of one or more users' gazes in order to make resources available for an application at which the users are gazing. Alternatively, the load balancer component 122b may move desired tasks to a device that is the focus of one or more users' gazes in order to satisfy what it is at which the one or more users desire to look.

Generally, a shared memory component handles distribution of various memory artifacts (e.g., information data). As discussed earlier herein, shared computing component 122 may balance computational load, and may also pass information (e.g., transient, state, and key value information) across devices (e.g., devices 103, 104, 106, and 108) to facilitate processing and/or execution of various tasks. The shared memory component 122c is what allows the shared computing component 122 to pass information across devices. As such, the earlier descriptions regarding transient, state, and key value information may be applied in a similar manner to operations that are executed by the shared memory component 122c. That is, the shared memory component 122c may store shared information across a number of linked devices. The shared memory component 122c allows for the execution of applications and tasks across the linked devices, thereby allowing an application executing on a first device to be migrated and executed on another device in the same state as it was when executing on the first device. In examples, the linked devices may replicate the shared memory 122c such that each linked device contains a similar copy of the shared memory 122c.

Figure 4:
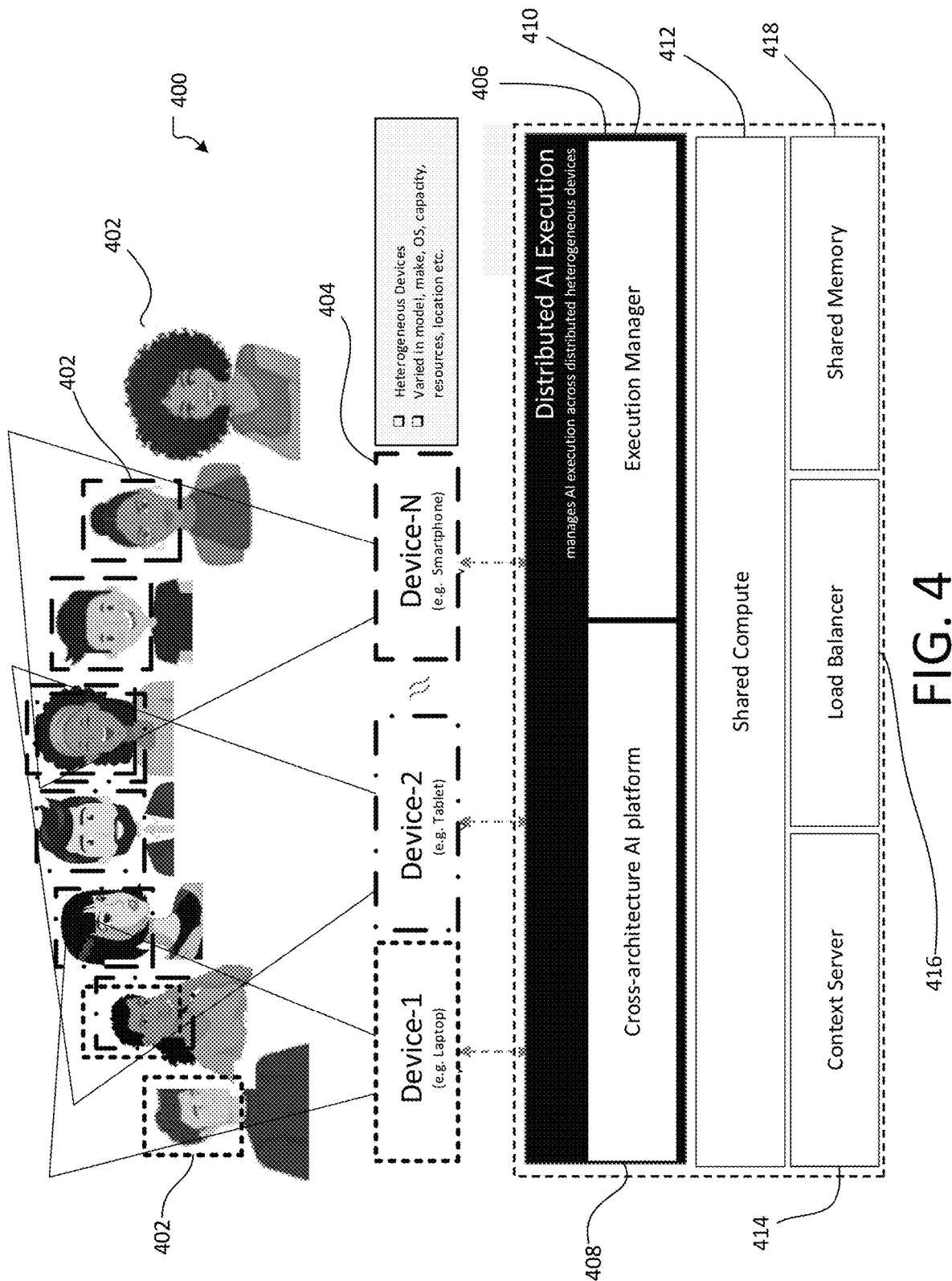
FIG. 4 illustrates an overview of an example system for multi-user, multi-device gaze tracking according to aspects described herein.

FIG. 4 illustrates an overview of an example system 400 for multi-user, multi-device gaze tracking according to aspects described herein. System 400 includes a plurality of users 402, and a plurality of computing devices 404. As shown in FIG. 4, the plurality of computing devices 404 may identify one or more users. In some cases, a user 402 is identified by a plurality of computing devices (e.g., several of the computing devices 404). The computing devices 404 may be any type of computing device described above with respect to FIG. 1 (e.g., a laptop, tablet, smartphone, etc.). Further, the computing devices may be heterogeneous device that are varied in model, make, operating system, capacity, resources, and/or location.

The computing devices 404 may include a distributed AI execution 406 that is similar to the distributed AI execution component 120a discussed above with respect to FIG. 2. The AI execution 406 may include a cross-architecture AI platform 408, and an execution manager 410. The AI execution 406 may be an accelerator for machine-learning models with multi-platform support. The AI execution 406 may integrate with hardware-specific libraries across a variety of computing devices.

The execution manager 410 loads, and/or exports a machine learning model (e.g., a model generated, or used by AI execution 406). The execution manager may load, and/or export, a machine learning model. The execution manager 410 may apply optimizations, choose hardware acceleration frameworks, manage training of models, and/or manage interfaces between computing devices.

The computing devices 404 may further include a shared compute 412 component or engine. The shared compute 412 component may be similar to the shared computing component 122 discussed above with respect to FIGS. 1 and 3. The shared compute 412 may include a context server 414 (e.g., similar to the context server component 122a), a load balancer 416 (e.g., similar to the load balancer component 122b), and a shared memory 418 (e.g., similar to the shared memory component 122c).

Figure 5:
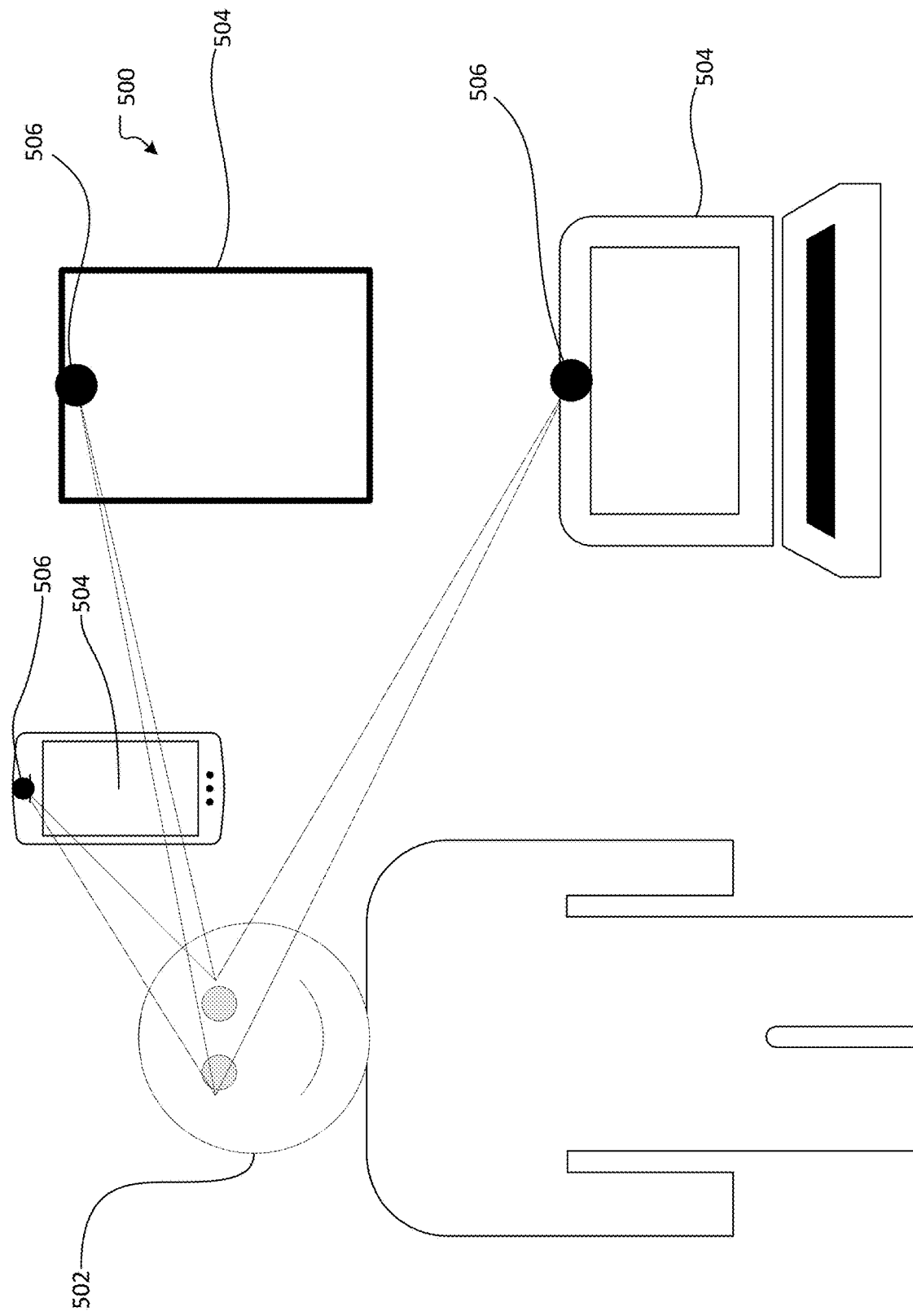
FIG. 5 illustrates an overview of an example system for multi-device gaze tracking according to aspects described herein.

FIG. 5 illustrates an overview of an example system 500 for multi-device gaze tracking according to aspects described herein. System 500 includes a user 502, and a plurality of computing devices 504. The plurality of computing devices 504 each contain a sensor 506 (e.g., a camera) that is configured to receive gaze input data from the user (e.g., by monitoring the user's 502 eyes). Generally, the cameras 506 on the computing devices 504 track where a user is looking (e.g., gaze data). The gaze data may be received by the computing devices 504 to determine and/or perform specific actions that correspond to the gaze data that is based on the user 502.

Figure 6:
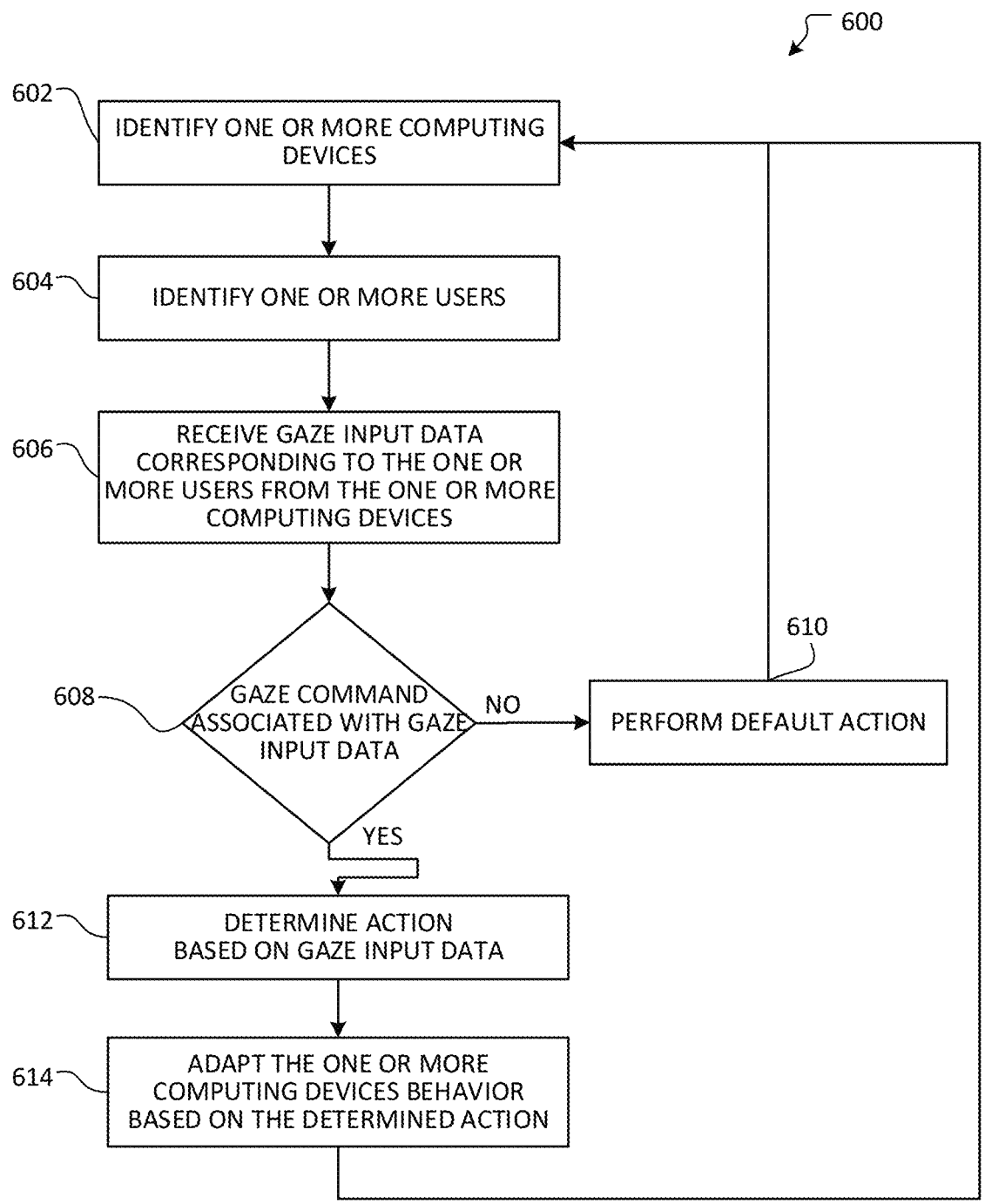
FIG. 6 illustrates an overview of an example method for processing gaze input data to perform an action to affect computing device behavior.

FIG. 6 illustrates an overview of an example method 600 for processing gaze input data to perform an action to affect computing device behavior. In accordance with some examples, aspects of method 600 are performed by a device, such as computing device 103, computing device 104, peripheral device 106, or peripheral device 108 discussed above with respect to FIG. 1.

Method 600 begins at operation 602, where one or more computing devices are identified. For example, a user may link one or more devices (e.g., devices 103-108) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices that are linked together, to be identified by method 600 to identify the devices at operation 602. Additionally, or alternatively, a network may be configured to automatically identify one or more devices that are connected to the network. In yet another example, a network may be configured to detect computing devices within a specified geographic proximity.

At operation 604, one or more users are identified. The one or more users may be identified by one or more computing devices (e.g., device 103-106). Specifically, the one or more computing devices may receive visual data from a sensor (e.g., a camera) to identify one or more users. The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheekbone location, hair location, eye location, and/or eyelid location.

Additionally, or alternatively, at operation 604, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 604, the one or more users may be identified using a radio frequency identification tag (RFID), an ID badge, a bar code, a QR code, or some other means of identification that is capable of identifying a user via some technological interface.

Additionally, or alternatively, at operation 604, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 606, gaze input data is received, from the one or more computing devices (e.g., computing devices 103-108) that corresponds to the one or more users. Once the one or more users are identified at 604, the method 600 may monitor the orientation of a user's eyes to determine their gaze, and thereby receive gaze input data. Such gaze input data can provide an indication to a multi-device gaze tracking system (e.g., systems 100, 400, and 500 discussed above with respect to FIGS. 1-5) of where a user may be looking relative to a display screen (e.g., a display screen of devices 103-108).

Still referring to operation 606, the one or more computing devices (e.g., computing devices 103-108 may receive gaze data from a plurality of users (e.g., the computing devices may track the orientation of multiple users' eyes, and receive gaze data therefrom). Specifically, the one or more computing devices may track at which device (e.g., computing devices 103-108) that each of the users are looking, and even further, may determine at what each of the users are looking at on the devices (e.g., an application, or some other element being displayed on one or more of the computing devices). The gaze data may be received in real-time (e.g., providing a continuous stream of feedback regarding at what the plurality of users are gazing). Alternatively, the gaze data may be received periodically (e.g., at regular, or irregular, time intervals that may be specified by a user).

Still further, with reference to operation 606, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At determination 608, it is determined whether there is gaze command associated with the gaze input data. For example, determination 608 may comprise evaluating the received gaze input data to generate a set of user signals, which may be processed in view of an environmental context (e.g., applications currently being run on a device, or tasks currently being executed). Accordingly, the evaluation may identify a gaze command as a result of an association between the gaze input data and the environmental context.

In some examples, at determination 608, it is determined, for each user, whether there is gaze command associated with the gaze input data corresponding to that user. For example, determination 608 may comprise evaluating the received gaze input data to generate a set of user signals, wherein each of the user signals correspond to one of the plurality of users. The user signals may be processed in view of an environmental context (e.g., applications currently being run on a device, or tasks currently being executed). Accordingly, the evaluation may identify one or more gaze commands as a result of an association between the gaze input data for each user and the environmental context. It should be recognized that there may be different gaze commands identified for each user, based on differed gaze input data (e.g., different users looking at different computing devices). Alternatively, there may be the same gaze commands identified for each user, based on the same gaze input data (e.g., different users looking at the same computing device).

If it is determined that there is not a gaze command associated with the gaze input data, flow branches "NO" to operation 610, where a default action is performed. For example, the gaze input data may have an associated preconfigured action. In some other examples, the method 600 may comprise determining whether the gaze input data has an associated default action, such that, in some instances, no action may be performed as a result of the received gaze input data. Method 600 may terminate at operation 610. Alternatively, method 600 may return to operation 602, from operation 610, to create a continuous feedback loop of gaze input data and executed commands for a user.

If however, it is determined that there is a gaze command associated with the received gaze input data, flow instead branches "YES" to operation 612, where an action is determined based on the gaze input data. For example, various actions that may be executed as a result of the gaze input data are discussed through some of the aspects disclosed herein, below.

Flow progresses to operation 614, where the behavior of a computing device is adapted according to the action that was determined at operation 612. For example, the action may be performed by the computing device at which method 600 was performed. In another example, an indication of the action may be provided to another computing device. For example, aspects of method 600 may be performed by a peripheral device, such that operation 614 comprises providing an input to an associated computing device. As another example, operation 614 may comprise using an application programming interface (API) call to affect the behavior of the computing device based on the determined action accordingly. Method 600 may terminate at operation

614. Alternatively, method 600 may return to operation 602, from operation 614, to create a continuous feedback loop of gaze input data and executed commands for a user.

While method 600 is described as an example where an association is used to identify and perform an action, based on gaze tracking data, it will be appreciated that any of a variety of additional or alternative techniques (e.g., reinforcement learning, set of rules, user-interface commands) may be used to determine an actioned based on received gaze input data.

Figure 7:
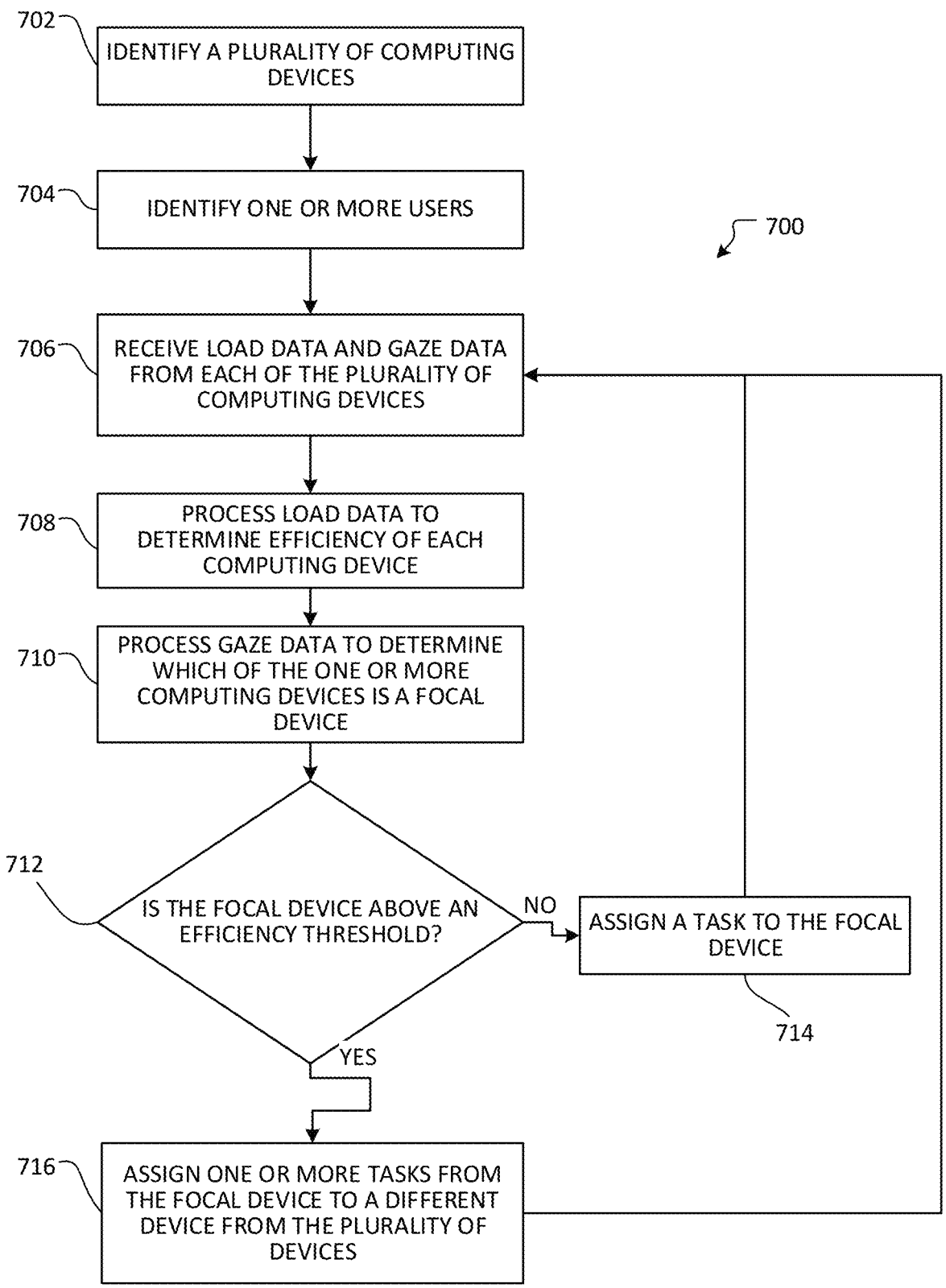
FIG. 7 illustrates an overview of an example method for processing gaze input data and load data to assign tasks across computing devices.

FIG. 7 illustrates an overview of an example method 700 for processing gaze input data and load data to assign tasks across computing devices. In accordance with some examples, aspects of method 700 are performed by a device, such as computing device 103, computing device 104, peripheral device 106, or peripheral device 108 discussed above with respect to FIG. 1.

Method 700 begins at operation 702, where a plurality of computing devices are identified. For example, a user may link a plurality of devices (e.g., devices 103-108) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select a plurality of computing devices that are linked together, to be identified by method 700 to identify the devices at operation 702. Additionally, or alternatively, a network may be configured to automatically identify a plurality of computing devices that are connected to the network. In yet another example, a network may be configured to detect computing devices within a specified geographic proximity.

At operation 704, one or more users are identified. The one or more users may be identified by one or more computing devices (e.g., device 103-106). Specifically, the one or more computing devices may receive visual data from a sensor (e.g., a camera) to identify one or more users. The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheekbone location, hair location, eye location, and/or eyelid location.

Additionally, or alternatively, at operation 704, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 604, the one or more users may be identified using a radio frequency identification tag (RFID), an ID badge, a bar code, a QR code, or some other means of identification that is capable of identifying a user via some technological interface.

Additionally, or alternatively, at operation 704, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 706, load data and gaze input data is received, from each of the plurality of computing devices (e.g., computing devices 103-108) that corresponds to the one or more users. Once the one or more users are identified at 704, the method 700 may monitor the orientation of a user's eyes to determine their gaze, and thereby receive gaze input data. Such gaze input data can provide an indication to a multi-device gaze tracking system (e.g., systems 100, 400, and 500 discussed above with respect to FIGS. 1-5) of where a user may be looking relative to a display screen (e.g., a display screen of devices 103-108). For example, gaze data for a user may be tracked by multiple nearby devices. The gaze data tracked by each device may be stored in the shared memory (e.g., shared memory 122c) such that the user's gaze data associated with the different devices may be shared.

The load data that is received from each of the plurality of computing devices may be indicative of computational resources that are available on each of the computing devices (e.g., processor availability, and/or memory availability). The load data may be received by a shared computing component (e.g., the shared computing component 122 discussed with respect to FIG. 1). Load data may be received in real-time (e.g., providing a continuous stream of feedback regarding computational resources that are available across the computing devices). Alternatively, the load data may be received periodically (e.g., at regular, or irregular, time intervals that may be specified by a user).

The load data can be stored (e.g., in memory). In some examples, only the most recent load data is stored, such that as load data is received, older load data is overwritten (e.g., in memory) by new load data. Alternatively, in some examples, load data is stored from a specified duration of time (e.g., the last hour, the last day, the last week, the last month, the last year, or since gaze data first began being received). Generally, such an implementation allows for a history of load data from one or more users to be reviewed for further analysis (e.g., to infer or predict data that may be collected in the future). For example, the history of load data may provide an indication of which computing devices are regularly over-loaded, at what times certain computing devices tend to be over-loaded, or other indications that can be discerned from an analysis of the stored load data.

Still referring to operation 706, the one or more computing devices (e.g., computing devices 103-108 may receive gaze data from a plurality of users (e.g., the computing devices may track the orientation of multiple users' eyes, and receive gaze data therefrom). Specifically, the one or more computing devices may track at which device (e.g., computing devices 103-108) each of the users are looking, and even further, may determine at what each of the users are looking, on the devices (e.g., an application, or some other element being displayed on one or more of the computing devices). The gaze data may be received in real-time (e.g., providing a continuous stream of feedback regarding at what the plurality of users are gazing). Alternatively, the gaze data may be received periodically (e.g., at regular, or irregular, time intervals that may be specified by a user).

Still further, with reference to operation 706, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At operation 708, load data is processed to determine resource availability for one or more linked computing devices. For example, the load data may be received by a shared computing component (e.g., the shared computing component 122 discussed with respect to FIG. 1) to determined efficiency of each computing device. Computing devices generally have processors and memory that may relied upon to perform actions on a computer. The resource availability of the one or more computing devices can be determined by receiving processor usage data, and/or memory usage data from the one or more computing devices, as well as processor capability data, and/or memory capability data from each of the computing devices. A ratio may be calculated between the processor usage data and the processor capability data (e.g., by dividing the former by the latter) to determine how much processor space is available on a computing device with no actions being performed, relative to the load data that was received. Similarly, a ratio may be calculated between the memory availability data and the memory capability data (e.g., by dividing the former by the latter) to determine how much memory space is available on a computing device with no actions being performed, relative to the load data that was received. The ratio may be compared to a predetermined threshold, as will be discussed further below, to determine whether one or more tasks need to be reassigned across computing devices, based on the determined efficiency of each computing device.

At operation 710, gaze data is processed to determine which of the one or more computing devices is a focal device. Amongst a plurality of computing devices, a focal device may be the device at which a majority of users are found to be looking, amongst a plurality of users (or the device that is currently being viewed in a single user environment). Alternatively, in some examples, a focal device is the device at which a particular user is looking, amongst a plurality of users, when special importance is assigned to the particular user. For example, if a presentation is being given, then the focal device may the device at which the presenter is looking, compared to the device at which any presentation observers may be looking.

At determination 710, it is determined whether the focal device is above an efficiency threshold. For example, determination 710 may comprise evaluating the determined efficiency of operation 708 with respect to a predetermined threshold that is automatically calculated (e.g., based on specifications of a device), or set by a user. The efficiency threshold may be a threshold at which computational performance is reduced based on computational resources being overloaded, on a particular device. In examples, the efficiency threshold may be dynamic. That is, the efficiency threshold may be higher for resource intensive tasks (e.g., video games, high-resolution video, etc.) or lower for tasks that are not resource intensive (e.g., an email application, word processing application, etc.). That is, the efficiency threshold may be dynamically determined based upon the resource requirements for a particular application or task that is in focus.

If it is determined that the focal device is not above the efficiency threshold, flow branches "NO" to operation 714, where a task is assigned to the focal device. For example, if it is determined that the focal device is not over-loaded with tasks then the focal device may be assigned a task from another computing device that is over-loaded. Method 700 may terminate at operation 714. Alternatively, method 700 may return to operation 706, where further load data and gaze data are received from each of the plurality of computing devices. In some examples, operation 714 may be skipped, and method 700 may flow directly from operation 712 to operation 706, when flow branches "NO".

If however, it is determined that the focal device is above the efficiency threshold, flow instead branches "YES" to operation 716. At operation 716, one or more tasks from the focal device are assigned to a different device from the plurality of devices. Generally, a shared computing component may allocate tasks across a plurality of computing devices based on available load capacity. If the focal device is found to be above an efficiency threshold (e.g., based on the above-discussed processor ratio, or memory ratio, focus application or task resource demands, or general resource availability), then the shared computing component may reassign a task from the focal device to a different device (e.g., a device that is below the efficiency threshold).

For example, referring back to FIG. 4, one of the devices 404 is a tablet. The tablet 404 "Device-2" is tracking gazes from the most users (four users), relative to the other devices 404. Therefore, the tablet 404 may be the focal device. If the tablet 404 is rendering a high-definition video for the users 402 to view, and also has a number of background processes running (e.g., refreshing email, monitoring websites for changes, etc.), then the background processes may be reassigned by the shared compute 412 to another device. As an example, the background processes may be assigned to "Device-1", which may be a laptop, because "Device-1" is only tracking two users, and a laptop may have larger processor and memory capabilities than a tablet.

Figure 8A:
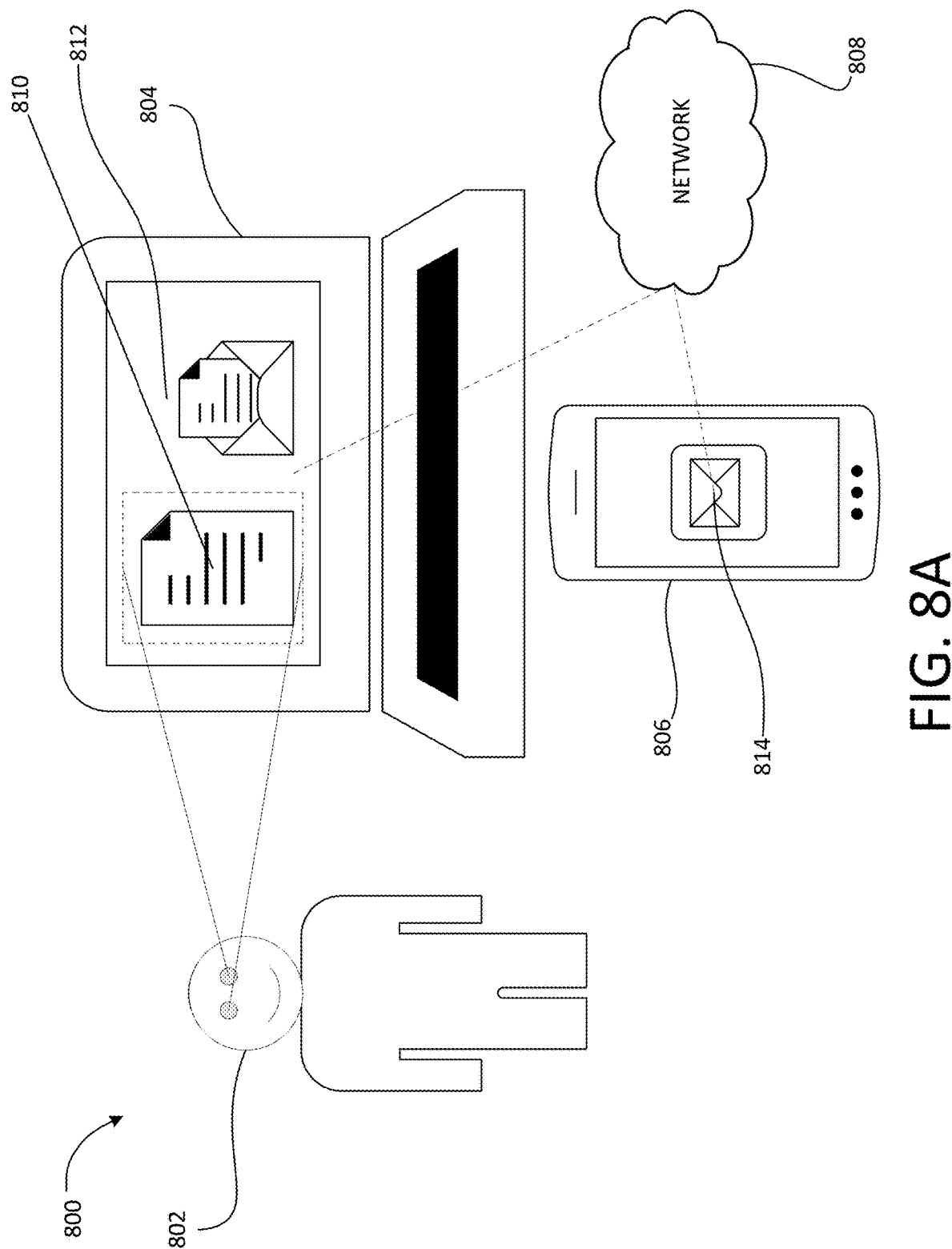
FIG. 8A illustrates an example system for multi-device gaze tracking according to aspects described herein.
Figure 8B:
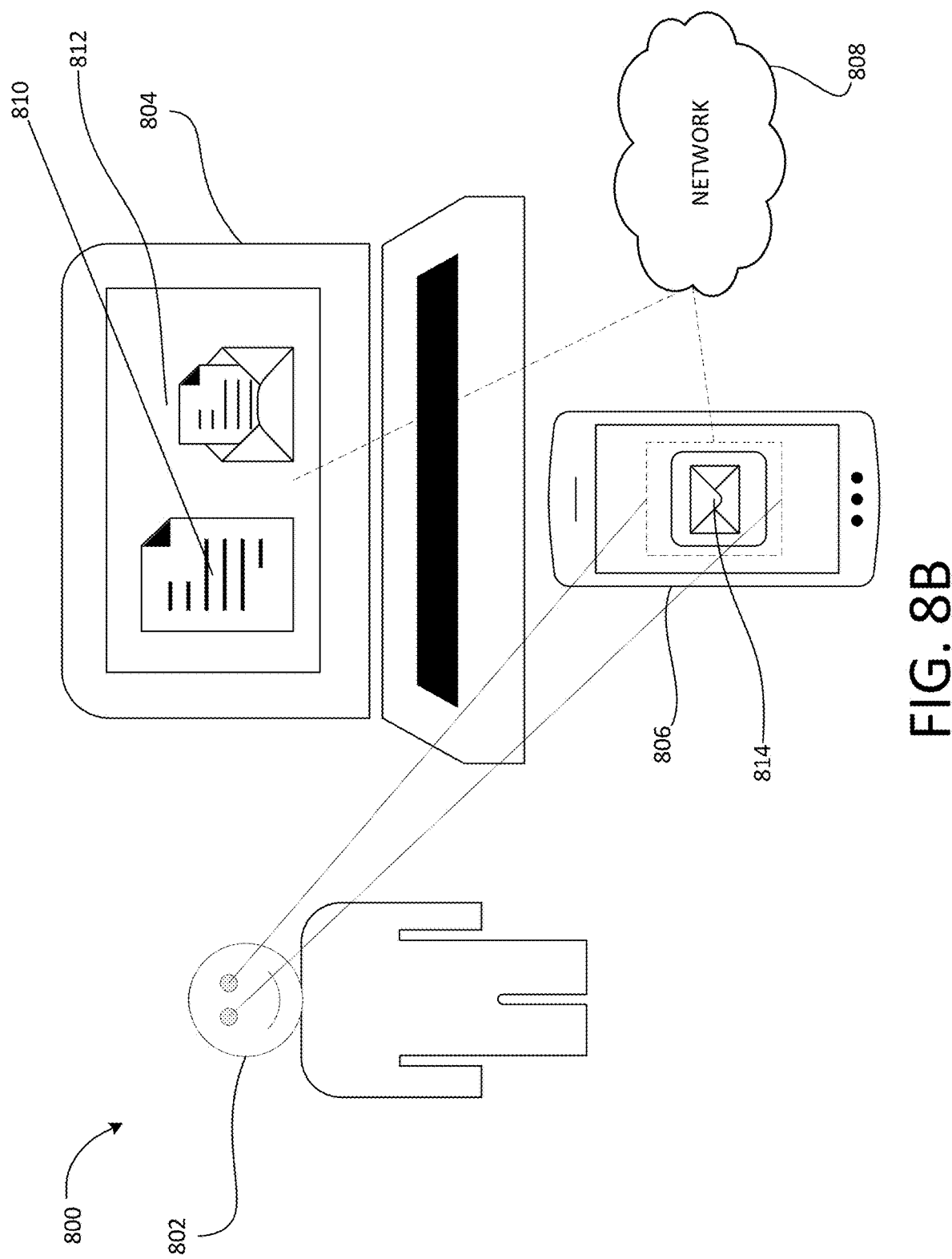
FIG. 8B illustrates an example system for multi-device gaze tracking according to aspects described herein.

FIGS. 8A and 8B illustrate an example system 800 for multi-device gaze tracking according to aspects described herein. System 800 includes a user 802, and a plurality of computing devices, for example, a first computing device 804 and a second computing device 806. The plurality of computing devices 804, 806 are in communication via a network 808. The plurality of computing devices 804, 806 may be similar to devices 103-108 discussed earlier herein with respect to FIG. 1. Further, the network 808 may be similar to the network 110 discussed earlier herein with respect to FIG. 1.

The first computing device 804 may include a plurality of applications running thereon. For example, the first computing device 804 may include a word processing application 810, and an email application 812 running thereon. The second computing device 806 may include a plurality of applications running thereon. For example, the second computing device 806 may include a mobile email application 814 running thereon. It should be recognized that the applications 810, 812, and 814 may be any of a plurality of applications, or software programs that provide some visual display at which a user can gaze. Examples of such applications, elements, or computer programs include, but are not limited to, word processors, graphics software, database software, spreadsheet software, web browsers, enterprise software, information worker software, multimedia software, presentation software, education software, content access software, communication software, etc.

Mechanisms described herein provide users the opportunity to select, focus on, or navigate between applications on a computing device, based on where the users are looking. Referring specifically to FIG. 8A, the user 802 is shown to be looking at the word processing application 810. Therefore, according to mechanisms described herein, the word processing application 810 is selected, or in-focus. Comparatively, and referring specifically to FIG. 8B, the user 802 is shown to be looking at the mobile email application 814. Therefore, according to mechanisms described herein, the mobile email application 814 is selected, or in-focus. As a user (e.g., user 802) switches their gaze from a first application to a second application, the first application may be de-selected, or un-focused, in order for the second application to be selected, or focused on. Similarly, as a user (e.g., user 802) switches their gaze from the second application to the first application, the second application may be de-selected, or un-focused, in order for the first application to be selected, or focused on.

Figure 9:
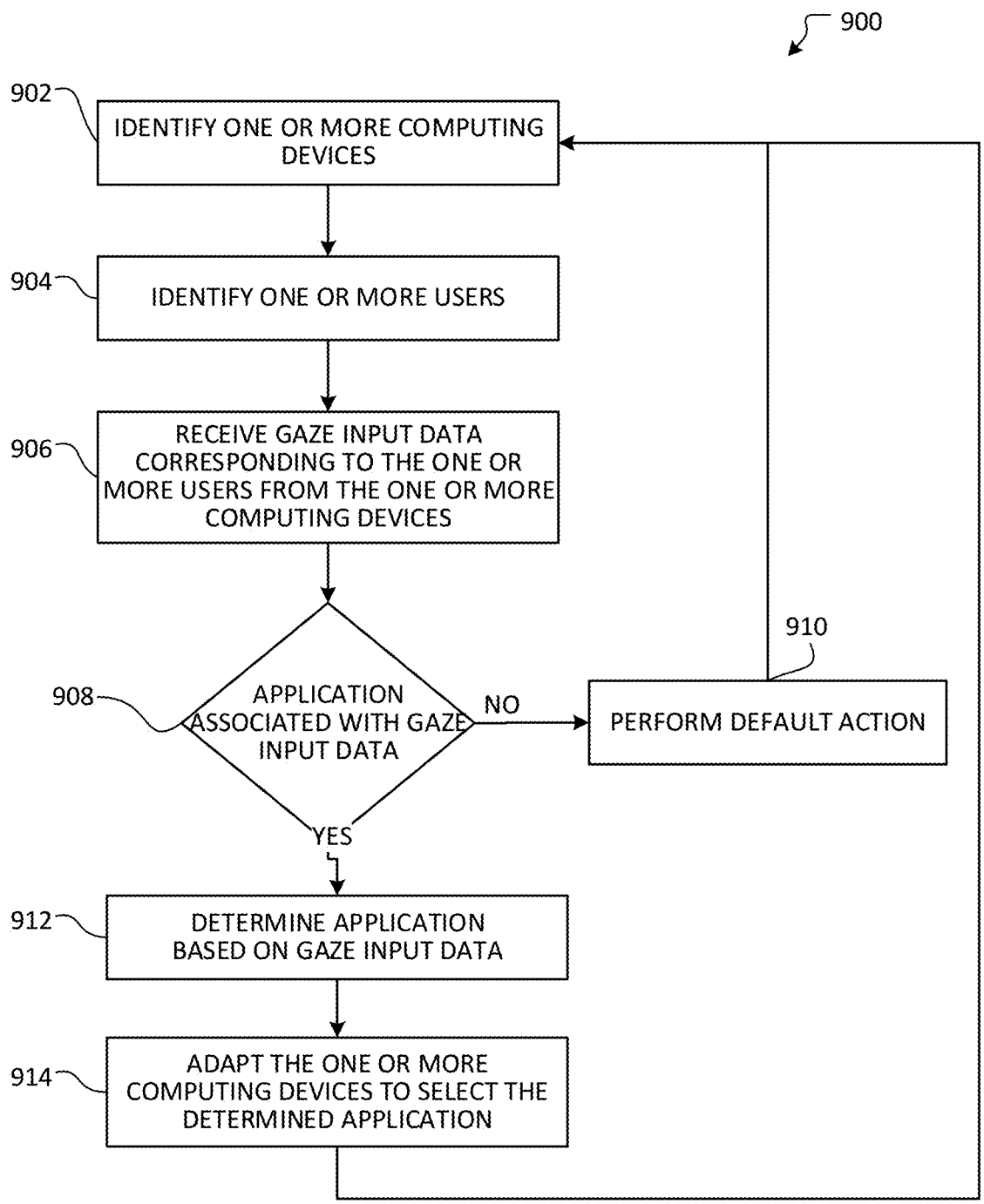
FIG. 9 illustrates an overview of an example method for processing gaze input data to perform an action to affect computing device behavior.

FIG. 9 illustrates an overview of an example method 900 for processing gaze input data to perform an action to affect computing device behavior. In accordance with some examples, aspects of method 900 are performed by a device, such as computing device 103, computing device 104, peripheral device 106, or peripheral device 108 discussed above with respect to FIG. 1.

Method 900 begins at operation 902, where one or more computing devices are identified. For example, a user may link one or more devices (e.g., devices 103-108) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices that are linked together, to be identified by method 900. Additionally, or alternatively, a network (e.g., network 808) may be configured to automatically identify one or more devices that are connected to the network. In yet another example, a network (e.g., network 808) may be configured to detect computing devices within a specified geographic proximity.

At operation 904, one or more users are identified. The one or more users may be identified by one or more computing devices (e.g., device 103-106). Specifically, the one or more computing devices may receive visual data from a sensor (e.g., a camera) to identify one or more users (e.g., user 802). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 904, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 904, the one or more users may be identified using a radio frequency identification tag (RFID), an ID badge, a bar code, a QR code, or some other means of identification that is capable of identifying a user via some technological interface.

Additionally, or alternatively, at operation 904, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 906, gaze input data is received, from the one or more computing devices (e.g., computing devices 103-108, and/or computing devices 804, 806) that corresponds to the one or more users (e.g., user 802). Once the one or more users are identified at 904, the method 900 may monitor the orientation of a user's eyes to determine their gaze, and thereby receive gaze input data. Such gaze input data can provide an indication to a multi-device gaze tracking system (e.g., system 800 discussed above with respect to FIGS. 8A and 8B) of where a user may be looking relative to a display screen (e.g., a display screen of devices 804 and/or 608).

Still referring to operation 906, the one or more computing devices (e.g., computing devices 103-108, and/or computing devices 804, 806) may receive gaze data from a plurality of users (e.g., the computing devices may track the orientation of multiple users' eyes, and receive gaze data therefrom). Specifically, the one or more computing devices may track at which device (e.g., computing devices 103-108, and/or computing devices 804, 806) each of the users are looking, and even further, may determine at what each of the users are looking, on the devices (e.g., an application, or some other element being displayed on one or more of the computing devices). The gaze data may be received in real-time (e.g., providing a continuous stream of feedback regarding at what the plurality of users are gazing). Alternatively, the gaze data may be received periodically (e.g., at regular, or irregular, time intervals that may be specified by a user).

Still further, with reference to operation 906, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At determination 908, it is determined whether there is an application associated with the gaze input data. For example, determination 908 may comprise evaluating the received gaze input data to generate a set of user signals, which may be processed in view of an environmental context (e.g., applications currently being run on a device, or tasks currently being executed). Accordingly, the evaluation may identify an application as a result of an association between the gaze input data and the environmental context.

In some examples, at determination 908, it is determined, for each user, whether there is an application associated with the gaze input data corresponding to that user. For example, determination 908 may comprise evaluating the received gaze input data to generate a set of user signals, wherein each of the user signals correspond to one of the plurality of users. The user signals may be processed in view of an environmental context (e.g., applications currently being run on a device, or tasks currently being executed). Accordingly, the evaluation may identify one or more applications as a result of an association between the gaze input data for each user and the environmental context. It should be recognized that there may be different applications identified for each user, based on differed gaze input data (e.g., different users looking at different computing devices). Alternatively, there may be the same applications identified for each user, based on the same gaze input data (e.g., different users looking at the same computing device).

If it is determined that there is not an application associated with the gaze input data, flow branches "NO" to operation 910, where a default action is performed. For example, the gaze input data may have an associated predetermined application. In some other examples, the method 900 may comprise determining whether the gaze input data has an associated default application, such that, in some instances, no action may be performed as a result of the received gaze input data. Method 900 may terminate at operation 910. Alternatively, method 900 may return to operation 902, from operation 910, to create a continuous feedback loop of gaze input data and selecting, or focusing on, applications for a user.

If however, it is determined that there is a gaze command associated with the received gaze input data, flow instead branches "YES" to operation 912, where an application is determined based on the gaze input data. For example, referring to FIGS. 8A and 8B, when the user 802 gazes at the word processing application 810, it is determined that the user is gazing at the word processing application 810. When the user 802 gazes at the mobile email application 814, it is determined that the user is gazing at the mobile email application 814.

Flow progresses to operation 914, where the one or more computing devices are adapted to select the determined application. Alternatively, in some examples the one or more computing devices may be adapted to focus on the determined application. For example, the determined application may be selected, or focused on, by the computing device at which method 900 was performed. In another example, an indication of the determined application may be provided to another computing device. For example, aspects of method 900 may be performed by a peripheral device, such that operation 914 comprises providing an input to an associated computing device. As another example, operation 914 may comprise using an application programming interface (API) call to adapt the one or more computing devices to select, or focus on, the determined application and/or to de-select, or not focus on, applications that are not determined based on gaze input data. Method 900 may terminate at operation 914. Alternatively, method 900 may return to operation 902, from operation 914, to create a continuous feedback loop of gaze input data and selecting, or focusing on, applications for a user.

Figure 10A:
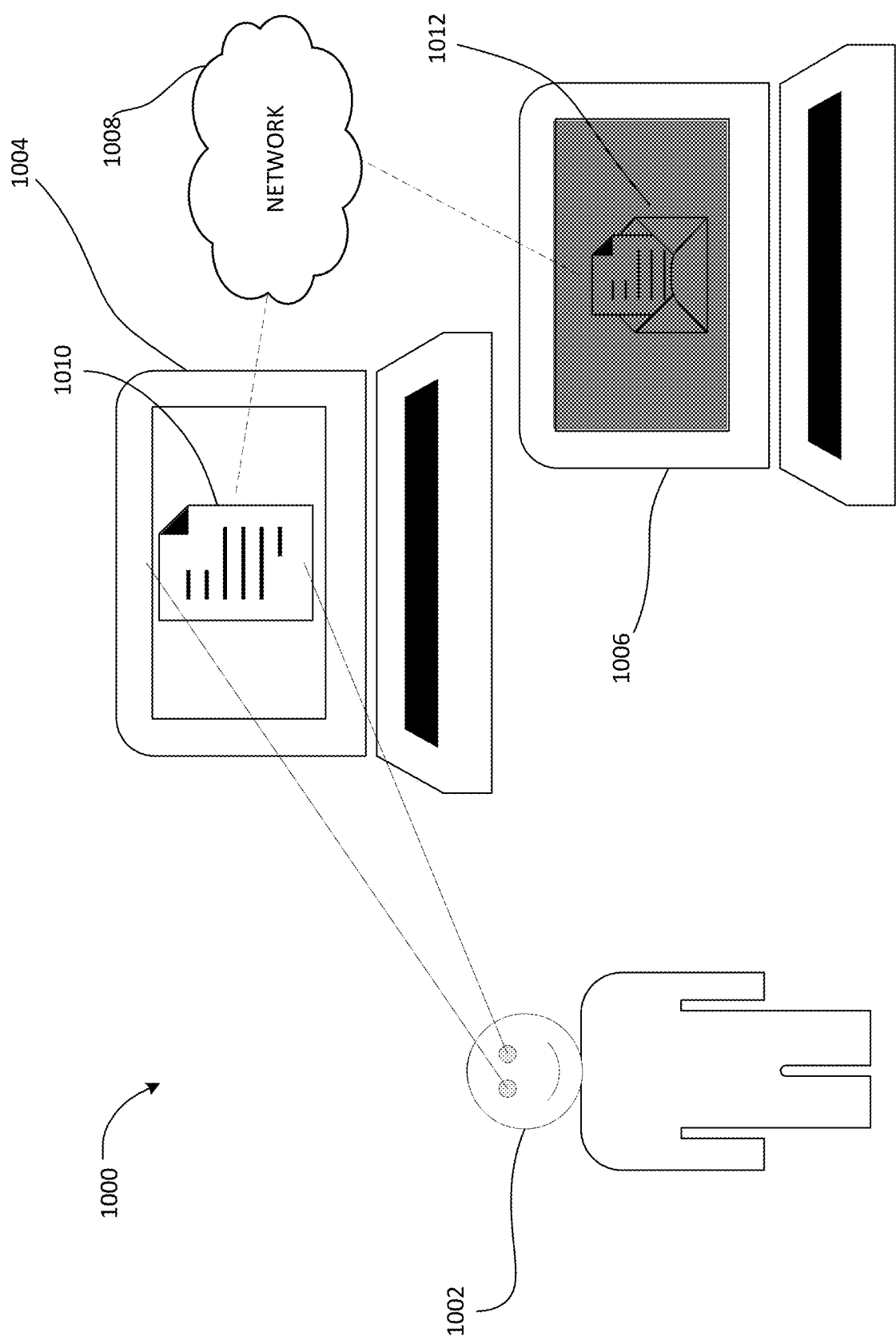
FIG. 10A illustrates an example system for multi-device gaze tracking according to aspects described herein.
Figure 10B:
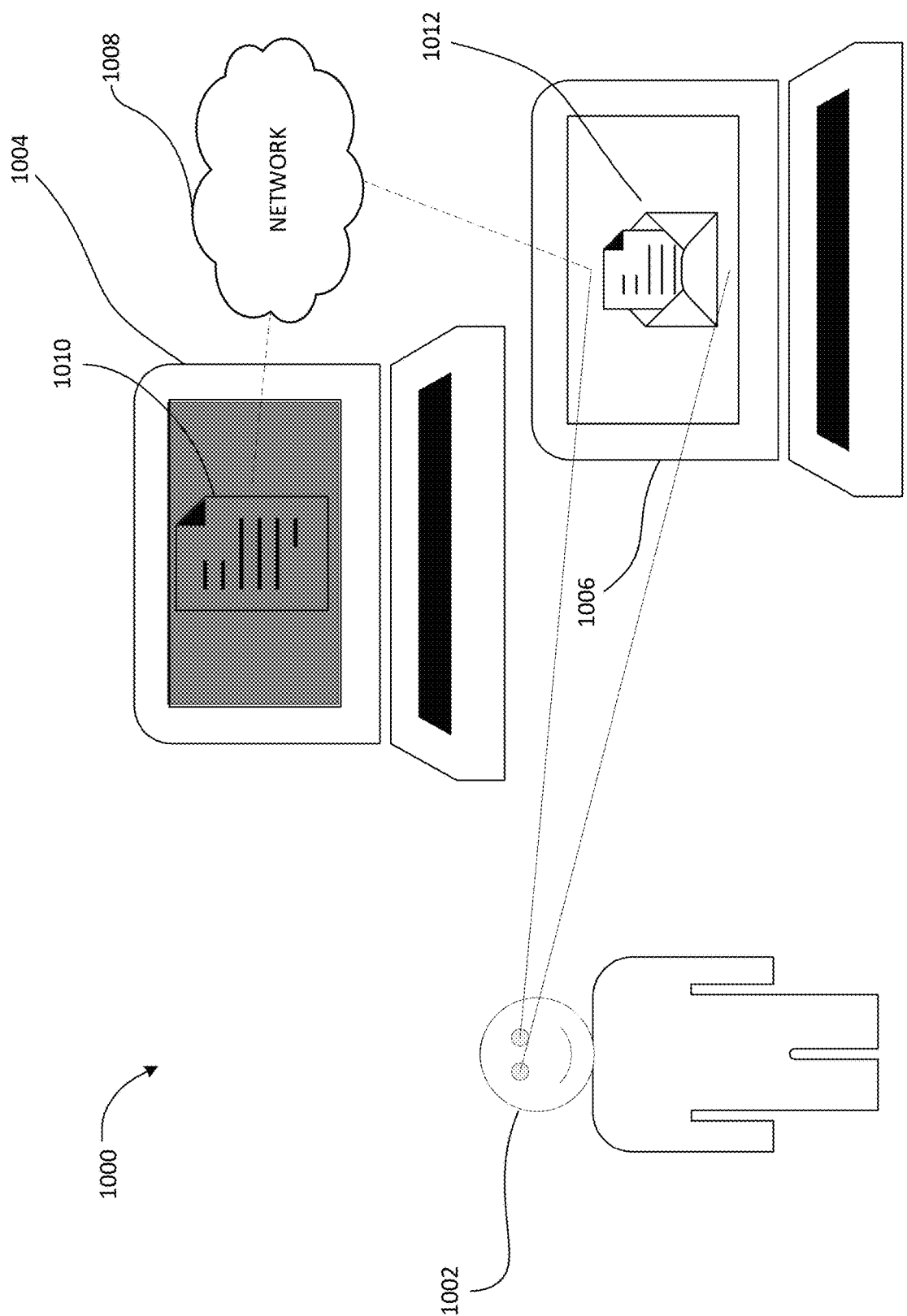
FIG. 10B illustrates an example system for multi-device gaze tracking according to aspects described herein.

FIGS. 10A and 10B illustrates an example system 1000 for multi-device gaze tracking according to aspects described herein. System 1000 includes a user 1002, and a plurality of computing devices, for example, a first computing device 1004 and a second computing device 1006. The plurality of computing devices 1004, 1006 are in communication via a network 1008. The plurality of computing devices 1004, 1006 may be similar to devices 103-108 discussed earlier herein with respect to FIG. 1. Further, the network 1008 may be similar to the network 110 discussed earlier herein with respect to FIG. 1.

The first computing device 1004 may include one or more applications running thereon. For example, the first computing device 1004 may include a word processing application 1010 running thereon. The second computing device 1006 may include a plurality of applications running thereon. For example, the second computing device 1006 may include an email application 1012 running thereon. It should be recognized that the applications 1010 and 1012 may be any of a plurality of applications, or software programs that provide some visual display at which a user can gaze. Examples of such applications, elements, or computer programs include, but are not limited to, word processors, graphics software, database software, spreadsheet software, web browsers, enterprise software, information worker software, multimedia software, presentation software, education software, content access software, communication software, etc.

Aspects described herein provide the opportunity to assign tasks across computing devices, and/or reduce tasks on computing devices, based on where the users are looking. Referring specifically to FIG. 10A, the user 1002 is shown to be looking at the word processing application 1010. Therefore, according to mechanisms described herein, the word processing application 1010 is selected, or in-focus, on the first computing device 1004. Meanwhile, unnecessary tasks may be reduced on the second computing device 1006. For example, the brightness on the second computing device 1006 is shown to be reduced in FIG. 10A. By reducing the brightness on the second computing device 1006, the computing device 1006 may increase load capacity to perform one or more tasks (e.g., tasks that are reassigned from the first computing device 1004). Additionally, or alternatively, to the brightness being reduced, background processes on the second computing device 1006 may be de-prioritized (e.g., slowed, interrupted, or stopped) to increase the capacity of resources towards tasks that are prioritized, based on gazed data.

Comparatively, and referring to FIG. 8B, the user 802 is shown to be looking at the mobile email application 814 on the second computing device 1006. Therefore, according to mechanisms described herein, the mobile email application 814 is selected, or in-focus. Meanwhile, unnecessary tasks may be reduced on the first computing device 1004. For example, the brightness on the first computing device 1004 is shown to be reduced in FIG. 10B. By reducing the brightness on the first computing device 1004, the computing device 1004 may increase load capacity to perform one or more tasks (e.g., tasks that are reassigned from the second computing device 1006). Additionally, or alternatively, to the brightness being reduced, background processes on the first computing device 1006 may be de-prioritized (e.g., slowed, interrupted, or stopped) to increase the capacity of resources towards tasks that are prioritized, based on gazed data.

As a user (e.g., user 1002) switches their gaze from the first computing device 1004 to the second computing device 1006, tasks on the first computing device 1004 may be de-prioritized, and tasks on the second computing device 1006 may be prioritized. Accordingly, a shared computing component (e.g., shared computing component 122) may assign or execute tasks based on priority and available resources (e.g., available processor capacity, and/or memory capacity across computing devices). Similarly, as a user (e.g., user 1002) switches their gaze from the second computing device 1006 to the first computing device 1004, tasks on the second computing device 1006 may be de-prioritized, and tasks on the first computing device 1004 may be prioritized. Accordingly, a shared computing component (e.g., shared computing component 122) may assign or execute tasks based on priority and available resources (e.g., available processor capacity, and/or memory capacity across computing devices).

Figure 11:
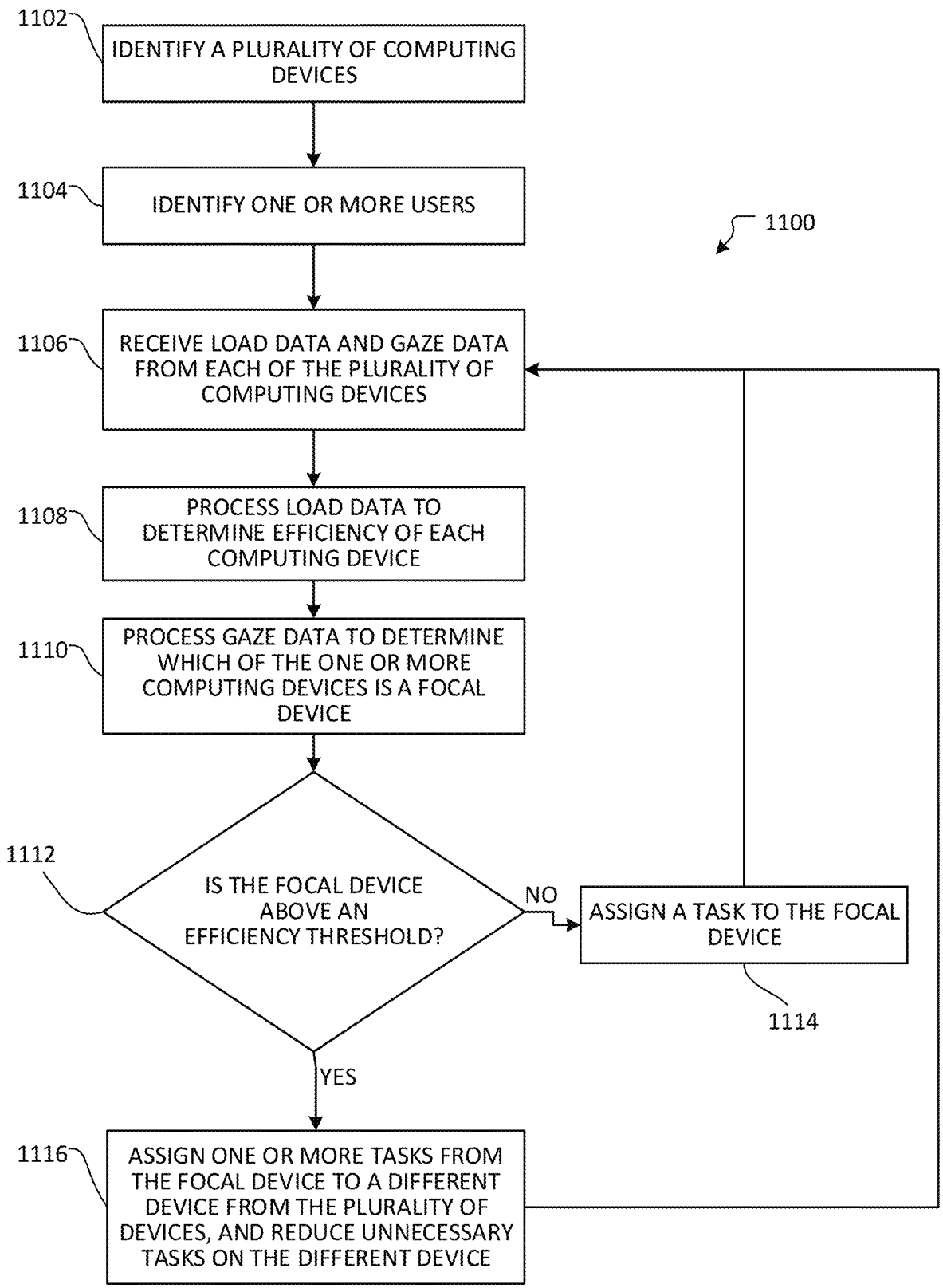
FIG. 11 illustrates an overview of an example method for processing gaze input data and load data to assign tasks across computing devices.

FIG. 11 illustrates an overview of an example method 1100 for processing gaze input data and load data to assign tasks across computing devices. In accordance with some examples, aspects of method 1100 are performed by a device, such as computing device 103, computing device 104, peripheral device 106, or peripheral device 108 discussed above with respect to FIG. 1.

Method 1100 begins at operation 1102, where one or more computing devices are identified. For example, a user may link one or more devices (e.g., devices 103-108, and/or device 1004, 1006) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices that are linked together, to be identified by method 1100 to identify the devices at operation 1102. Additionally, or alternatively, a network (e.g., network 1008) may be configured to automatically identify one or more devices that are connected to the network. In yet another example, a network (e.g., network 1008) may be configured to detect computing devices within a specified geographic proximity.

At operation 1104, one or more users are identified. The one or more users may be identified by one or more computing devices (e.g., device 103-106, and/or device 1004, 1006). Specifically, the one or more computing devices may receive visual data from a sensor (e.g., a camera) to identify one or more users (e.g., user 1002). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 1104, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 1104, the one or more users may be identified using a radio frequency identification tag (RFID), an ID badge, a bar code, a QR code, or some other means of identification that is capable of identifying a user via some technological interface.

Additionally, or alternatively, at operation 1104, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 1106, load data and gaze data is received, from each of the plurality of computing devices (e.g., computing devices 103-108, and/or devices 1004, 1006) that corresponds to the one or more users. Once the one or more users are identified at 1104, the method 1100 may monitor the orientation of a user's eyes to determine their gaze, and thereby receive gaze input data. Such gaze input data can provide an indication to a multi-device gaze tracking system (e.g., systems 1000 discussed above with respect to FIGS. 10A and 10B) of where a user may be looking relative to a display screen (e.g., a display screen of devices 103-108, and/or devices 1004, 1006).

The load data that is received from each of the plurality of computing devices may be indicative of computational resources that are available on each of the computing devices (e.g., processor use, memory use, storage use, network use, and/or general resource requirements, etc.). The load data may be received by a shared computing component (e.g., the shared computing component 122 discussed with respect to FIG. 1). Load data may be received in real-time (e.g., providing a continuous stream of feedback regarding computational resources that are available across the computing devices). Alternatively, the load data may be received periodically (e.g., at regular, or irregular, time intervals that may be specified by a user).

The load data can be stored (e.g., in memory). In some examples, only the most recent load data is stored, such that as load data is received, older load data is overwritten (e.g., in memory) by new load data. Alternatively, in some examples, load data is stored from a specified duration of time (e.g., the last hour, the last day, the last week, the last month, the last year, or since gaze data first began being received). Generally, such an implementation allows for a history of load data from one or more users to be reviewed for further analysis (e.g., to infer or predict data that may be collected in the future). For example, the history of load data may provide an indication of which computing devices are regularly over-loaded, at what times certain computing devices tend to be over-loaded, or other indications that can be discerned from an analysis of the stored load data.

Still referring to operation 1106, the one or more computing devices (e.g., computing devices 103-108 and/or devices 1004, 1006) may receive gaze data from a plurality of users (e.g., the computing devices may track the orientation of multiple users' eyes, and receive gaze data therefrom). Specifically, the one or more computing devices may track at which device (e.g., computing devices 103-108, and/or devices 1004, 1006) each of the users are looking, and even further, may determine at what each of the users are looking, on the devices (e.g., an application, or some other element being displayed on one or more of the computing devices). The gaze data may be received in real-time (e.g., providing a continuous stream of feedback regarding at what the plurality of users are gazing). Alternatively, the gaze data may be received periodically (e.g., at regular, or irregular, time intervals that may be specified by a user).

Still further, with reference to operation 1106, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At operation 1108, load data is processed to determine resource availability for one or more linked computing devices. For example, the load data may be received by a shared computing component (e.g., the shared computing component 122 discussed with respect to FIG. 1) to determined efficiency of each computing device. Computing devices generally have processors and memory that may relied upon to perform actions on a computer. The resource availability of each computing device can be determined by receiving processor usage data, and/or memory usage data from each of the computing devices, as well as processor capability data, and/or memory capability data from each of the computing devices. A ratio may be calculated between the processor usage data and the processor capability data (e.g., by dividing the former by the latter) to determine how much processor space is available on a computing device with no actions being performed, relative to the load data that was received. Similarly, a ratio may be calculated between the memory usage data and the memory capability data (e.g., by dividing the former by the latter) to determine how much memory space is available on a computing device with no actions being performed, relative to the load data that was received. The ratio may be compared to a predetermined threshold, as will be discussed further below, to determine whether one or more tasks need to be reassigned across computing devices, based on the determined efficiency of each computing device.

At operation 1110, gaze data is processed to determine which of the one or more computing devices is a focal device. Amongst a plurality of computing devices, a focal device may be the device at which a majority of users are found to be looking, amongst a plurality of users. Alternatively, in some examples, a focal device is the device at which a particular user is looking, amongst a plurality of users, when special importance is assigned to the particular user. For example, if a presentation is being given, then the focal device may the device at which the presenter is looking, compared to the device at which any presentation observers may be looking.

At determination 1110, it is determined whether the focal device is above an efficiency threshold. For example, determination 1110 may comprise evaluating the determined efficiency of operation 1108 with respect to an efficiency threshold that is automatically calculated (e.g., based on specifications of a device), or set by a user. The efficiency threshold may be a threshold at which computational performance is reduced based on computational resources being overloaded, on a particular device. In examples, the efficiency threshold may be dynamic. That is, the efficiency threshold may be higher for resource intensive tasks (e.g., video games, high-resolution video, etc.) or lower for tasks that are not resource intensive (e.g., an email application, word processing application, etc.). That is, the efficiency threshold may be dynamically determined based upon the resource requirements for a particular application or task that is in focus.

If it is determined that the focal device is not above the efficiency threshold, flow branches "NO" to operation 1114, where a task is assigned to the focal device. For example, if it is determined that the focal device is not over-loaded with tasks, then the focal device may be assigned a task from another computing device that is over-loaded. Method 1100 may terminate at operation 1114. Alternatively, method 1100 may return to operation 1106, where further load data and gaze data are received from each of the plurality of computing devices. In some examples, operation 1114 may be skipped, and method 1100 may flow directly from operation 1112 to operation 1106, when flow branches "NO".

If however, it is determined that the focal device is above the efficiency threshold, flow instead branches "YES" to operation 1116. At operation 1116, one or more tasks from the focal device are assigned to a different device from the plurality of devices. Generally, a shared computing component may allocate tasks across a plurality of computing devices based on available load capacity. If the focal device is found to be above an efficiency threshold (e.g., based on the above-discussed processor ratio, or memory ratio, focus application or task resource demands, or general resource availability), then the shared computing component may reassign a task from the focal device to a different device (e.g., a device that is below the efficiency threshold).

Further, at operation 1116, unnecessary tasks may be reduced on the different device to which tasks from the focal device are assigned. Generally, it may be beneficial to prioritize tasks that are deemed important, based on user data (e.g., a task running on an application that is currently being gazed at by a user, or a task running on an application that is predicted to be hazed at by user, the prediction being based on historical gaze data).

Operation 1116 may be illustrated with respect to system 1000. For example, brightness may be an unnecessary task on a computing device that is not currently being looked at by a user (e.g., user 1002). Referring specifically to FIG. 10A, when the user 1002 is looking at the first computing device 1004, gaze data may be received by a gaze tracker component (e.g., gaze tracker component 120) to identify that the user is looking at an application (e.g., application 1010) on the first computing device 1004. Accordingly, the shared computing component 122 may receive the identification made by the gaze tracker component 120 to determine how to allocate tasks or execute programs, based on load capacity data, and gaze data. The second computing device 1006 may be determined to have one or more unnecessary tasks being run (e.g., high brightness) that are reduced to make available computational resources for higher priority tasks (e.g., tasks being run on the first computing device 1004).

Figure 12A:
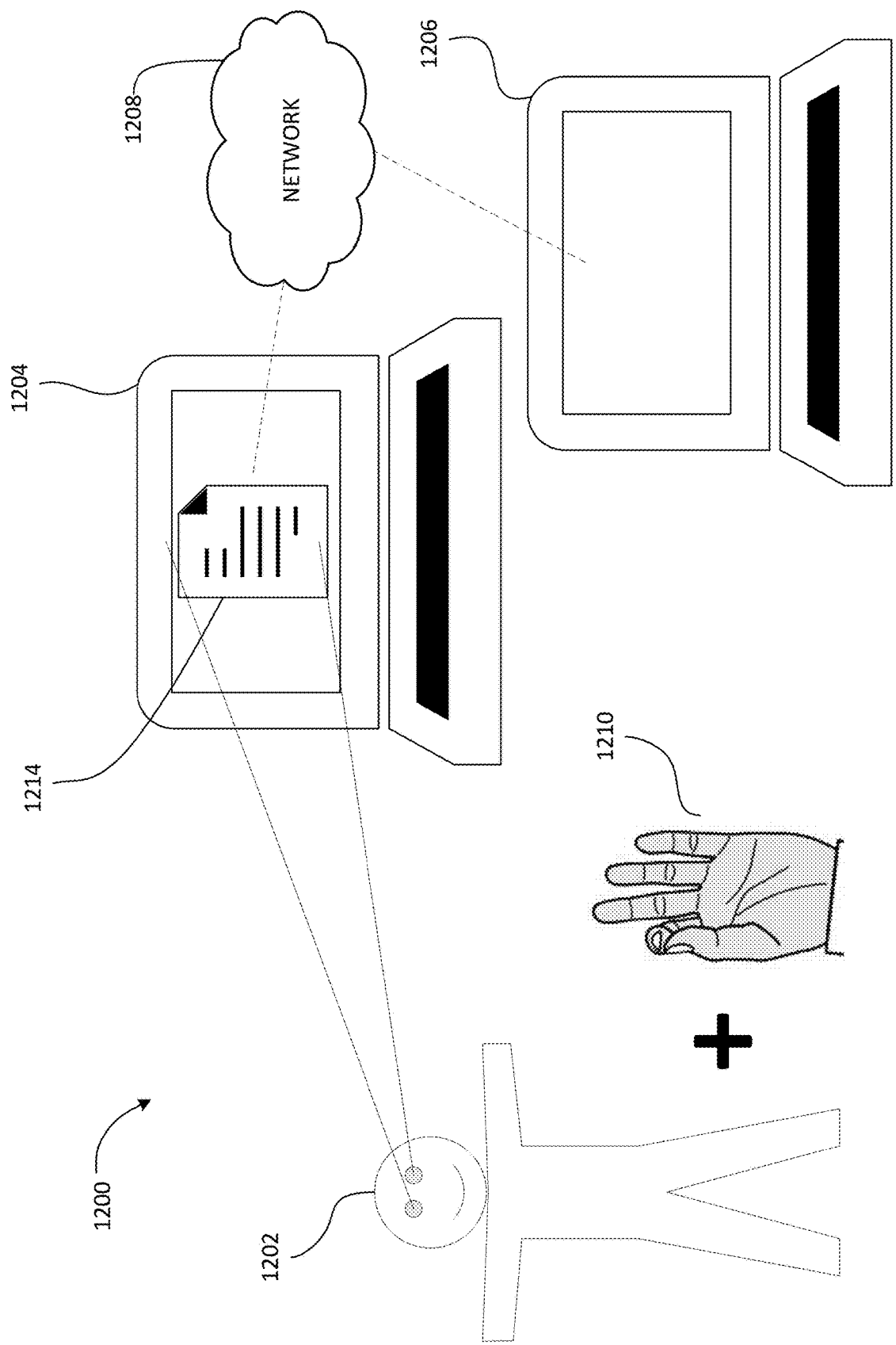
FIG. 12A illustrates an example system for multi-device gaze tracking according to aspects described herein.
Figure 12B:
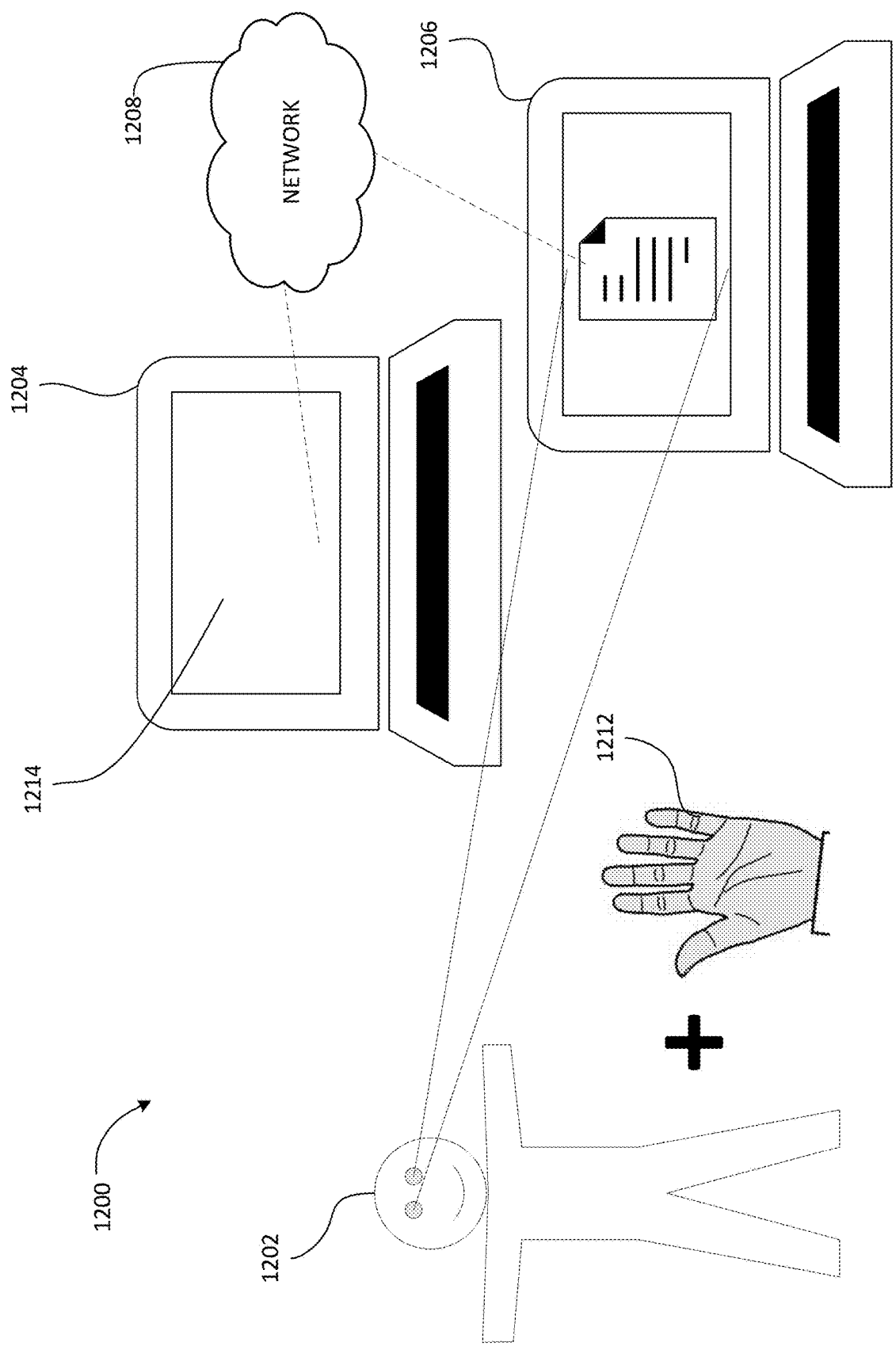
FIG. 12B illustrates an example system for multi-device gaze tracking according to aspects described herein.

FIGS. 12A and 12B illustrates an example system 1200 for multi-device gaze tracking according to aspects described herein. System 1200 includes a user 1202, and a plurality of computing devices, for example, a first computing device 1204 and a second computing device 1206. The plurality of computing devices 1204, 1206 are in communication via a network 1208. The plurality of computing devices 1204, 1206 may be similar to devices 103-108 discussed earlier herein with respect to FIG. 1. Further, the network 1208 may be similar to the network 110 discussed earlier herein with respect to FIG. 1.

The system 1200 may further include a first gesture 1210 (see FIG. 12A) and a second gesture 1212 (see FIG. 12B). The gestures 1210, 1212 may be gestures that the user 1202 makes with their hand. For example, the gestures 1210, 1212 may be a wave gesture, a pinch gesture, a first gesture, an open hand gesture, a blink gesture, a wink gesture, an eye-dwell, a snap gesture, a click gesture, a clap gesture, or similar gestures that are pre-configured to serve a function in system 1200. In some examples, user inputs, such as a voice input or a switch input, may be used in combination with, or independent of, gestures (e.g., gestures 1210, 1212) to adapt a computing device to perform a desired action. The gestures 1210, 1212 may be detected by the computing devices 1204, 1206, for example via a sensor (e.g., a camera, an RGB sensor, an infrared sensor, a LiDAR sensor, a motion sensor, or any other type of sensor that is capable of recognizing a gesture made by a user).

The first computing device 1204 may include a plurality of applications running thereon. For example, the first computing device 1204 may include a word processing application 1214. Additionally, or alternatively, the second computing device 1206 may include a plurality of applications running thereon (not shown). It should be recognized that the application 1212 may be any of a plurality of applications, or software programs that provide some visual display at which a user can gaze. Examples of such applications, elements, or computer programs include, but are not limited to, word processors, graphics software, database software, spreadsheet software, web browsers, enterprise software, information worker software, multimedia software, presentation software, education software, content access software, communication software, etc.

Mechanisms described herein provide users (e.g., user 1202) with the ability to transfer applications between computing devices by using a combination of their gaze, and a gesture. The computing devices 1204, 1206 may receive gaze data corresponding to the user 1202, and gesture data corresponding to the gesture 1210 and/or or gesture 1212. Referring specifically to FIG. 12A, the user 1202 is shown to be looking at the word processing application 1212 on the first computing device 1204, while also making the first gesture 1210 (e.g., a pinching gesture with a hand). According to mechanisms described herein, the word processing application 1210 is selected on the first computing device 1204. Then, referring to FIG. 12B, the user 1202 is shown to be looking at the second computing device 1206, and making the second gesture 1212 (e.g., a drop or release gesture with a hand). Accordingly, the word processing application 1212 is transferred to the second computing device 1206, and de-selected by the user 1202.

In some examples, an application (e.g., word processing application 1212) can be fully transferred or fully migrated from a first computing device (e.g., first computing device 1204) to a second computing device (e.g., second computing device 1206). In other examples, partial components of the application can be migrated from the first computing device to the second computing device. For example, with a word processing application that is running on a first computing device, typographical preferences (e.g., bolding, italicizing, fonts, colors, etc.) may be displayed on a second computing device. As another example, with a paint application that is running on a first computing device (e.g., a laptop), the color palette could be migrated to a second computing device (e.g., a smartphone, a smartwatch, or a tablet). In such an example, the user may be able to use the second computing device to select colors (e.g., with their finger, a stylus, or an input device), and then draw on a canvas displayed on the first computing device, using the selected colors. This enables the user to select paints and draw in a manner that is similar to the real world (e.g., picking paints from a palette, and drawing on a canvas). Other examples that mimic how a user engages in activities.

While the example of FIGS. 12A and 12B is shown to include a single application being transferred across computing devices, it is also contemplated that multiple applications can be transferred across computing devices (e.g., devices 1204 and/or 1206) using gaze data and gesture data. Furthermore, while the example of FIGS. 12A and 12B is shown to include only a single user (e.g., user 1202), it is also contemplated that computing device 1204 and/or 1206 can receive gaze data and gesture data from a plurality of users, as will be discussed further herein with respect to method 1300.

Figure 13:
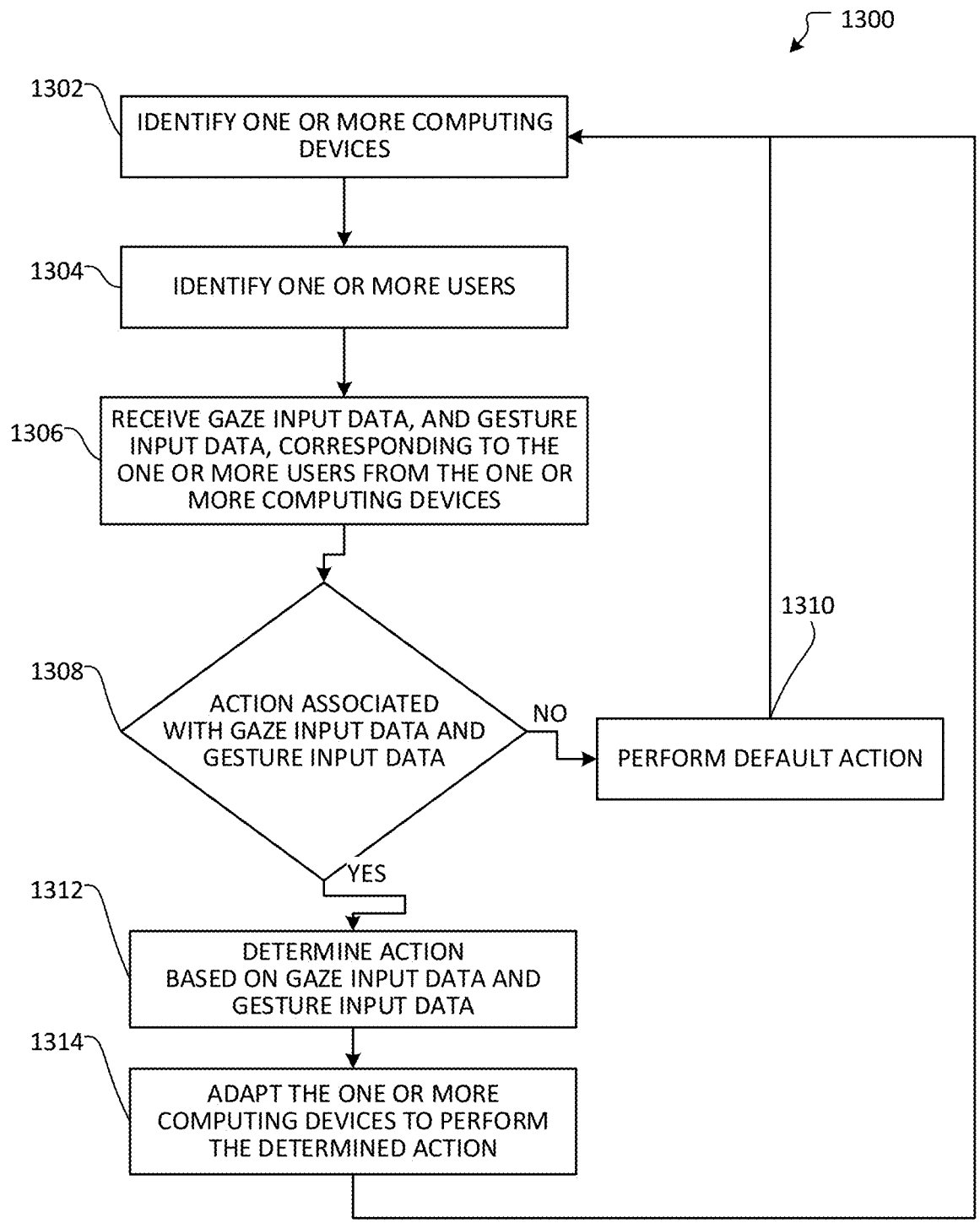
FIG. 13 illustrates an overview of an example method for processing gaze input data to perform an action to affect computing device behavior.

FIG. 13 illustrates an overview of an example method 1300 for processing gaze input data to perform an action to affect computing device behavior. In accordance with some examples, aspects of method 1300 are performed by a device, such as computing device 103, computing device 104, peripheral device 106, or peripheral device 108 discussed above with respect to FIG. 1.

Method 1300 begins at operation 1302, where one or more computing devices are identified. For example, a user may link one or more devices (e.g., devices 103-108, and/or devices 1204, 1206) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices that are linked together, to be identified by method 1300 to identify the devices at operation 1302. Additionally, or alternatively, a network (e.g., network 1208) may be configured to automatically identify one or more devices that are connected to the network. In yet another example, a network (e.g., network 1208) may be configured to detect computing devices within a specified geographic proximity.

At operation 1304, one or more users are identified. The one or more users may be identified by one or more computing devices (e.g., device 103-106, and/or devices 1204, 1206). Specifically, the one or more computing devices may receive visual data from a sensor (e.g., a camera) to identify one or more users (e.g., user 1202). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 1304, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 1304, the one or more users may be identified using a radio frequency identification tag (RFID), an ID badge, a bar code, a QR code, or some other means of identification that is capable of identifying a user via some technological interface.

Additionally, or alternatively, at operation 1304, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 1306, gaze input data, and gesture input data, is received, from the one or more computing devices (e.g., computing devices 103-108, and/or computing devices 1204, 1206) that corresponds to the one or more users (e.g., user 1202). Once the one or more users are identified at 1304, the method 1300 may monitor the orientation of a user's eyes to determine their gaze, and thereby receive gaze input data. Such gaze input data can provide an indication to a multi-device gaze tracking system (e.g., system 1200 discussed above with respect to FIGS. 12A and 12B) of where a user may be looking relative to a display screen (e.g., a display screen of devices 1204 and/or 1206). Further, once the one or more users are identified at 1304, the method 1300 may monitor a user's hands, wrists, or other body parts to determine gestures, and thereby receive gesture input data.

Still referring to operation 1306, the one or more computing devices (e.g., computing devices 103-108, and/or computing devices 1204, 1206) may receive gaze input data from a plurality of users (e.g., the computing devices may track the orientation of multiple users' eyes and receive gaze data therefrom). Additionally, the one or more computing devices (e.g., computing devices 103-108, and/or computing devices 1204, 1206) may receive gesture input data from a plurality of users (e.g., the computing devices may track the orientation of multiple users' bodies, and receive gaze data therefrom). Specifically, the one or more computing devices may track at which device (e.g., computing devices 103-108, and/or computing devices 1204, 1206) each of the users are looking, and even further, may determine at what each of the users are looking, on the devices (e.g., an application, or some other element being displayed on one or more of the computing devices). Further, the one or more computing devices may monitor parts of a user's body (e.g., hands, wrist, arms) to determine when specific gestures are being performed by a user.

The gaze input data may be received in real-time (e.g., providing a continuous stream of feedback regarding at what the plurality of users are gazing). Alternatively, the gaze input data may be received periodically (e.g., at regular, or irregular, time intervals that may be specified by a user). Further, the gesture input data may be received in real-time (e.g., providing a continuous stream of feedback regarding configurations of a user's body parts). Alternatively, the gesture input data may be received periodically (e.g., at regular, or irregular, time intervals that may be specified by a user).

Still further, with reference to operation 1306, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

Similarly, with reference to operation 1306, the gesture data can be stored (e.g., in memory). In some examples, only the most recent gesture data is stored, such that as gesture data is received, older gesture data is overwritten (e.g., in memory) by new gesture data. Alternatively, in some examples, gesture data is stored from a specified duration of time (e.g., the last hour, the last day, the last week, the last month, the last year, or since gaze data first began being received). Generally, such an implementation allows for a history of gesture data from one or more users to be reviewed for further analysis (e.g., to infer or predict data that may be collected in the future).

In some examples, users may perform a series of gestures (as illustrated in FIGS. 12A and 12B). Accordingly, gesture data may be stored across specified durations of time such that the series of gestures (e.g., gesture 1210 to gesture 1212) can be recognized by systems disclosed herein (e.g., system 1200).

At determination 1308, it is determined whether there is an action associated with the gaze input data and the gesture input data. For example, determination 1308 may comprise evaluating the received gaze input data, and gesture input data, to generate sets of user signals, which may be processed in view of an environmental context (e.g., applications currently being run on a device, or tasks currently being executed). Accordingly, the evaluation may identify an application, or a task, as a result of an association between the gaze input data, the gesture input data, and the environmental context.

In some examples, at determination 1308, it is determined, for each user, whether there is an action associated with the gaze input data, and the gesture input data, corresponding to that user. For example, determination 1308 may comprise evaluating the received gaze input data to generate one or more sets of user signals, wherein each of the user signals correspond to one of the plurality of users. The user signals may be processed in view of an environmental context (e.g., applications currently being run on a device, or tasks currently being executed). Accordingly, the evaluation may identify one or more actions as a result of an association between the gaze input data, and the gesture input data, for each user, as well as the environmental context. It should be recognized that there may be different actions identified for each user, based on differed gaze input data (e.g., different users looking at different computing devices) and different gesture input data (e.g., different users making different configurations with their hands). Alternatively, there may be the same actions identified for each user, based on the same gaze input data (e.g., different users looking at the same computing device), and the same gesture input data (e.g., different users making the same configurations with their hands).

If it is determined that there is not an application associated with the gaze input data and the gesture input data, flow branches "NO" to operation 1310, where a default action is performed. For example, the gaze input data and the gesture input data may have an associated pre-determined action. In some other examples, the method 1300 may comprise determining whether the gaze input data and the gesture input data have an associated default action, such that, in some instances, no action may be performed as a result of the received gaze input data and gesture input data. Method 1300 may terminate at operation 1310. Alternatively, method 1300 may return to operation 1302, from operation 1310, to create a continuous feedback loop of receiving gaze and gesture input data and executing a command based on the gaze and gesture input data.

If however, it is determined that there is a gaze command associated with the received gaze input data, flow instead branches "YES" to operation 1312, where an action is determined based on the gaze and gesture input data. For example, referring to FIGS. 12A and 12B, when the user 1202 gazes at the word processing application 1214 on the first computing device 1204, and performs a first gesture (e.g., gesture 1210), the application 1214 is selected. Then, when the user 1202 shifts their gaze to the second computing device 1206, and performs a second gesture (e.g., gesture 1212), then the application is transferred from the first computing device 1204 to the second computing device 1206. Such a sequence of gesture as shown in FIGS. 12A and 12B may be referred to as a "pinch and drop" sequence, wherein a pinch hand gesture selects an application on a first computing device, and a drop hand gesture releases the application on a second computing device.

Flow progresses to operation 1314, where the one or more computing devices are adapted to perform the determined action. In some examples, the one or more computing devices may be adapted to perform the determined action by the computing device at which method 1300 was performed. In another example, an indication of the determined action may be provided to another computing device. For example, aspects of method 1300 may be performed by a peripheral device, such that operation 1314 comprises providing an input to an associated computing device. As another example, operation 1314 may comprise using an application programming interface (API) call to perform the determined action (e.g., to transfer an application from a first computing device to a second computing device). Method 1300 may terminate at operation 1314. Alternatively, method 1300 may return to operation 1302, from operation 1314 to create a continuous feedback loop of receiving gaze and gesture input data and adapting one or more computing devices to perform an associated action.

It should be recognized that while the method described herein references a multi-device configuration, similar operations may be performed on a single-device configuration. For example, a user may move an application from one portion of a display screen to a second portion of the display screen, as opposed to transferring the application across computing devices (as was described with regard to FIGS. 12A and 12B).

Figure 14:
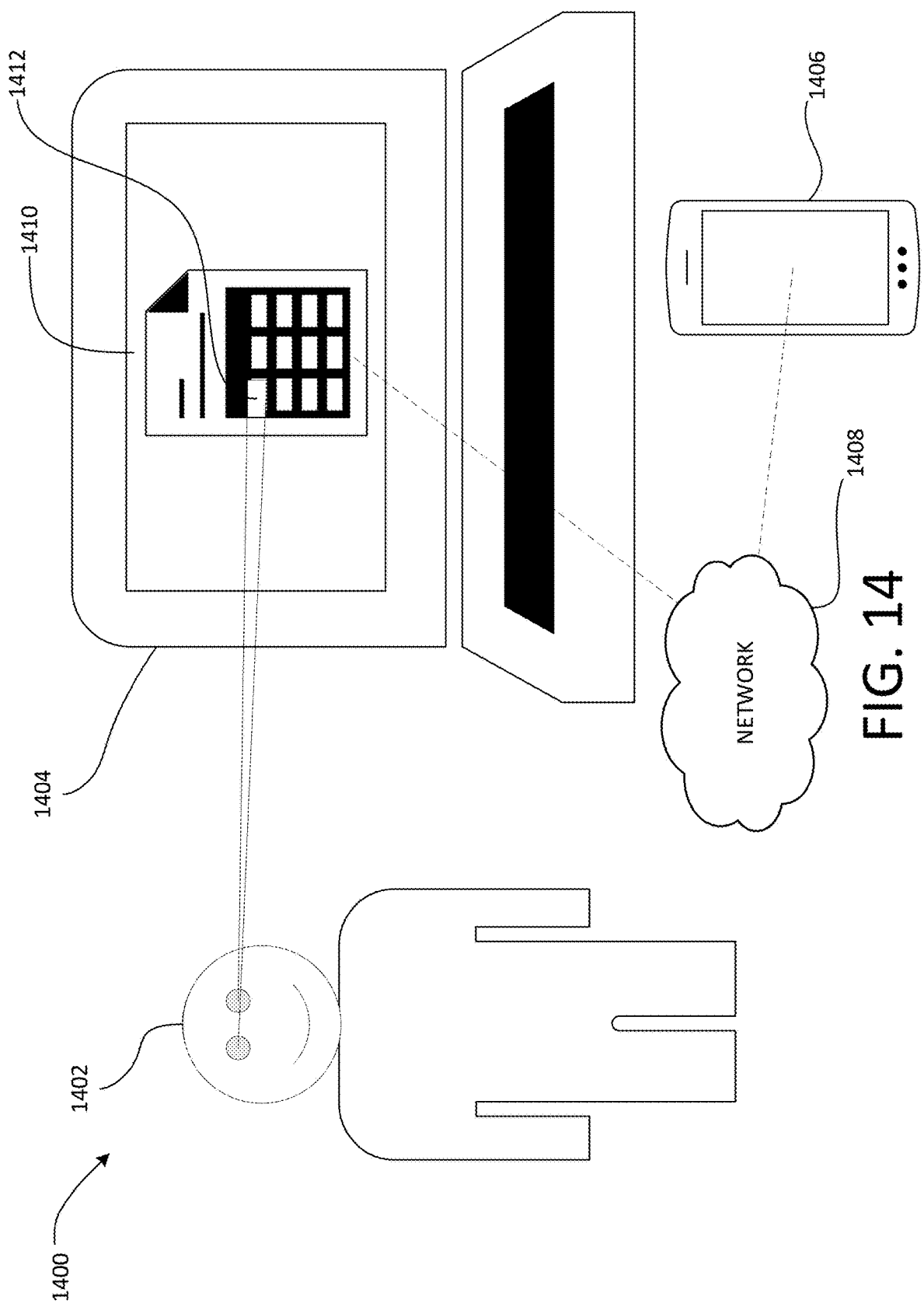
FIG. 14 illustrates an example system for gaze tracking according to aspects described herein.

FIG. 14 illustrates an example system 1400 for gaze tracking according to aspects described herein. System 1400 includes a user 1402, and a plurality of computing devices, such as a first computing device 1404, and a second computing device 1406. The plurality of computing devices 1404, 1406 are in communication via a network 1408. The plurality of computing devices 1404, 1406 may be similar to devices 103-108 discussed earlier herein with respect to FIG. 1. Further, the network 1408 may be similar to the network 110 discussed earlier herein with respect to FIG. 1.

The first computing device 1404 may include a plurality of applications running thereon. For example, the first computing device 1404 may include a spreadsheet application 1410 running thereon. The second computing device 1406 may include a plurality of applications running thereon (not shown). It should be recognized that the applications 1410 may be any of a plurality of applications, or software programs that provide some visual display at which a user can gaze. Examples of such applications, or computer programs include, but are not limited to, word processors, graphics software, database software, spreadsheet software, web browsers, enterprise software, information worker software, multimedia software, presentation software, education software, content access software, communication software, etc.

Mechanisms described herein provide users the opportunity to select, or focus on, a specific element (e.g., cell, file, folder, button, text-box, String variable, etc.) on a computing device, based on where one or more users (e.g., user 1402) are looking. Referring to FIG. 14, the user 1402 is shown to be looking at an element 1412 on the computing device 1404. In the specific example of system 1400, the element 1412 is a cell of the spreadsheet application 1410. By looking at the cell 1412, the user 1402 is able to select the cell 1412 on the spreadsheet application 1410, such that further actions (e.g., typing) may be performed. Additionally, or alternatively, in some examples, a user may look at a specific file on a computing device to open the file, and/or look at a specific title of a file to receive the option to change the name of the file, and/or look at a specific button of an application to change a state of the button (e.g., from not pressed to pressed), and/or look at a specific location to move a mouse cursor to the location, and/or look at a String variable to highlight the String variable, etc.

Figure 15:
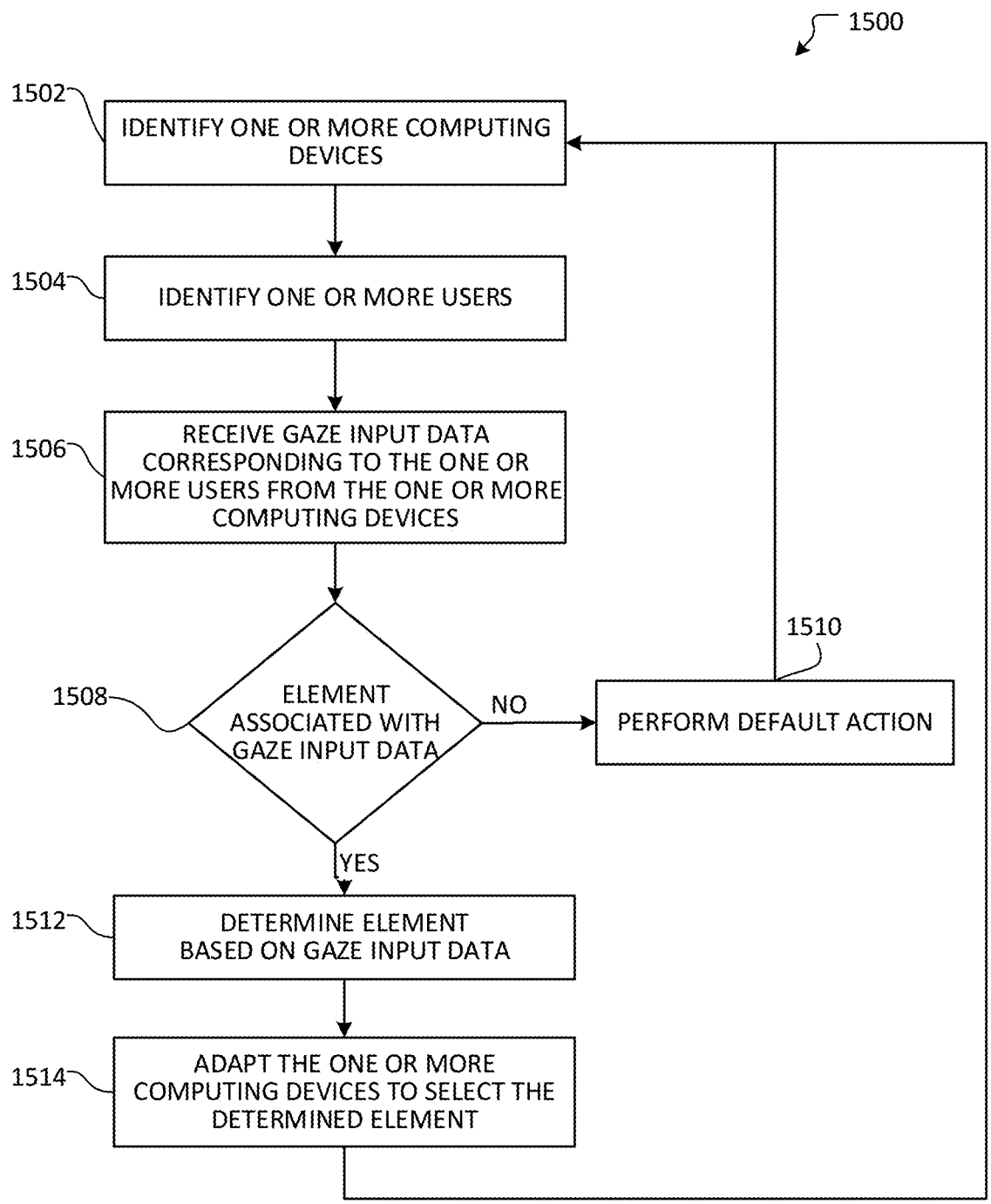
FIG. 15 illustrates an overview of an example method for processing gaze input data to perform an action to affect computing device behavior.

FIG. 15 illustrates an overview of an example method 1500 for processing gaze input data to perform an action to affect computing device behavior. In accordance with some examples, aspects of method 1500 are performed by a device, such as computing device 103, computing device 104, peripheral device 106, or peripheral device 108 discussed above with respect to FIG. 1.

Method 1500 begins at operation 1502, where one or more computing devices are identified. For example, a user may link one or more devices (e.g., devices 103-108) using any communication means discussed above, with respect to FIG. 1. The user may then manually select one or more devices that are linked together, to be identified by method 1500. Additionally, or alternatively, a network (e.g., network 1408) may be configured to automatically identify one or more devices that are connected to the network. In yet another example, a network (e.g., network 1408) may be configured to detect computing devices within a specified geographic proximity.

At operation 1504, one or more users are identified. The one or more users may be identified by one or more computing devices (e.g., device 103-106, and/or devices 1404, 1406). Specifically, the one or more computing devices may receive visual data from a sensor (e.g., a camera) to identify one or more users (e.g., user 1402). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 1504, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 1504, the one or more users may be identified using a radio frequency identification tag (RFID), an ID badge, a bar code, a QR code, or some other means of identification that is capable of identifying a user via some technological interface.

Additionally, or alternatively, at operation 1504, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 1506, gaze input data is received, from the one or more computing devices (e.g., computing devices 103-108, and/or computing devices 1404, 1406) that corresponds to the one or more users (e.g., user 1402). Once the one or more users are identified at 1504, the method 1500 may monitor the orientation of a user's eyes to determine their gaze, and thereby receive gaze input data. Such gaze input data can provide an indication to a multi-device gaze tracking system (e.g., system 1400 discussed above with respect to FIG. 14) of where a user may be looking relative to a display screen (e.g., a display screen of devices 1404 and/or 1406).

Still referring to operation 1506, the one or more computing devices (e.g., computing devices 103-108, and/or computing devices 1404, 1406) may receive gaze data from a plurality of users (e.g., the computing devices may track the orientation of multiple users' eyes, and receive gaze data therefrom). Specifically, the one or more computing devices may track at which device (e.g., computing devices 103-108, and/or computing devices 1404, 1406) each of the users are looking, and even further, may determine at what each of the users are looking, on the devices (e.g., an element being displayed on one or more of the computing devices, such as a cell, file, button, text-box, String variable, etc.). The gaze data may be received in real-time (e.g., providing a continuous stream of feedback regarding at what the plurality of users are gazing). Alternatively, the gaze data may be received periodically (e.g., at regular, or irregular, time intervals that may be specified by a user).

Still further, with reference to operation 1506, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At determination 1508, it is determined whether there is an element associated with the gaze input data. For example, determination 1508 may comprise evaluating the received gaze input data to generate a set of user signals, which may be processed in view of an environmental context (e.g., applications, currently being run on a device, or tasks currently being executed, and specific elements being displayed therewith). Accordingly, the evaluation may identify an element as a result of an association between the gaze input data and the environmental context.

In some examples, at determination 1508, it is determined, for each user, whether there is an element associated with the gaze input data corresponding to that user. For example, determination 1508 may comprise evaluating the received gaze input data to generate a set of user signals, wherein each of the user signals correspond to one of the plurality of users. The user signals may be processed in view of an environmental context (e.g., applications currently being run on a device, or tasks currently being executed, and specific elements being displayed therewith). Accordingly, the evaluation may identify one or more elements as a result of an association between the gaze input data for each user and the environmental context. It should be recognized that there may be different elements identified for each user, based on differed gaze input data (e.g., different users looking at different computing devices). Alternatively, there may be the same elements identified for each user, based on the same gaze input data (e.g., different users looking at the same computing device).

If it is determined that there is not an element associated with the gaze input data, flow branches "NO" to operation 1510, where a default action is performed. For example, the gaze input data may have an associated pre-determined element. In some other examples, the operation 1500 may comprise determining whether the gaze input data has an associated default element, such that, in some instances, no action may be performed as a result of the received gaze input data. Method 1500 may terminate at operation 1510. Alternatively, method 1510 may return to operation 1502, from operation 1510, to create a continuous feedback loop of gaze input data and selecting elements for a user.

If however, it is determined that there is a gaze command associated with the received gaze input data, flow instead branches "YES" to operation 1512, where an element is determined based on the gaze input data. For example, referring to FIG. 14, when the user 1402 gazes at the cell 1412 (e.g., a type of element) of the spreadsheet application 1410, it is determined that the user is gazing at the cell 1412 of the spreadsheet application 1410. In other examples, if a user gazes at a text box in a search engine, it may be determined that the user is gazing at the text box of the search engine, and therefore may desire to search something. In other examples, if a user gazes at the title of a document, it may be determined that the user is gazing at the title of the document, and therefore may desire to edit the title of the document.

Flow progresses to operation 1514, where the one or more computing devices are adapted to select the determined element. Alternatively, in some examples the one or more computing devices may be adapted to focus on the determined element, or to change a state of the determined element. For example, the determined element may be selected, focused on, and/or changed state by the computing device at which method 1500 was performed. In another example, an indication of the determined element may be provided to another computing device. For example, aspects of method 1500 may be performed by a peripheral device, such that operation 1514 comprises providing an input to an associated computing device. As another example, operation 1514 may comprise using an application programming interface (API) call to adapt the one or more computing devices to select, focus on, and/or change state of the determined element. Method 1500 may terminate at operation 1514. Alternatively, method 1500 may return to operation 1502, from operation 1514, to create a continuous feedback loop of gaze input data and selecting, focusing on, or changing a state of an element on a computing device.

Figure 16A:
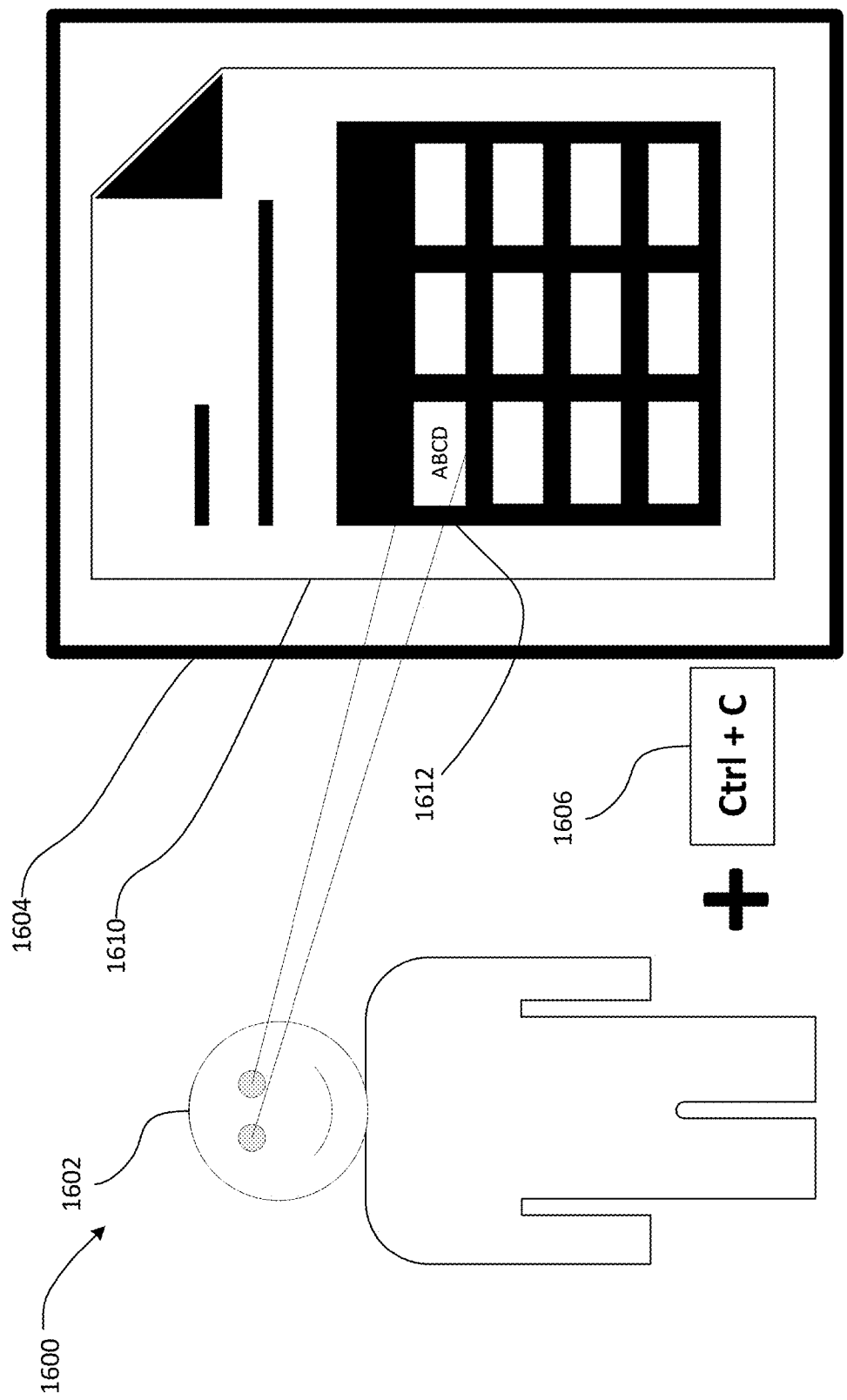
FIG. 16A illustrates an example system for multi-device gaze tracking according to aspects described herein.
Figure 16B:
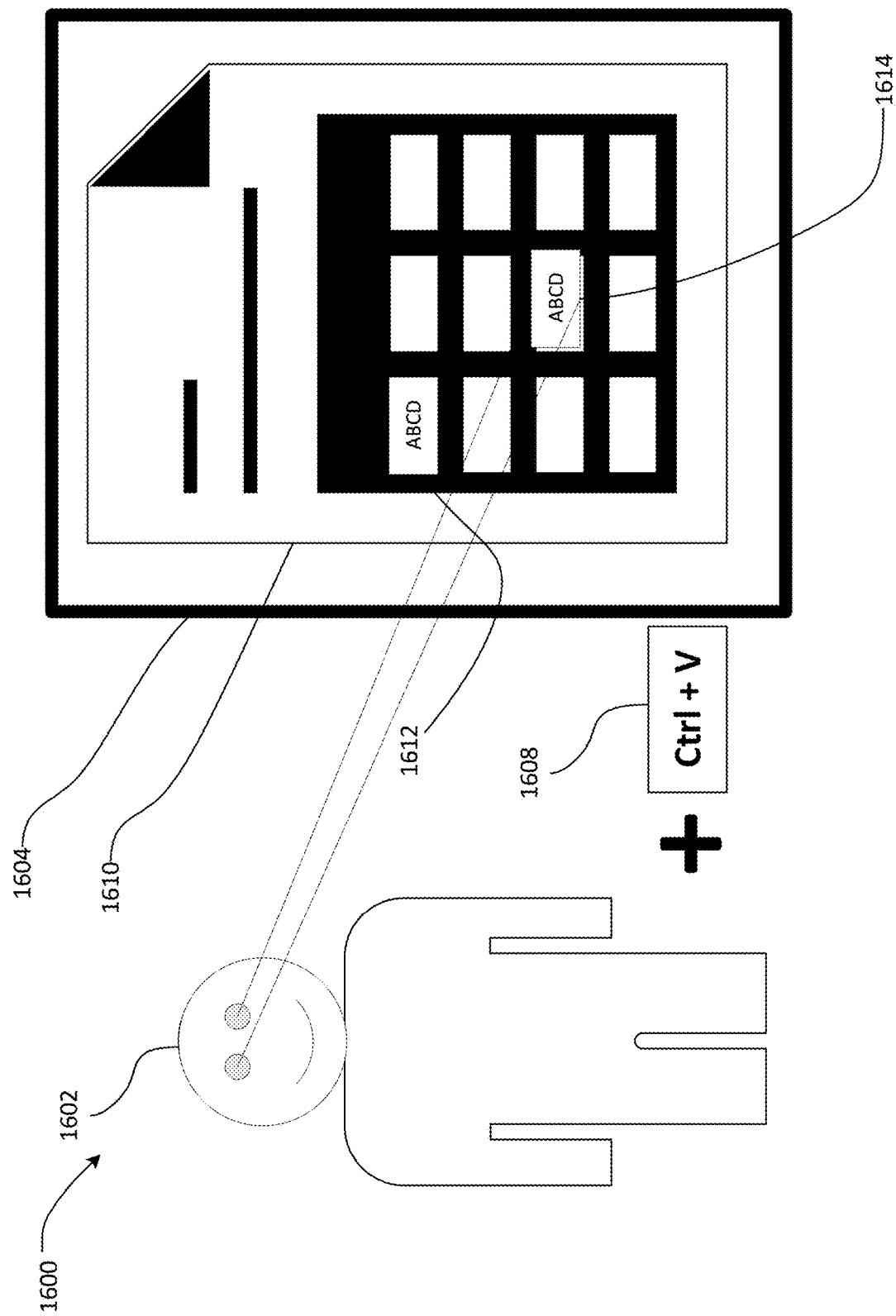
FIG. 16B illustrates an example system for multi-device gaze tracking according to aspects described herein.

FIGS. 16A and 16B illustrates an example system 1600 for multi-device gaze tracking according to aspects described herein. System 1600 includes a user 1602, and one or more computing devices 1604. System 1600 further includes a first user-interface input 1606, and a second user-interface input 1608 (e.g., such as inputs that may be received from a keyboard, or touchpad, that receives key stroke inputs from a user).

The first computing device 1604 may include a plurality of applications running thereon. For example, the computing device 1604 may include a spreadsheet application 1610 running thereon. It should be recognized that the application 1610 may be any of a plurality of applications, or software programs that provide some visual display at which a user can gaze. Examples of such applications, or computer programs include, but are not limited to, word processors, graphics software, database software, spreadsheet software, web browsers, enterprise software, information worker software, multimedia software, presentation software, education software, content access software, communication software, etc.

Mechanisms described herein provide users with the ability to perform an action based on where one or more users (e.g., user 1602) are looking, in addition to user interface data received from one or more computing devices.

For example, referring to FIG. 16A, the user 1602 looks at a first cell or element 1612 of the spreadsheet application 1610, while also entering the first user-interface input 1606 (e.g., copy or "Ctrl+C"). Then, referring to FIG. 16B, the user 1602 looks at a second cell or element 1614 of the spreadsheet application 1610, while also, subsequently, or previously entering the second user-interface input 1608 (e.g., paste or "Ctrl+V"). Therefore, a user may perform a copy and paste command using gaze data and user-interface data.

It should be recognized that a user may perform other keyboard commands, based on a plethora of keyboard short-cuts known to those of ordinary skill in the art, in combination with gaze data, based on where a user is looking on a display screen of a computing device. Further, while the first and second user-interface inputs 1606, 1608 are discussed above to be keyboard inputs, it is possible that the first and second user-interface inputs 1606, 1608 are any of a variety of user-interface inputs that are not keyboard specific. For example, on computing devices with touch-screens, the first and second user-interface inputs 1606, 1608 may be variations of touch commands (e.g., a long press on a display screen to perform a copy operation, a short press on a display screen to perform a paste operation, etc.). As another example, the first and second user-interface inputs 1606, 1608 may be voice inputs (e.g., vocally instructing a voice command module to perform a copy operation, vocally instructing a voice command module to perform a paste operation, etc.). As another example, the first and second user-interface inputs 1606, 1608 may be gaze commands (e.g., a long gaze to perform a copy operation, a short gaze to perform a paste operation, etc.). As another example, the first and second user-interface inputs 1606, 1608 may be inputs from peripheral devices (e.g., stepping onto or off of a foot pedal, or pressing on a display of a peripheral computing device, etc.).

Figure 17A:
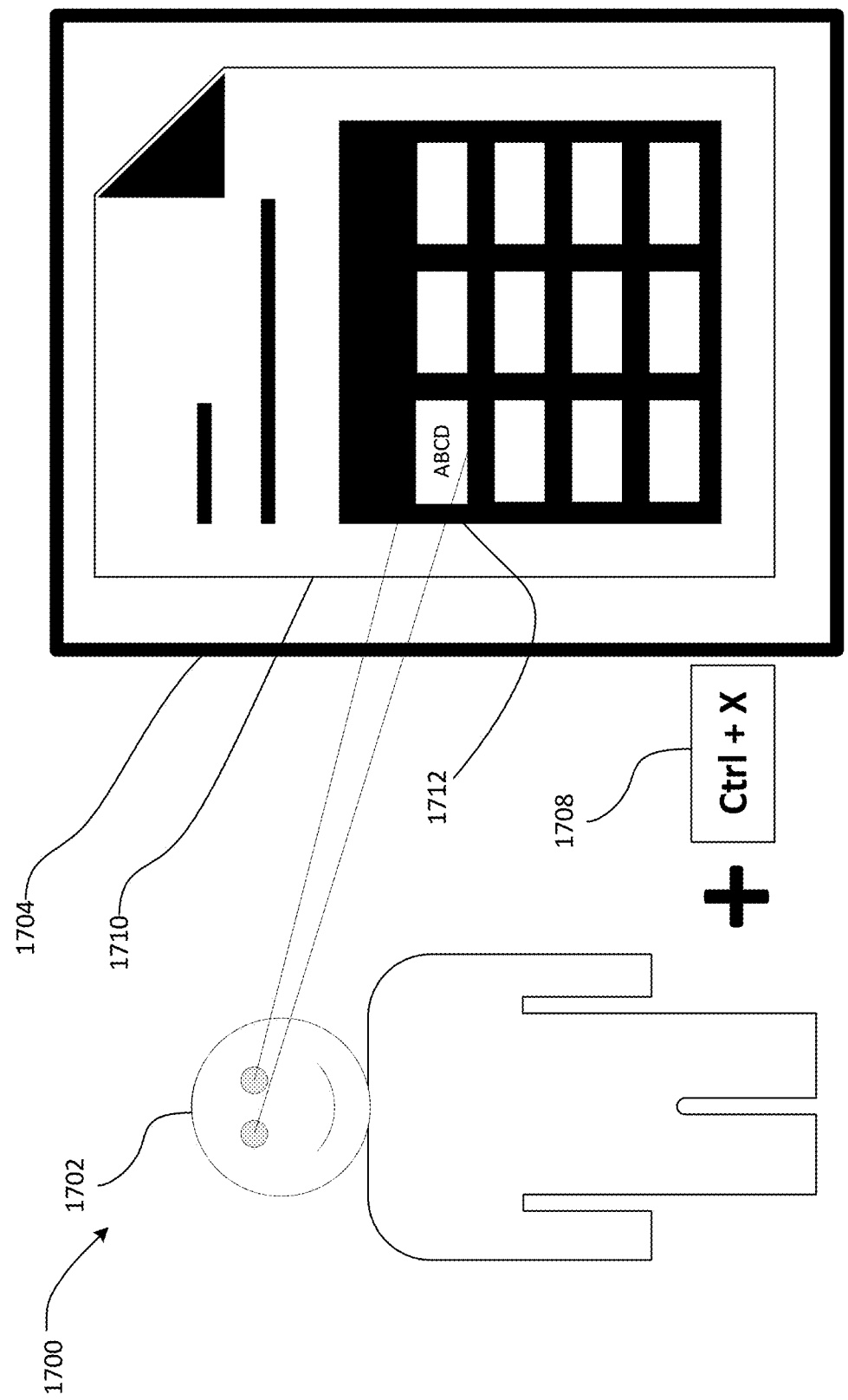
FIG. 17A illustrates an example system for multi-device gaze tracking according to aspects described herein.
Figure 17B:
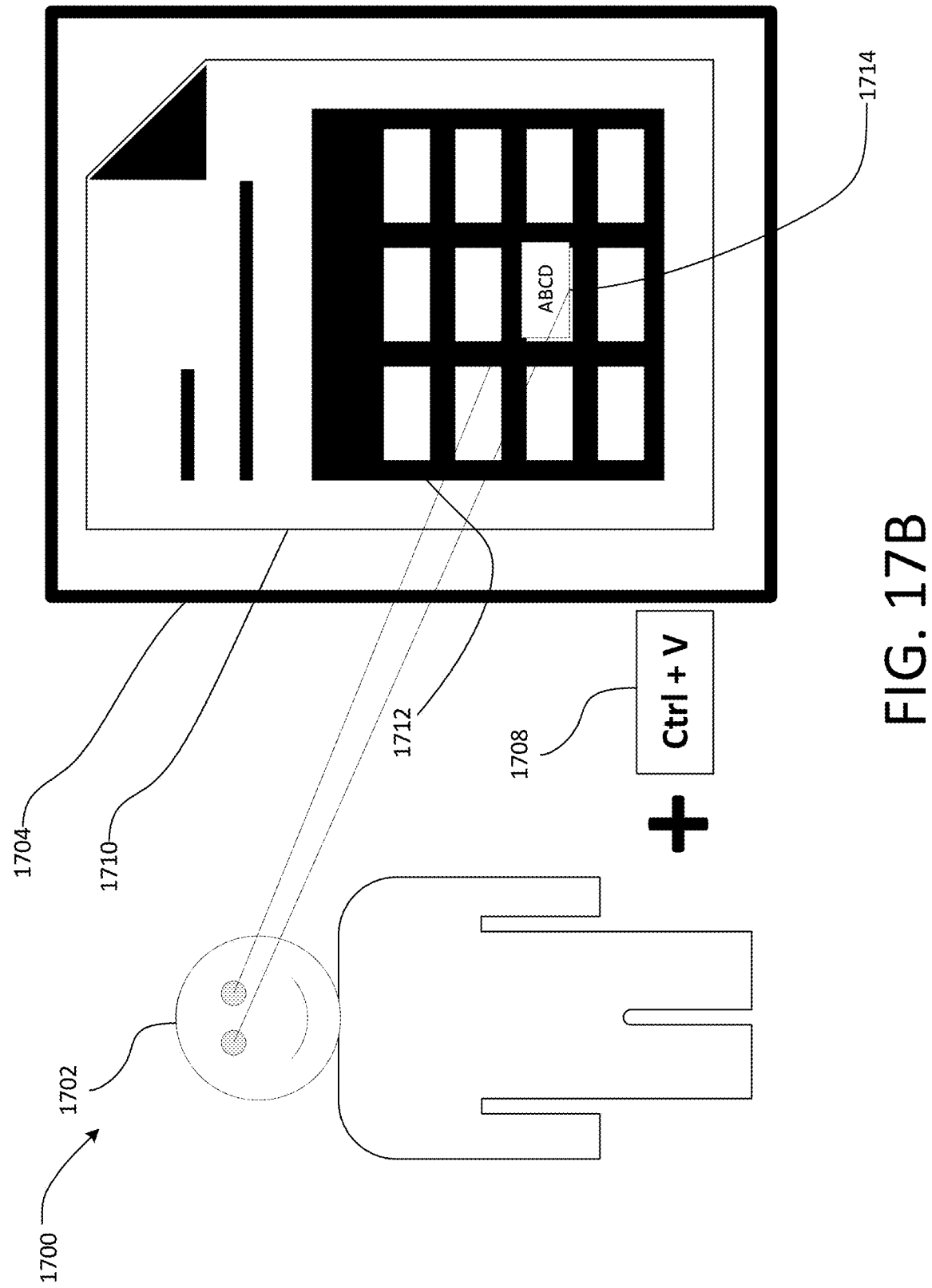
FIG. 17B illustrates an example system for multi-device gaze tracking according to aspects described herein.

FIGS. 17A and 17B illustrates an example system 1700 for multi-device gaze tracking according to aspects described herein. System 1700 includes a user 1702, and one or more computing devices 1704. System 1700 further includes a first user-interface input 1706, and a second user-interface input 1708 (e.g., such as inputs that may be received from a keyboard, or touchpad, that receives key stroke inputs from a user).

The first computing device 1704 may include a plurality of applications running thereon. For example, the computing device 1704 may include a spreadsheet application 1710 running thereon. It should be recognized that the application 1710 may be any of a plurality of applications, or software programs that provide some visual display at which a user can gaze. Examples of such applications, or computer programs include, but are not limited to, word processors, graphics software, database software, spreadsheet software, web browsers, enterprise software, information worker software, multimedia software, presentation software, education software, content access software, communication software, etc.

Mechanisms described herein provide users with the ability to perform an action based on where one or more users (e.g., user 1702) are looking, in addition to user interface data received from one or more computing devices. For example, referring to FIG. 17A, the user 1702 looks at a first cell or element 1712 of the spreadsheet application 1710, while also, subsequently, or previously entering the first user-interface input 1706 (e.g., cut or "Ctrl+X"). Then, referring to FIG. 17B, the user 1702 looks at a second cell or element 1714 of the spreadsheet application 1710, while also entering the second user-interface input 1708 (e.g., paste or "Ctrl+V"). Therefore, a user may perform a cut and paste command using gaze data and user-interface data.

It should be recognized that a user may perform other keyboard commands, based on a plethora of keyboard short-cuts known to those of ordinary skill in the art, in combination with gaze data, based on where a user is looking on a display screen of a computing device. Further, while the first and second user-interface inputs 1706, 1708 are discussed above to be keyboard inputs, it is possible that the first and second user-interface inputs 1706, 1708 are any of a variety of user-interface inputs that are not keyboard specific. For example, on computing devices with a touch-screens, the first and second user-interface inputs 1706, 1708 may be variations of touch commands (e.g., a long press on a display screen to perform a cut operation, a short press on a display screen to perform a paste operation, etc.). As another example, the first and second user-interface inputs 1706, 1708 may be voice inputs (e.g., vocally instructing a voice command module to perform a cut operation, vocally instructing a voice command module to perform a paste operation, etc.). As another example, the first and second user-interface inputs 1706, 1708 may be gaze commands (e.g., a long gaze to perform a cut operation, a short gaze to perform a paste operation, etc.). As another example, the first and second user-interface inputs 1706, 1708 may be inputs from peripheral devices (e.g., stepping onto or off of a foot pedal, or pressing on a display of a peripheral computing device, etc.).

Figure 18:
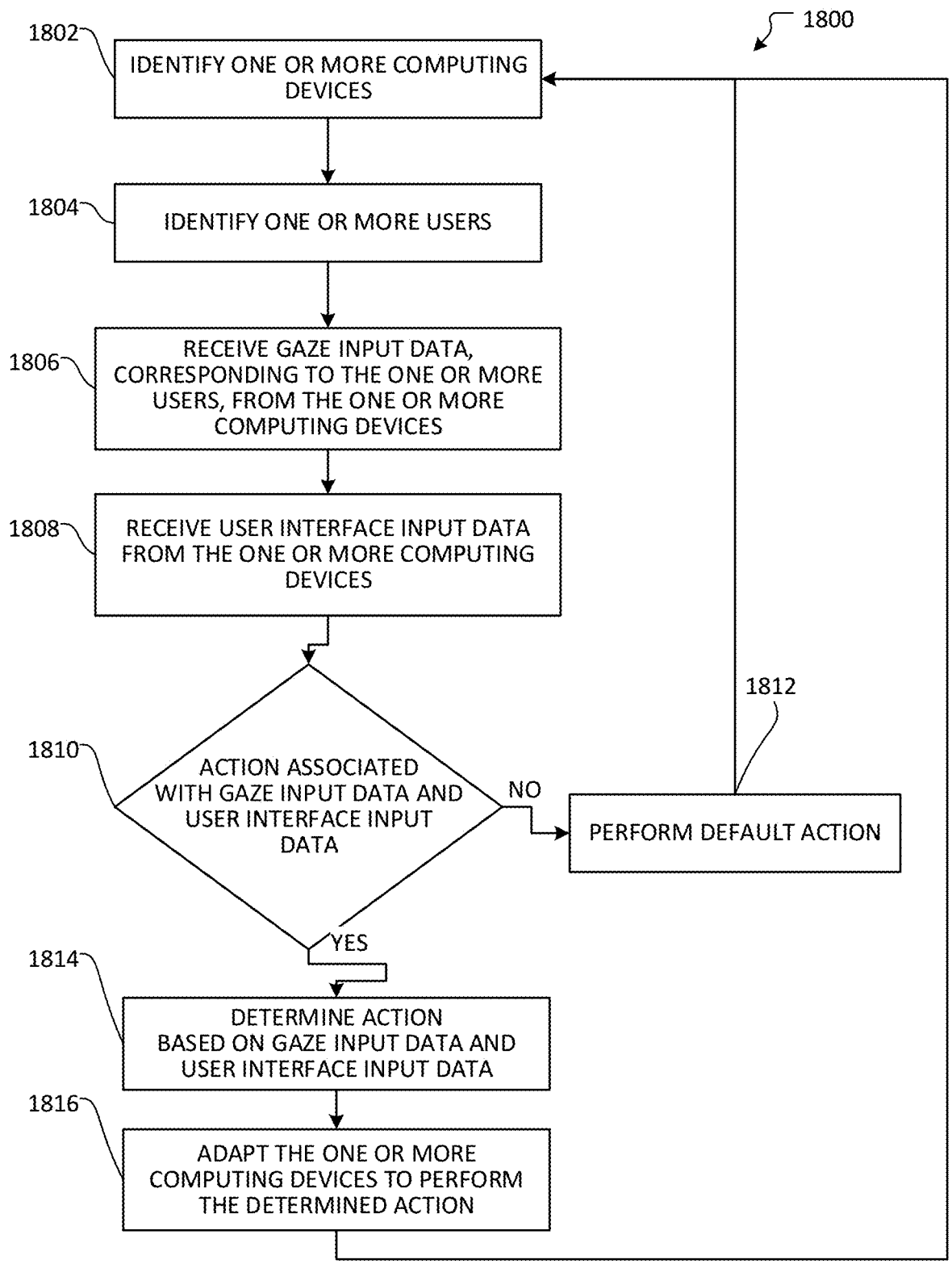
FIG. 18 illustrates an overview of an example method for processing gaze input data to perform an action to affect computing device behavior.

FIG. 18 illustrates an overview of an example method 1800 for processing gaze input data to perform an action to affect computing device behavior. In accordance with some examples, aspects of method 1800 are performed by a device, such as computing device 103, computing device 104, peripheral device 106, or peripheral device 108 discussed above with respect to FIG. 1.

Method 1800 begins at operation 1802, where one or more computing devices are identified. For example, a user may link one or more devices (e.g., devices 103-108) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices that are linked together, to be identified by method 1500 to identify the devices at operation 1802. Additionally, or alternatively, a network may be configured to automatically identify one or more devices that are connected to the network. In yet another example, a network may be configured to detect computing devices within a specified geographic proximity.

At operation 1804, one or more users are identified. The one or more users may be identified by one or more computing devices (e.g., device 103-106, and/or devices 1604, 1704). Specifically, the one or more computing devices may receive visual data from a sensor (e.g., a camera) to identify one or more users (e.g., user 1602, 1702). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheekbone location, hair location, eye location, and/or eyelid location.

Additionally, or alternatively, at operation 1804, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 1804, the one or more users may be identified using a radio frequency identification tag (RFID), an ID badge, a bar code, a QR code, or some other means of identification that is capable of identifying a user via some technological interface.

Additionally, or alternatively, at operation 1804, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 1804, gaze input data is received, from the one or more computing devices (e.g., computing devices 103-108, and/or computing devices 1604, 1706) that corresponds to the one or more users (e.g., user 1602, 1702). Once the one or more users are identified at 1804, the method 1800 may monitor the orientation of a user's eyes to determine their gaze, and thereby receive gaze input data. Such gaze input data can provide an indication to a multi-device gaze tracking system (e.g., system 1600 discussed above with respect to FIG. 16, and/or system 1700 discussed above with respect to FIG. 17) of where a user may be looking relative to a display screen (e.g., a display screen of devices 1604, 1704).

Still referring to operation 1806, the one or more computing devices (e.g., computing devices 103-108, and/or computing devices 1604, 1704) may receive gaze data from a plurality of users (e.g., the computing devices may track the orientation of multiple users' eyes, and receive gaze data therefrom). Specifically, the one or more computing devices may track at which device (e.g., computing devices 103-108, and/or computing devices 1604, 1704) each of the users are looking, and even further, may determine at what each of the users are looking, on the devices (e.g., an element being displayed on one or more of the computing devices, such as a cell, file, button, text-box, String variable, etc.). The gaze data may be received in real-time (e.g., providing a continuous stream of feedback regarding at what the plurality of users are gazing). Alternatively, the gaze data may be received periodically (e.g., at regular, or irregular, time intervals that may be specified by a user).

Still further, with reference to operation 1806, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At operation 1808, user interface input data is received, from the one or more computing devices (e.g., computing devices 103-108, and/or computing devices 1604, 1706). Such user interface input data can be received from, for example, a keyboard, touchpad, touchscreen, or other user-interface. For example, the user interface input data may correspond to key strokes that are received by a keyboard, touchpad, or other computer input device or interface. The user interface input data may be received in real-time (e.g., providing feedback regarding a user interface command being executed by a user). Alternatively, the user interface input data may be received periodically (e.g., at regular, or irregular, time intervals that may be specified by a user) to save on computational resources.

At determination 1810, it is determined whether there is an action associated with the gaze input data and user interface input data. For example, determination 1810 may comprise evaluating the received gaze and user interface input data to generate a set of user signals, which may be processed in view of an environmental context (e.g., applications, currently being run on a device, or tasks currently being executed, and specific elements being displayed therewith). Accordingly, the evaluation may identify an action as a result of an association between the gaze input data, user interface input data, and the environmental context.

In some examples, at determination 1810, it is determined, for each user, whether there is an action associated with the gaze and user interface input data corresponding to that user. For example, determination 1810 may comprise evaluating the received gaze and user interface input data to generate a set of user signals, wherein each of the user signals correspond to one of the plurality of users. The user signals may be processed in view of an environmental context (e.g., applications currently being run on a device, or tasks currently being executed, and specific elements being displayed therewith). Accordingly, the evaluation may identify one or more actions as a result of an association between the gaze input data for each user, the user interface input data for each user, and the environmental context. It should be recognized that there may be different actions determined for each user, based on differed gaze and user interface input data (e.g., different users looking at different computing devices, and/or different users entering different user interface inputs). Alternatively, there may be the same actions determined for each user, based on the same gaze and user interface input data (e.g., different users looking at the same computing device and entering the same user interface inputs).

If it is determined that there is not an action associated with the gaze and user interface input data, flow branches "NO" to operation 1812, where a default action is performed. For example, the gaze input data and the user interface input data may have an associated pre-determined action. In some other examples, the method 1812 may comprise determining whether the gaze input data and the user interface input data have an associated default action, such that, in some instances, no action may be performed as a result of the received gaze input data and user interface input data. Method 1800 may terminate at operation 1810. Alternatively, method 1812 may return to operation 1802, from operation 1812, to create a continuous feedback loop of receiving gaze input data and user interface input data, and executing commands for a user.

If however, it is determined that there is a gaze command associated with the received gaze input data and the received user interface input data, flow instead branches "YES" to operation 1814, where an action is determined based on the gaze input data and the user interface input data. For example, referring to FIGS. 16A and 16B, when the user 1602 gazes at the first cell 1612 of the spreadsheet application 1610, and enters the first user interface input 1606 (e.g., Ctrl+C), then it is determined that the user 1602 is copying the contents of the first cell 1612. Then, when the user 1602 gazes at the second cell 1614 of the spreadsheet application 1610, and enters the second user interface input 1608 (e.g., Ctrl+V), then it is determined that the user 1602 is pasting the contents of the first cell 1612 into the second cell 1614.

As another example, referring to FIGS. 17A and 17B, when the user 1702 gazes at the first cell 1712 of the spreadsheet application 1710, and enters the first user interface input 1706 (e.g., Ctrl+X), then it is determined that the user 1702 is cutting the contents of the first cell 1712. Then, when the user 1702 gazes at the second cell 1714 of the spreadsheet application 1710, and enters the second user interface input 1708 (e.g., Ctrl+V), then it is determined that the user 1702 is removing the contents from the first cell 1712, and pasting the contents into the second cell 1714.

Flow progresses to operation 1816, where the one or more computing devices are adapted to perform the determined action. For example, the determined action may be performed by the computing device at which method 1800 was performed. In another example, an indication of the determined action may be provided to another computing device. For example, aspects of method 1800 may be performed by a peripheral device, such that operation 1816 comprises providing an input to an associated computing device. As another example, operation 1816 may comprise using an application programming interface (API) call to adapt the one or more computing devices to perform the determined action. Method 1800 may terminate at operation 1816. Alternatively, method 1800 may return to operation 1802, from operation 1816, to create a continuous feedback loop of receiving gaze and user interface input data and performing actions based on the gaze and user interface input data.

Figure 19A:
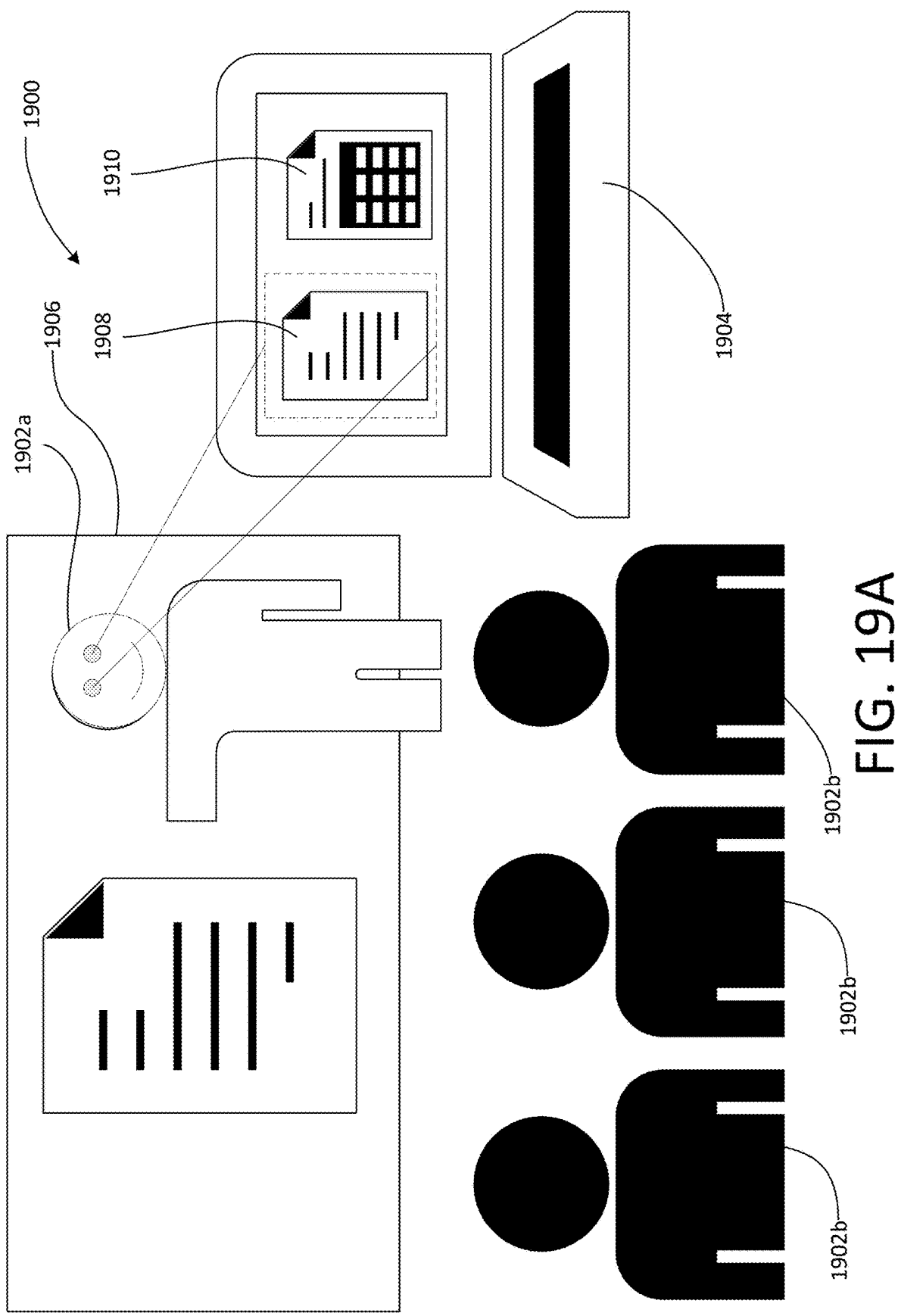
FIG. 19A illustrates an example system for multi-device gaze tracking according to aspects described herein.
Figure 19B:
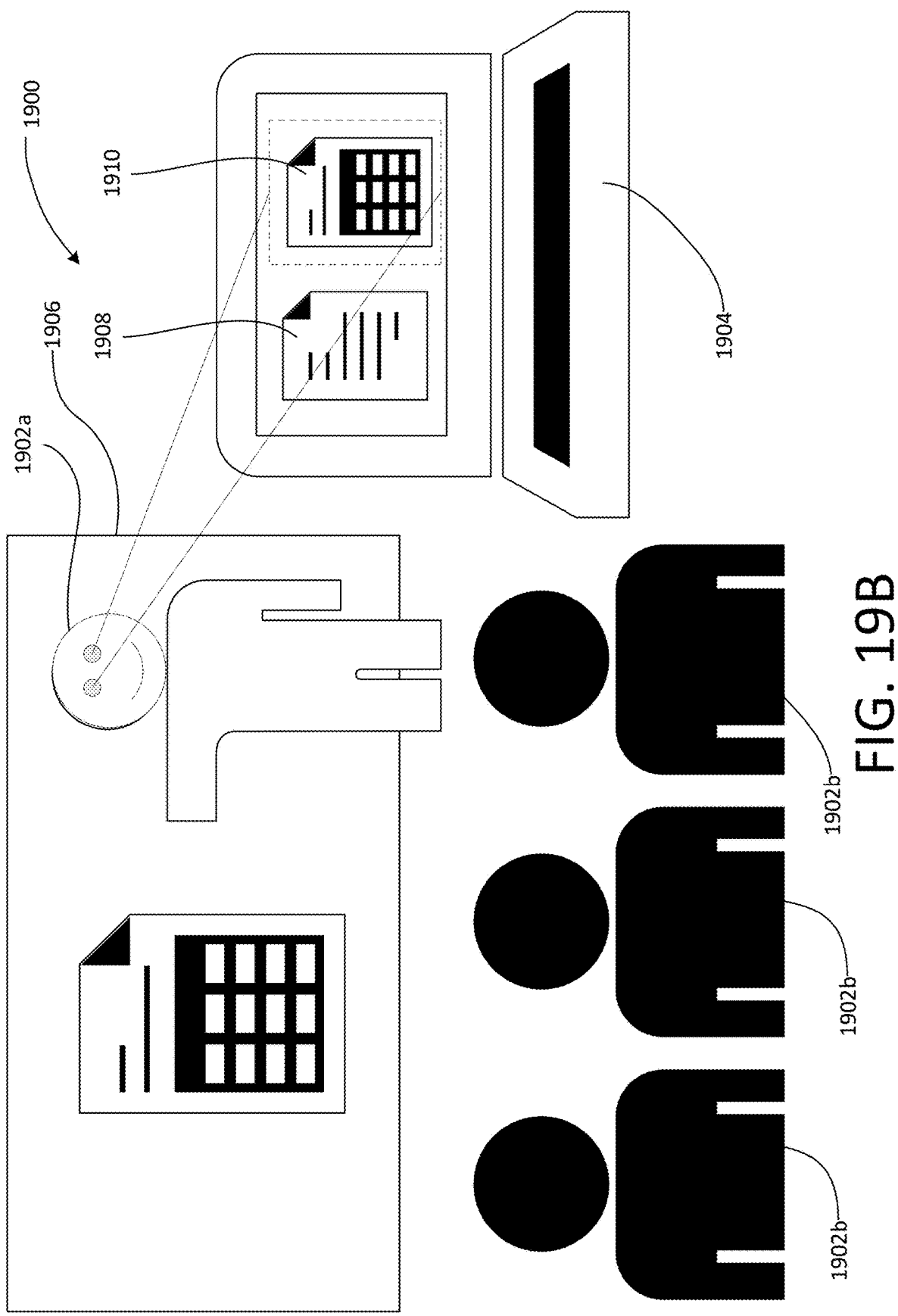
FIG. 19B illustrates an example system for multi-device gaze tracking according to aspects described herein.

FIGS. 19A and 19B illustrates an example system 1900 for multi-device gaze tracking according to aspects described herein. System 1900 includes a plurality of users 1902, a first computing device 1904, and a second computing device 1906. The plurality of users 1902 may include a presenter 1902a and audience members 1902b.

The first computing device 1904 may include a plurality of applications running thereon. For example, the first computing device 1904 may include a first application (e.g., word processor application) 1908, and a second application (e.g., spreadsheet application) 1910 running thereon. It should be recognized that the applications 1908, 1910 may be any of a plurality of applications, or software programs that provide some visual display at which a user can gaze. Examples of such applications, or computer programs include, but are not limited to, word processors, graphics software, database software, spreadsheet software, web browsers, enterprise software, information worker software, multimedia software, presentation software, education software, content access software, communication software, etc.

Mechanisms described herein provide users with the ability to present an application based on where one or more users (e.g., presenter 1902a, and/or audience members 1902b). For example, referring to FIG. 19A, the user 1902 looks at the first application 1908 of the first computing device 1904. As a result, the first application 1908 is presented on the second computing device 1906. Alternatively, with reference now to FIG. 19B, the user 1902 looks at the second application 1910 of the first computing device 1904. As a result the second application 1910 is presented on the second computing device 1906. Such capabilities may be beneficial to users when giving a presentation, and/or when screen sharing (e.g., on a video call, or teleconference).

In other examples, it may be decided which application (e.g., of applications 1908 and 1910) is displayed, based on gaze data corresponding to the audience members 1920b. For example, if a majority of the audience members 1920b are determined to be looking at an application (e.g., applications 1908, 1910) on a first computing device (e.g., device 1904), then the application may be presented or screen-shared on a second computing device (e.g., device 1906).

While the example system 1900 of FIGS. 19A and 19B displays a multi-device system. It should be recognized that aspects of the above disclosure may also apply to a single-device system. For example, if a user has a plurality of tabs open on a device, that each correspond to an application, and is giving a presentation, or participating in a video call, then, by looking at one of the plurality of tabs, it may be determined which tab is to be enlarged, presented, screen-shared, or otherwise displayed. The plurality of tabs may be applications that are minimized (e.g., in a taskbar), applications that are overlapping one another (e.g., on a desktop), or tabs of an applications that are arranged in a display (e.g., tabs of an internet browser that are shown on a display of a computing device).

Figure 20:
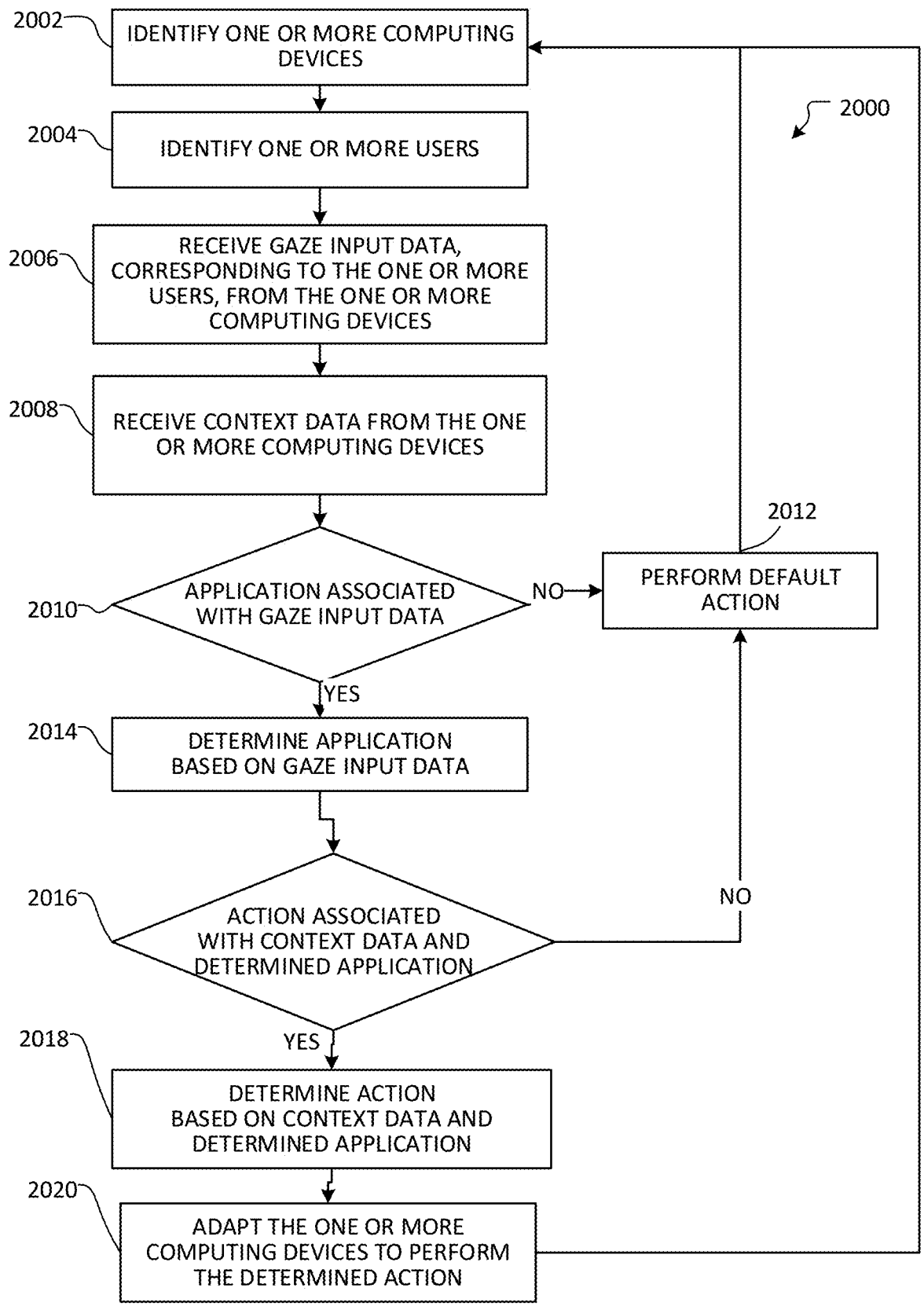
FIG. 20 illustrates an overview of an example method for processing gaze input data to perform an action to affect computing device behavior.

FIG. 20 illustrates an overview of an example method 2000 for processing gaze input data to perform an action to affect computing device behavior. In accordance with some examples, aspects of method 2000 are performed by a device, such as computing device 103, computing device 104, peripheral device 106, or peripheral device 108 discussed above with respect to FIG. 1.

Method 2000 begins at operation 2002, where one or more computing devices are identified. For example, a user may link one or more devices (e.g., devices 103-108 and/or devices 1904, 1906) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices that are linked together, to be identified by method 2000 to identify the devices at operation 2002. Additionally, or alternatively, a network may be configured to automatically identify one or more devices that are connected to the network. In yet another example, a network may be configured to detect computing devices within a specified geographic proximity.

At operation 2004, one or more users are identified. The one or more users may be identified by one or more computing devices (e.g., device 103-106, and/or devices 1904, 1906). Specifically, the one or more computing devices may receive visual data from a sensor (e.g., a camera) to identify one or more users (e.g., presenter 1902*a* and/or audience members 1902*b*). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 2004, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 1804, the one or more users may be identified using a radio frequency identification tag (RFID), an ID badge, a bar code, a QR code, or some other means of identification that is capable of identifying a user via some technological interface.

Additionally, or alternatively, at operation 2004, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 2006, gaze input data is received, from the one or more computing devices (e.g., computing devices 103-108, and/or computing devices 1904, 1906) that corresponds to the one or more users (e.g., presenter 1902*a*, and/or audience members 1902*b*). Once the one or more users are identified at 2004, the method 2000 may monitor the orientation of a user's eyes to determine their gaze, and thereby receive gaze input data. Such gaze input data can provide an indication to a multi-device gaze tracking system (e.g., system 1900 discussed above with respect to FIGS. 19A and 19B) of where a user may be looking relative to a display screen (e.g., a display screen of devices 1904, 1906).

Still referring to operation 2006, the one or more computing devices (e.g., computing devices 103-108, and/or computing devices 1904, 1906) may receive gaze data from a plurality of users (e.g., the computing devices may track the orientation of multiple users' eyes, and receive gaze data therefrom). Specifically, the one or more computing devices may track at which device (e.g., computing devices 103-108, and/or computing devices 1904, 1906) each of the users are looking, and even further, may determine at what each of the users are looking, on the devices (e.g., an application, tab, or portion of an application). The gaze data may be received in real-time (e.g., providing a continuous stream of feedback regarding at what the plurality of users are gazing). Alternatively, the gaze data may be received periodically (e.g., at regular, or irregular, time intervals that may be specified by a user).

Still further, with reference to operation 2006, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At operation 2008, context data is received, from the one or more computing devices (e.g., computing devices 103-108, and/or computing devices 1904, 1906). Such context data can be received from, for example, a shared computing component (e.g., shared computing component 122). The context data may correspond to applications that are currently being run or commands that are currently being executed on a computing device. As a specific example, if a user is on a video call, and the user gazes at an application (e.g., a word processing application, an internet browser, a spreadsheet application, etc.), then the context data may be useful to determine that the user wants to screen share or present the application at which they are gazing. Further, if a computing device is coupled to a particular hardware device (e.g., a projector, an HDMI cord, a DisplayPort cord, a VGA cord, a DVI cord, a USB cord, or a USB Type-C cord), then it may be determined that a user desires for a specific action to be performed when gazing at an application (e.g., screen sharing the application, presenting the application, etc.). The context data may be received in real-time (e.g., providing feedback regarding a applications or commands that are currently being run by a computing device). Alternatively, the user interface input data may be received periodically (e.g., at regular, or irregular, time intervals that may be specified by a user) to save on computational resources.

At determination 2010, it is determined whether there is an application associated with the gaze input data. For example, determination 2010 may comprise evaluating the gaze input data to generate a set of user signals, which may be processed in view of an environmental context (e.g., applications, currently being run on a device, or tasks currently being executed, and specific elements being displayed therewith). Accordingly, the evaluation may identify an application as a result of an association between the gaze input data, and the environmental context.

In some examples, at determination 2010, it is determined, for each user, whether there is an application associated with the gaze input data corresponding to that user. For example, determination 2010 may comprise evaluating the received gaze input data to generate a set of user signals, wherein each of the user signals correspond to one of the plurality of users. The user signals may be processed in view of an environmental context (e.g., applications currently being run on a device, or tasks currently being executed, and specific elements being displayed therewith). Accordingly, the evaluation may identify one or more applications as a result of an association between the gaze input data for each user, and the environmental context. It should be recognized that there may be different applications determined for each user, based on different gaze input data (e.g., different users looking at different computing devices). Alternatively, there may be the same applications determined for each user, based on the same gaze input data (e.g., different users looking at the same application on the same computing device).

If it is determined that there is not an application associated with the gaze input data, flow branches "NO" to operation 2012, where a default action is performed. For example, the gaze input data may have an associated pre-determined application. In some other examples, the method 2012 may comprise determining whether the gaze input data has an associated default action, such that, in some instances, no application may be identified as a result of the received gaze input data. Method 2000 may terminate at operation 2012. Alternatively, method 2000 may return to operation 2002, from operation 2012, to create a continuous feedback loop of receiving gaze input data determining an application associated with the gaze data.

If however, it is determined that there is an application associated with the received gaze input data, flow instead branches "YES" to operation 2014, where an application is determined based on the gaze input data. For example, referring to FIGS. 19A and 19B, when the user 1902 gazes at the first application 1908, it is determined that the first application 1908 is associated with the user's gaze. Alternatively, when the user 1902 gazes at the second application 1910, it is determined that the second application 1910 is associated with the user's gaze.

At determination 2016, it is determined whether there is an action associated with the application determined from operation 2014 and the context data. For example, if the presenter 1902a is giving a presentation (e.g., an HDMI cord is plugged into computing device 1904, and/or a video calling application is running on computing device 1904), then the application determined from operation 2014 may be presented (e.g., enlarged, or screen-shared).

If it is determined that there is not an action associated with the context data and determined application (i.e., from operation 2014), flow branches "NO" to operation 2012, where a default action is performed. For example, the context data and determined application may have an associated pre-determined action. In some other examples, the operation 2012 may comprise determining whether the context data and determined application have an associated default action, such that, in some instances, no action may be performed as a result of the received context data and gaze input data. Method 2000 may terminate at operation 2012. Alternatively, method 2000 may return to operation 2002, from operation 2012, to create a continuous feedback loop of receiving gaze input data and context data, and executing commands for a user.

If however, it is determined that there is a gaze command associated with the determined application and context data, flow instead branches "YES" to operation 2018, where an action is determined based on the determined application and context data. For example, when a user (e.g., presenter 1902a) is in a video call, or the user's computing device is coupled to an HDMI cord, and the determined application is a word processor document (e.g., application 1908), then the determined action with respect to method 2000 may be to screen share or present the word processor document on a second computing device (e.g., computing device 1906. Alternatively, the determined action may be to screen share or present the word processor document over a video call, within the video call interface.

Flow progresses to operation 2020, where the one or more computing devices are adapted to perform the determined action. For example, the determined action may be performed by the computing device at which method 2000 was performed. In another example, an indication of the determined action may be provided to another computing device. For example, aspects of method 2000 may be performed by a peripheral device, such that operation 2020 comprises providing an input to an associated computing device. As another example, operation 2020 may comprise using an application programming interface (API) call to adapt the one or more computing devices to perform the determined action. Method 2000 may terminate at operation 2020. Alternatively, method 2000 may return to operation 2002, from operation 2020, to create a continuous feedback loop of receiving gaze input data and context data, and performing actions based on the gaze input data and context data.

Figure 21A:
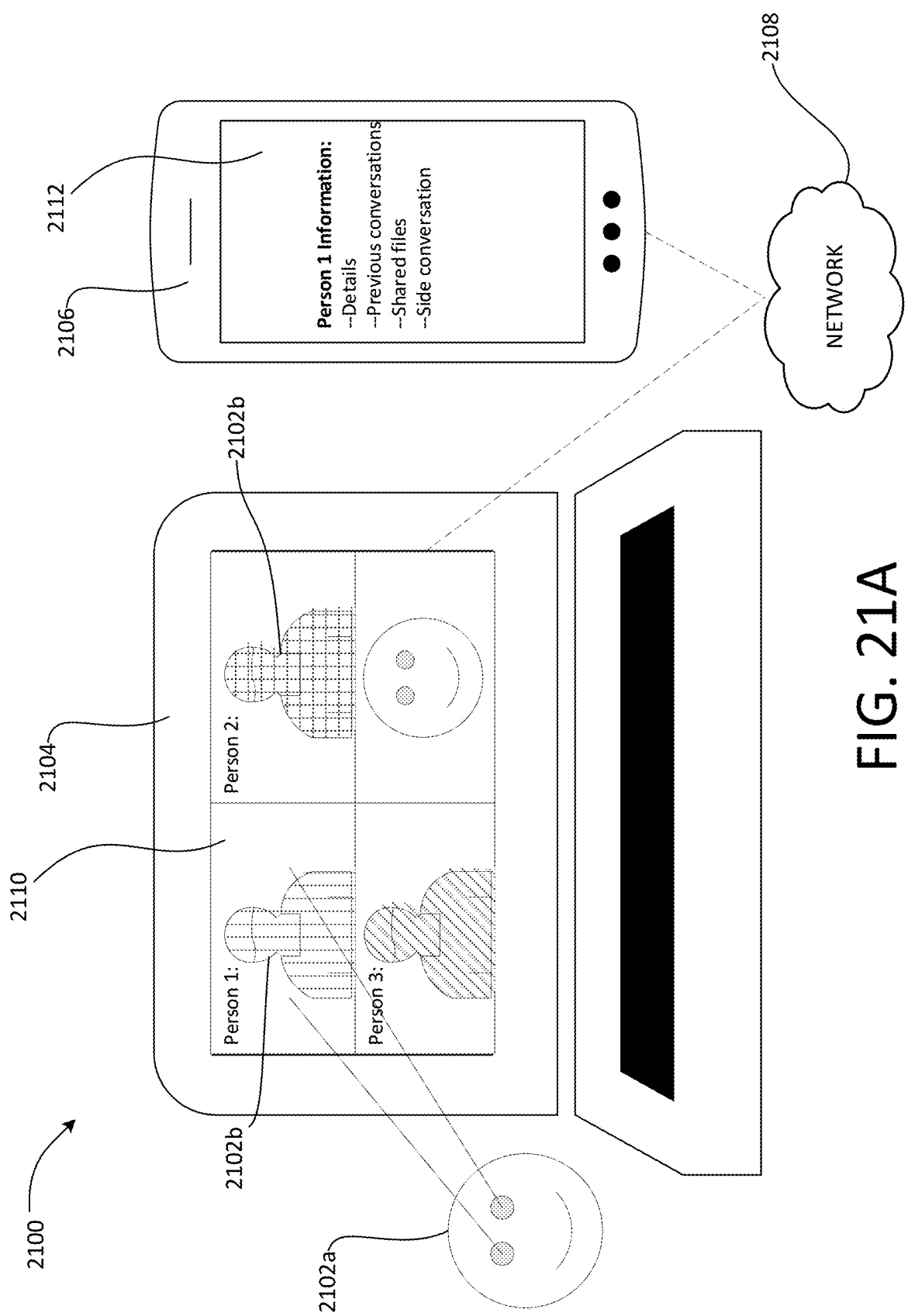
FIG. 21A illustrates an example system for multi-device gaze tracking according to aspects described herein.
Figure 21B:
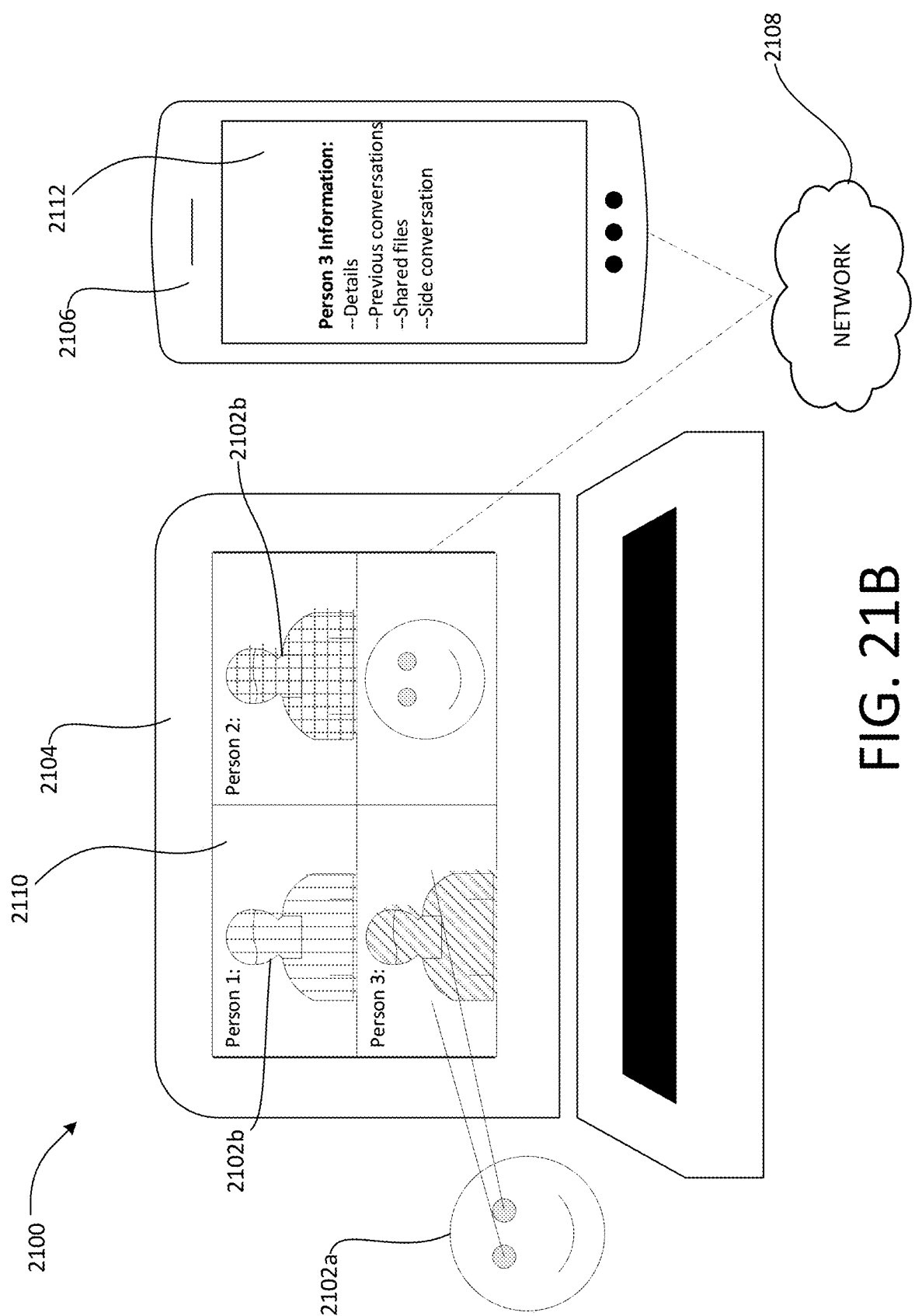
FIG. 21B illustrates an example system for multi-device gaze tracking according to aspects described herein.

FIGS. 21A and 21B illustrate an example system 2100 for multi-device gaze tracking according to aspects described herein. System 2100 includes a plurality of users (e.g., primary user 2102a, and participants 2102b), and a plurality of computing devices, for example, a first computing device 2104 and a second computing device 2106. The plurality of computing devices 2104, 2106 are in communication via a network 2108. The plurality of computing devices 2104, 2106 may be similar to devices 103-108 discussed earlier herein with respect to FIG. 1. Further, the network 2108 may be similar to the network 110 discussed earlier herein with respect to FIG. 1.

The first computing device 2104 may include one or more applications running thereon. For example, the first computing device 2104 may include a video conferencing application 2110. Additionally, or alternatively, the second computing device 1206 may include one or more applications running thereon. For example, the second computing device 1206 may include an infotips application 2112 (e.g., an application that provides information regarding an object indicated by a user, such as primary user 2102a).

Mechanisms described herein provide users (e.g., primary user 2102) with the ability to display information regarding participants (e.g., participants 2102b) on a video call, by gazing at the participants. The computing devices 2104 and/or 2106 may receive gaze data corresponding to the primary user 2102a, and context data (e.g., applications currently being run on the computing devices 2104 and/or 2106).

Referring specifically to FIG. 21A, the primary user 2102a is participating in a video call (e.g., via video conferencing application 2110) with a plurality of participants 2102b, via computing device 2104. When the primary user 2102a gazes at one of the plurality of participants 2102b (e.g., Person 1), then information corresponding to the participants 2102b at which the primary user 2102a is gazing (e.g., Person 1) is displayed on computing device 2106 (e.g., via infotips application 2112). Information that may be displayed, corresponding to the participant 2102b being gazed at by the primary user 2102a, may include: details about the participant 2102b, previous conversations, email threads, previously shared files, and/or a side conversation.

Referring to FIG. 21B, when the primary user 2102a switches their gaze between the plurality of participants 2102b (e.g., from Person 1 to Person 3), the information displayed on the second computing device 2106 (e.g., via infotips application 2112) may switch, as well (e.g., from information corresponding to Person 1, to information corresponding to Person 3). Again, information that may be displayed, corresponding to the participant 2102b being gazed at by the primary user 2102a, may include: details about the participant 2102b, previous conversations, email threads, previously shared files, and/or a side conversation.

In some examples, the information corresponding to the participants 2102b that is being displayed on computing device 2106 may be correlated to the amount of time for which the primary user 2102a is gazing at one or more of the participants 2102b. For example, if the primary user 2102a is gazing at "Person 1" for a first duration of time (e.g., 3 seconds), then the information corresponding to "Person 1" may be displayed on computing device 2106. In this respect, the information that is displayed on computing device 2106 may be based on the duration of time that the primary user 2102a spends gazing at one or more of the participants 2102b (e.g., "Person 1", "Person 2", or "Person 3"). In some examples, the primary user 2102a might be looking at "Person 1" for 3 seconds, and then briefly look at "Person 2" (e.g., for 1 second, or for less than 1 second). In such an example, the information corresponding to "Person 1" would continue to be displayed on computing device 2106 (i.e., the information corresponding to "Person 2" would not be displayed in the brief moment that the primary user 2102a gazes at "Person 2"). Additionally, or alternatively, if the user 2102a stops looking at "Person 1" for a second duration of time (e.g., 3 seconds), then the information may fade out from being displayed on computing device 2106 (e.g., information corresponding to another person may be displayed, or no such information may be displayed on the computing device).

It should be recognized that while the example system 2100 of FIGS. 21A and 21B shows and describes a multi-device configuration, aspects of system 2100 may also be applied to a single-device configuration, as will be recognized by those of ordinary skill in the art. For example, instead of displaying information, via the infotips application 2112, on the second computing device 2106, the information may, instead, be displayed on the primary computing device 2104 (e.g., within a portion of the video conferring application 2110, or via a separate graphical interface displayed on computing device 2104).

Figure 22:
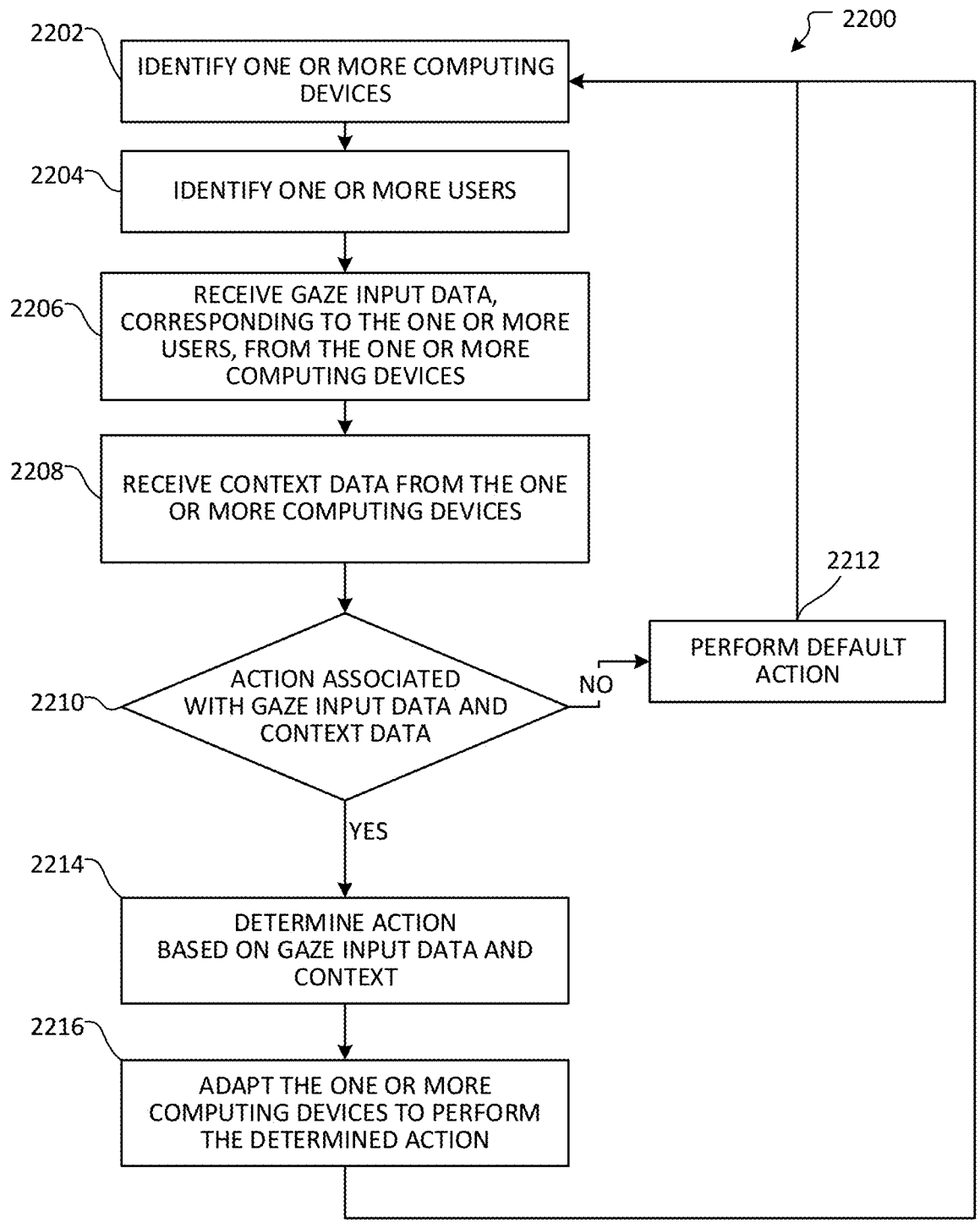
FIG. 22 illustrates an overview of an example method for processing gaze input data to perform an action to affect computing device behavior.

FIG. 22 illustrates an overview of an example method 2200 for processing gaze input data to perform an action to affect computing device behavior. In accordance with some examples, aspects of method 2200 are performed by a device, such as computing device 103, computing device 104, peripheral device 106, or peripheral device 108 discussed above with respect to FIG. 1.

Method 2200 begins at operation 2202, where one or more computing devices are identified. For example, a user may link one or more devices (e.g., devices 103-108, and/or devices 2104, 2106) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices that are linked together, to be identified by method 2200 to identify the devices at operation 2202. Additionally, or alternatively, a network (e.g., network 2108) may be configured to automatically identify one or more devices that are connected to the network. In yet another example, a network (e.g., network 2108) may be configured to detect computing devices within a specified geographic proximity.

At operation 2204, one or more users are identified. The one or more users may be identified by one or more computing devices (e.g., device 103-106, and/or devices 2104, 2106). Specifically, the one or more computing devices may receive visual data from a sensor (e.g., a camera) to identify one or more users (e.g., primary user 2102a). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 2204, the one or more users may be identified by engaging with a specific software (e.g., joining a call, joining a video call, joining a chat, or the like). Further, some user may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 2204, the one or more users may be identified using a radio frequency identification tag (RFID), an ID badge, a bar code, a QR code, or some other means of identification that is capable of identifying a user via some technological interface.

Additionally, or alternatively, at operation 2204, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 2206, gaze input data is received, from the one or more computing devices (e.g., computing devices 103-108, and/or computing devices 2104, 2106) that corresponds to the one or more users (e.g., primary user 2102*a*). Once the one or more users are identified at 2204, the method 2200 may monitor the orientation of a user's eyes to determine their gaze, and thereby receive gaze input data. Such gaze input data can provide an indication to a multi-device gaze tracking system (e.g., system 2100 discussed above with respect to FIGS. 21A and 21B) of where a user may be looking relative to a display screen (e.g., a display screen of devices 2104 and/or 2106).

Still referring to operation 2206, the one or more computing devices (e.g., computing devices 103-108, and/or computing devices 2104, 2106) may receive gaze input data from a plurality of users (e.g., the computing devices may track the orientation of multiple users' eyes and receive gaze data therefrom). Specifically, the one or more computing devices may track at which device (e.g., computing devices 103-108, and/or computing devices 2104, 2106) each of the users are looking, and even further, may determine at what each of the users are looking, on the devices (e.g., an application, or some other element being displayed on one or more of the computing devices, such as the participants 2102*b* or an indication of the participants 2102*b*).

The gaze input data may be received in real-time (e.g., providing a continuous stream of feedback regarding at what the plurality of users are gazing). Alternatively, the gaze input data may be received periodically (e.g., at regular, or irregular, time intervals that may be specified by a user).

Still further, with reference to operation 2206, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At operation 2208, context data is received, from the one or more computing devices (e.g., computing devices 103-108, and/or computing devices 2104, 2106). The context data may indicate specific applications that are being run on the one or more computing devices (e.g., video conferencing software, presentation software, etc.) The context data may be received in real-time (e.g., providing a continuous stream of feedback regarding what applications are being run on a computing device). Alternatively, the context data may be received periodically (e.g., at regular, or irregular, time intervals that may be specified by a user).

Further, referring to operation 2208, the context data can be stored (e.g., in memory). In some examples, only the most recent context data is stored, such that as context data is received, older context data is overwritten (e.g., in memory) by new context data. Alternatively, in some examples, context data is stored from a specified duration of time (e.g., the last hour, the last day, the last week, the last month, the last year, or since context data first began being received). Generally, such an implementation allows for a history of context data from one or more computing devices to be reviewed for further analysis (e.g., to infer or predict data that may be collected in the future).

At determination 2210, it is determined whether there is an action associated with the gaze input data and the context data. For example, determination 2210 may comprise evaluating the received gaze input data to generate sets of user signals, which may be processed in view of the context data. Accordingly, the evaluation may identify an application, or a task, as a result of an association between the gaze input data and the context data.

In some examples, at determination 2210, it is determined, for each user, whether there is an action associated with the gaze input data and context data. For example, determination 2210 may comprise evaluating the received gaze input data to generate one or more sets of user signals, wherein each of the user signals correspond to one of the plurality of users. The user signals may be processed in view of the context data. Accordingly, the evaluation may identify one or more actions as a result of an association between the gaze input data and the context data. It should be recognized that there may be different actions identified for each user, based on differed gaze input data (e.g., different users looking at different aspects of a computing devices). Alternatively, there may be the same actions identified for each user, based on the same gaze input data (e.g., different users looking at the same aspects of a computing device).

If it is determined that there is not an application associated with the gaze input data and the context data, flow branches "NO" to operation 2212, where a default action is performed. For example, the gaze input data and the context data may have an associated pre-determined action. In some other examples, the method 2200 may comprise determining whether the gaze input data and the context data have an associated default action, such that, in some instances, no action may be performed as a result of the received gaze input data and context data. Method 2200 may terminate at operation 2212. Alternatively, method 2200 may return to operation 2202, from operation 2212, to create a continuous feedback loop of receiving gaze input and context data and executing a command based on the gaze input and context data.

If however, it is determined that there is a gaze command associated with the received gaze input data, flow instead branches "YES" to operation 2214, where an action is determined based on the gaze input data and context data. For example, referring to FIGS. 21A and 21B, when the primary user 2102a gazes at a participant (e.g., one of the participants 2102b) during a video call, then it may be determined that the primary user 2102a is requesting information regarding that participant. Accordingly, the system 2100 may determine that the requested information should be displayed on the second computing device 2106. As another example, a user may gaze over an element of another application, such as a presentation application, or a word processing application. By gazing over the element, mechanisms described herein may determine that the user is requesting further information regarding the element.

Flow progresses to operation 2216, where the one or more computing devices are adapted to perform the determined action. In some examples the one or more computing devices may be adapted to perform the determined action by the computing device at which method 2200 was performed. In another example, an indication of the determined action may be provided to another computing device. For example, aspects of method 2200 may be performed by a peripheral device, such that operation 2216 comprises providing an input to an associated computing device. As another example, operation 2216 may comprise using an application programming interface (API) call to adapt the one or more computing devices to perform the determined action. Method 2200 may terminate at operation 2216. Alternatively, method 2200 may return to operation 2202, from operation 2216, to create a continuous feedback loop of receiving gaze input data and context data, and performing an associated action.

Figure 23:
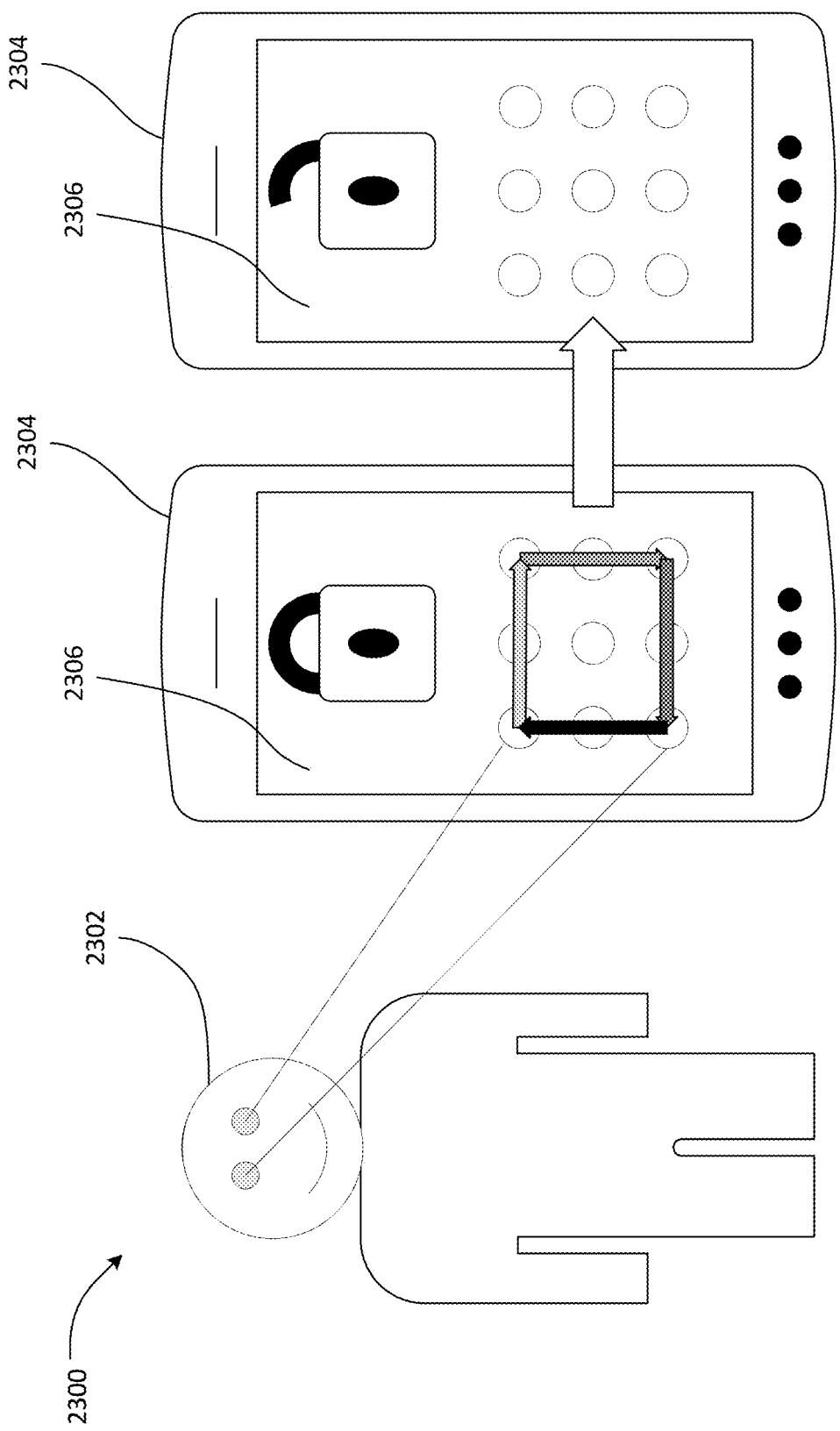
FIG. 23 illustrates an example system for device gaze tracking according to aspects described herein.

FIG. 23 illustrates an example system 2300 for device gaze tracking according to aspects described herein. System 2300 includes a user 2302 and a computing device 2304. The computing device 2304 includes an application 2306 running thereon. The application 2306 requires a login. The computing device 2304 may be similar to devices 103-108 discussed earlier herein with respect to FIG. 1.

Mechanisms described herein provide users (e.g. user 2302) with the ability to login to a computing device or application based on gaze data. For example, the computing device 2304 may receive gaze data corresponding to where the user 2302 is looking with respect to a display of the computing device 2304. The user 2302 may make a pattern with their gaze (e.g., by looking at different points on a display screen of the computing device 2304). The computing device 2304 may authenticate the user's 2302 pattern against a stored login pattern. If the user's 2302 pattern is the same as the stored login pattern, then the computing device 2304, or an application running thereon, may be unlocked or logged into.

While the example system 2300 shows a single-device system, it should be recognized that aspects of system 2300 may also be applied to a multi-device system. For example, a user may provide gaze data to a first computing device (e.g., a login pattern) in order to log into or unlock a second computing device, or an application running (e.g., application 2306) on the second computing device.

Figure 24:
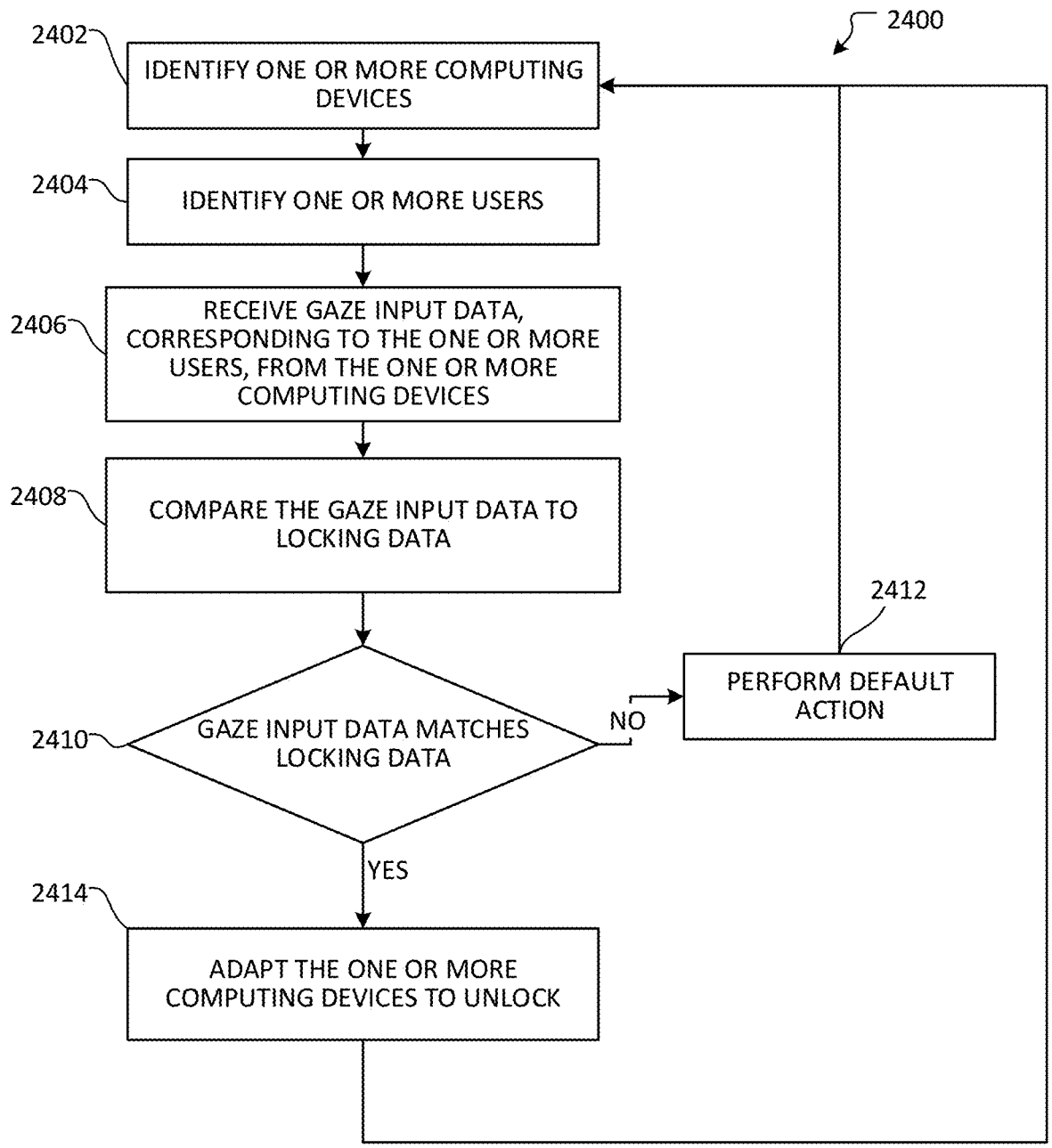
FIG. 24 illustrates an overview of an example method for processing gaze input data to perform an action to affect computing device behavior.

FIG. 24 illustrates an overview of an example method 2400 for processing gaze input data to perform an action to affect computing device behavior. In accordance with some examples, aspects of method 2400 are performed by a device, such as computing device 103, computing device 104, peripheral device 106, or peripheral device 108 discussed above with respect to FIG. 1.

Method 2400 begins at operation 2402, where one or more computing devices are identified. For example, a user may link one or more devices (e.g., devices 103-108, and/or device 2304) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices to be identified by method 2400 to identify the devices at operation 2402. Additionally, or alternatively, a network may be configured to automatically identify one or more devices that are connected to the network. In yet another example, a network may be configured to detect computing devices within a specified geographic proximity.

At operation 2404, one or more users are identified. The one or more users may be identified by one or more computing devices (e.g., device 103-106, and/or devices 2304). Specifically, the one or more computing devices may receive visual data from a sensor (e.g., a camera) to identify one or more users (e.g., user 2302). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 2404, the one or more users may be identified by engaging with a specific software (e.g., joining a call, joining a video call, joining a chat, opening an application, or the like). Further, some users may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 2404, the one or more users may be identified using a radio frequency identification tag (RFID), an ID badge, a bar code, a QR code, or some other means of identification that is capable of identifying a user via some technological interface.

Additionally, or alternatively, at operation 2404, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 2406, gaze input data is received, from the one or more computing devices (e.g., computing devices 103-108, and/or computing device 2304) that corresponds to the one or more users (e.g., user 2302). Once the one or more users are identified at 2404, the method 2400 may monitor the orientation of a user's eyes to determine their gaze, and thereby receive gaze input data. Such gaze input data can provide an indication to a multi-device gaze tracking system (e.g., system 2300 discussed above with respect to FIG. 23) of where a user may be looking relative to a display screen (e.g., a display screen of device 2304).

Still referring to operation 2406, the one or more computing devices (e.g., computing devices 103-108, and/or computing device 2304) may receive gaze input data from a plurality of users (e.g., the computing devices may track the orientation of multiple users' eyes and receive gaze data therefrom). Specifically, the one or more computing devices may track at which device (e.g., computing devices 103-108, and/or computing device 2304) each of the users are looking, and even further, may determine at what each of the users are looking, on the devices (e.g., an application, or some other element being displayed on one or more of the computing devices, such as a passcode or login pattern). The gaze input data may be received in real-time (e.g., providing a continuous stream of feedback regarding at what the plurality of users are gazing). Alternatively, the gaze input data may be received periodically (e.g., at regular, or irregular, time intervals that may be specified by a user).

Still further, with reference to operation 2406, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At operation 2408, the gaze input data is compared to locking data. Locking data may be stored (e.g., in memory). The locking data may be a default setting that was generated by a manufacturer of a device or programmer of an application. Alternatively, the locking data may be generated by a user, for example by setting a specific pattern of eye movement to be the passcode or login for an application or device.

At determination 2410, it is determined whether the gaze input data matches the locking data. For example, determination 2410 may comprise evaluating the received gaze input data to generate sets of user signals, which may be compared against the locking data stored in memory. Accordingly, the evaluation may determine whether or not an application or device should be logged into, or unlocked.

If it is determined that the gaze input data does not match the locking data, flow branches "NO" to operation 2412, where a default action is performed. For example, the gaze input data may have an associated pre-determined action. In some other examples, the operation 2412 may comprise determining whether the gaze input data has an associated default action, such that, in some instances, no action may be performed as a result of the received gaze input data. Method 2400 may terminate at operation 2412. Alternatively, method 2400 may return to operation 2402, from operation 2412, to create a continuous feedback loop of receiving gaze input determining whether or not a device or application should be unlocked or logged into.

If however, it is determined that there is a gaze command associated with the received gaze input data, flow instead branches "YES" to operation 2414, where a computing device or applications is adapted to be unlocked. For example, referring to FIG. 23, when the user 2302 performs a pattern with their gaze that matches locking data stored by the computing device 2304, the computing device 2304 is unlocked.

Figure 25:
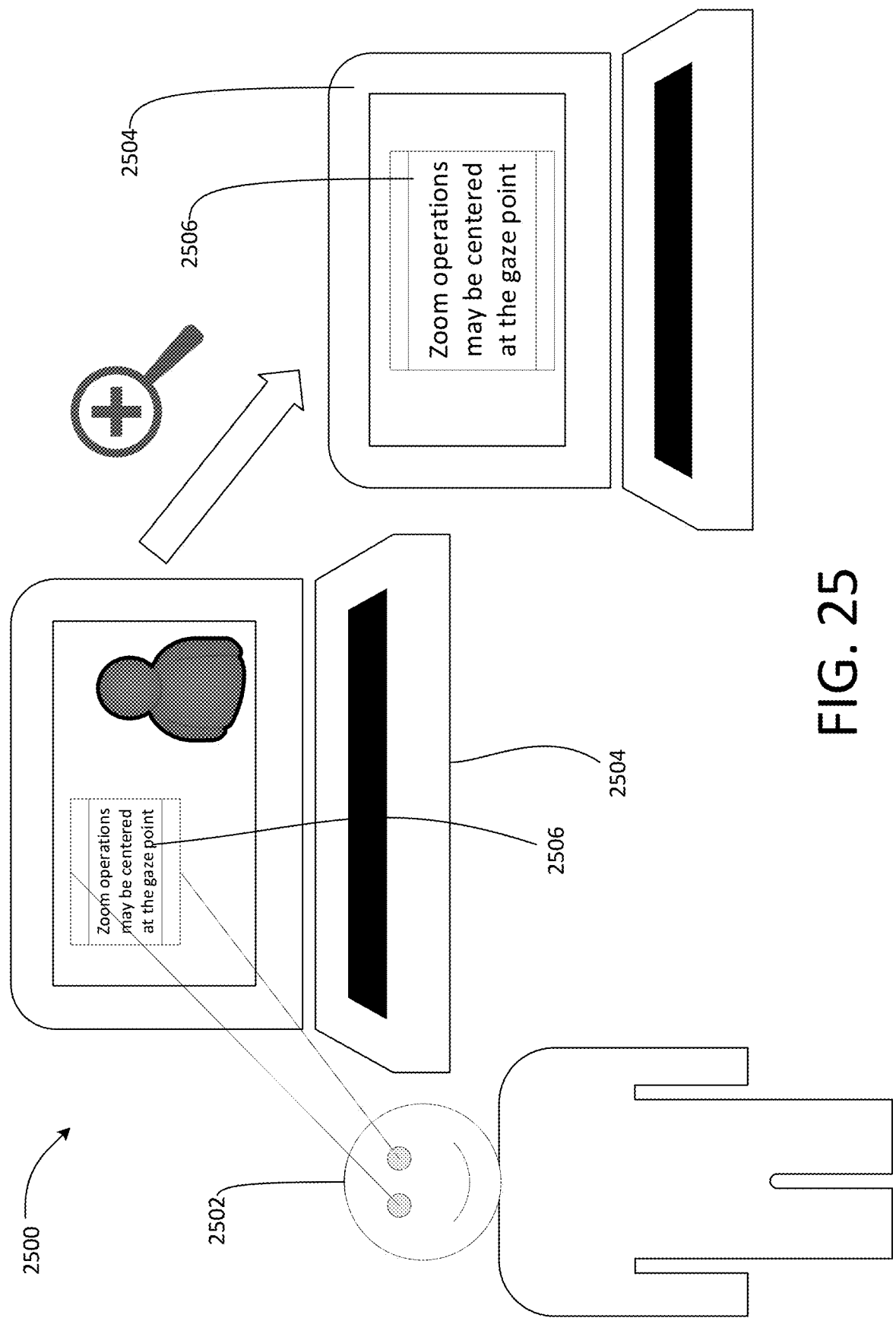
FIG. 25 illustrates an example system 2500 for device gaze tracking according to aspects described herein.

FIG. 25 illustrates an example system 2500 for device gaze tracking according to aspects described herein. System 2500 includes a user 2502 and a computing device 2504. The computing device 2504 includes an application 2506 (e.g., a word processing application) running thereon. The computing device 2504 may be similar to devices 103-108 discussed earlier herein with respect to FIG. 1.

Mechanisms described herein provide users (e.g. user 2502) with the ability to zoom into, or zoom out of an application based on gaze data. For example, the computing device 2504 may receive gaze data corresponding to where the user 2502 is looking with respect to a display of the computing device 2504. An application (e.g., application 2506) may be identified corresponding to where the user 2502 is looking (e.g., based on the received gaze data). It may be determined that the application should be zoomed into based on the gaze data. Alternatively, it may be determined that the application should be zoomed out of based on the gaze data. In some examples, a user may enter key commands, or other user-interface inputs, to specify whether an application should be zoomed out or zoomed in.

While the example system 2500 shows a single-device system, it should be recognized that aspects of system 2500 may also be applied to a multi-device system. For example, a user may provide gaze data to a first computing device in order to zoom into an application, or zoom out of an application, on a second computing device.

Figure 26:
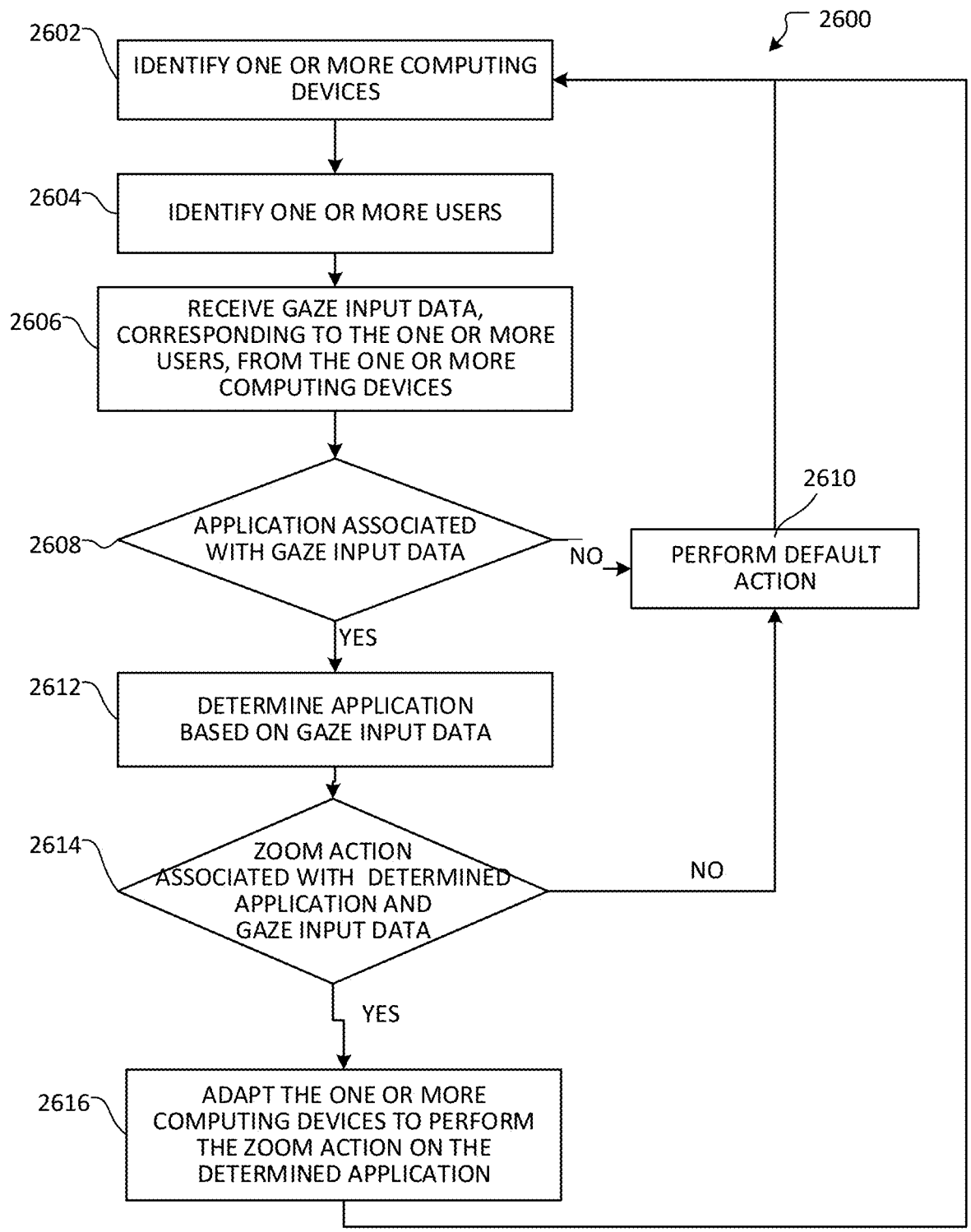
FIG. 26 illustrates an overview of an example method 2600 for processing gaze input data to perform an action to affect computing device behavior.

FIG. 26 illustrates an overview of an example method 2600 for processing gaze input data to perform an action to affect computing device behavior. In accordance with some examples, aspects of method 2600 are performed by a device, such as computing device 103, computing device 104, peripheral device 106, or peripheral device 108 discussed above with respect to FIG. 1.

Method 2600 begins at operation 2602, where one or more computing devices are identified. For example, a user may link one or more devices (e.g., devices 103-108, and/or device 2504) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices to be identified by method 2600 to identify the devices at operation 2602. Additionally, or alternatively, a network may be configured to automatically identify one or more devices that are connected to the network. In yet another example, a network may be configured to detect computing devices within a specified geographic proximity.

At operation 2604, one or more users are identified. The one or more users may be identified by one or more computing devices (e.g., device 103-106, and/or devices 2504). Specifically, the one or more computing devices may receive visual data from a sensor (e.g., a camera) to identify one or more users (e.g., user 2502). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 2604, the one or more users may be identified by engaging with a specific software (e.g., joining a call, joining a video call, joining a chat, opening an application, or the like). Further, some users may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 2604, the one or more users may be identified using a radio frequency identification tag (RFID), an ID badge, a bar code, a QR code, or some other means of identification that is capable of identifying a user via some technological interface.

Additionally, or alternatively, at operation 2604, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 2606, gaze input data is received, from the one or more computing devices (e.g., computing devices 103-108, and/or computing device 2504) that corresponds to the one or more users (e.g., user 2502). Once the one or more users are identified at 2604, the method 2600 may monitor the orientation of a user's eyes to determine their gaze, and thereby receive gaze input data. Such gaze input data can provide an indication to a multi-device gaze tracking system (e.g., system 2500 discussed above with respect to FIG. 25) of where a user may be looking relative to a display screen (e.g., a display screen of device 2504).

Still referring to operation 2606, the one or more computing devices (e.g., computing devices 103-108, and/or computing device 2504) may receive gaze input data from a plurality of users (e.g., the computing devices may track the orientation of multiple users' eyes and receive gaze data therefrom). Specifically, the one or more computing devices may track at which device (e.g., computing devices 103-108, and/or computing device 2504) each of the users are looking, and even further, may determine at what each of the users are looking, on the devices (e.g., an application, or some other element being displayed on one or more of the computing devices). The gaze input data may be received in real-time (e.g., providing a continuous stream of feedback regarding at what the plurality of users are gazing). Alternatively, the gaze input data may be received periodically (e.g., at regular, or irregular, time intervals that may be specified by a user).

Still further, with reference to operation 2606, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At determination 2608, it is determined whether there is an application associated with the gaze input data. For example, determination 2608 may comprise evaluating the received gaze input data to generate a set of user signals, which may be processed in view of an environmental context (e.g., applications currently being run on a device, or tasks currently being executed). Accordingly, the evaluation may identify an application as a result of an association between the gaze input data and the environmental context.

In some examples, at determination 2608, it is determined, for each user, whether there is an application associated with the gaze input data corresponding to that user. For example, determination 2608 may comprise evaluating the received gaze input data to generate a set of user signals, wherein each of the user signals correspond to one of the plurality of users. The user signals may be processed in view of an environmental context (e.g., applications currently being run on a device, or tasks currently being executed). Accordingly, the evaluation may identify one or more applications as a result of an association between the gaze input data for each user and the environmental context. It should be recognized that there may be different applications identified for each user, based on differed gaze input data (e.g., different users looking at different computing devices).

Alternatively, there may be the same applications identified for each user, based on the same gaze input data (e.g., different users looking at the same computing device).

If it is determined that there is not an application associated with the gaze input data, flow branches "NO" to operation 2610, where a default action is performed. For example, the gaze input data may have an associated predetermined application. In some other examples, the method 2600 may comprise determining whether the gaze input data has an associated default application, such that, in some instances, no action may be performed as a result of the received gaze input data. Method 2600 may terminate at operation 2610. Alternatively, method 2600 may return to operation 2602, from operation 2610, to create a continuous feedback loop of gaze input data and identifying associated applications for a user.

If however, it is determined that there is an application associated with the received gaze input data, flow instead branches "YES" to operation 2612, where an application is determined based on the gaze input data. For example, referring to FIG. 25, when the user 2502 gazes at the word processing application 2506, it is determined that the user is gazing at the word processing application 2506.

At determination 2614, it is determined whether there is a zoom action associated with the gaze input data and the determined application. For example, determination 2614 may comprise evaluating the type of application that was determined from operation 2612. If the determined application requires reading, then it may be desirable for the application to be zoomed into when a user is gazing thereat. Additionally, or alternatively, in some examples, a user may provide a user interface input (e.g., a keyboard input, a mouse input, trackpad input, etc.) to indicate whether or not the user desires to zoom into the determined application.

If it is determined that there is not a zoom action associated with the gaze input data and the determined application, flow branches "NO" to operation 2610, where a default action is performed. For example, the gaze input data may have an associated pre-determined zoom action. In some other examples, the method 2600 may comprise determining whether the gaze input data and the determined application have an associated default zoom action, such that, in some instances, no action may be performed as a result of the received gaze input data and the determined application. Method 2600 may terminate at operation 2610. Alternatively, method 2600 may return to operation 2602, from operation 2610, to create a continuous feedback loop of gaze input data and identifying associated applications for a user.

If however, it is determined that there is a zoom action associated with the received gaze input data, flow instead branches "YES" to operation 2612, where the one or more computing devices are adapted to perform the zoom action on the determined application. For example, referring to FIG. 25, when the user 2502 gazes at the word processing application 2506, it is determined that the user wants to zoom into the point at which they are gazing on the word processing application 2506. Accordingly, a zoom operation is performed on the word processing application 2506 that enlarges the word processing application 2506 on a display of the computing device 2504.

Figure 27:
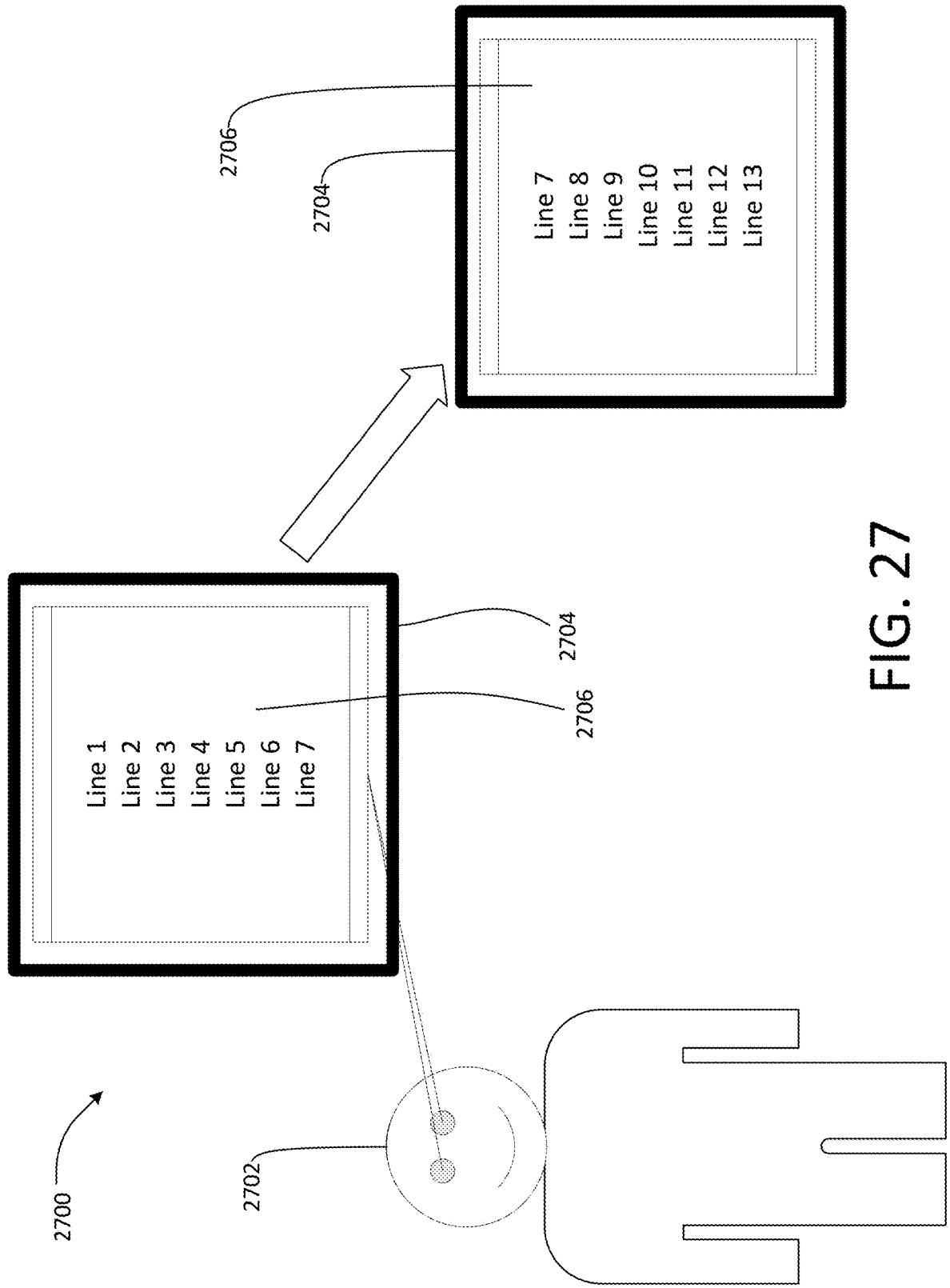
FIG. 27 illustrates an example system 2700 for device gaze tracking according to aspects described herein.

FIG. 27 illustrates an example system 2700 for device gaze tracking according to aspects described herein. System 2700 includes a user 2702 and a computing device 2704. The computing device 2704 includes an application 2706 (e.g., a word processing application) running thereon. The computing device 2704 may be similar to devices 103-108 discussed earlier herein with respect to FIG. 1.

Mechanisms described herein provide users (e.g. user 2702) with the ability to scroll (e.g., down, up, left, right, or diagonal) on an application based on gaze data. For example, the computing device 2704 may receive gaze data corresponding to where the user 2702 is looking with respect to a display of the computing device 2704. An application (e.g., application 2706) may be identified corresponding to where the user 2702 is looking (e.g., based on the received gaze data). It may be determined that the application should be scrolled down, based on where on the application the user is looking. Alternatively, it may be determined that the application should be scrolled up, left, right, and/or diagonal based on where on the application the user is looking. In some examples, a user may enter key commands, or other user-interface inputs, to specify whether an application should be scrolled up, down, left, right, and/or diagonal.

While the example system 2700 shows a single-device system, it should be recognized that aspects of system 2700 may also be applied to a multi-device system. For example, a user may provide gaze data to a first computing device in order to scroll an application on a second computing device.

Figure 28:
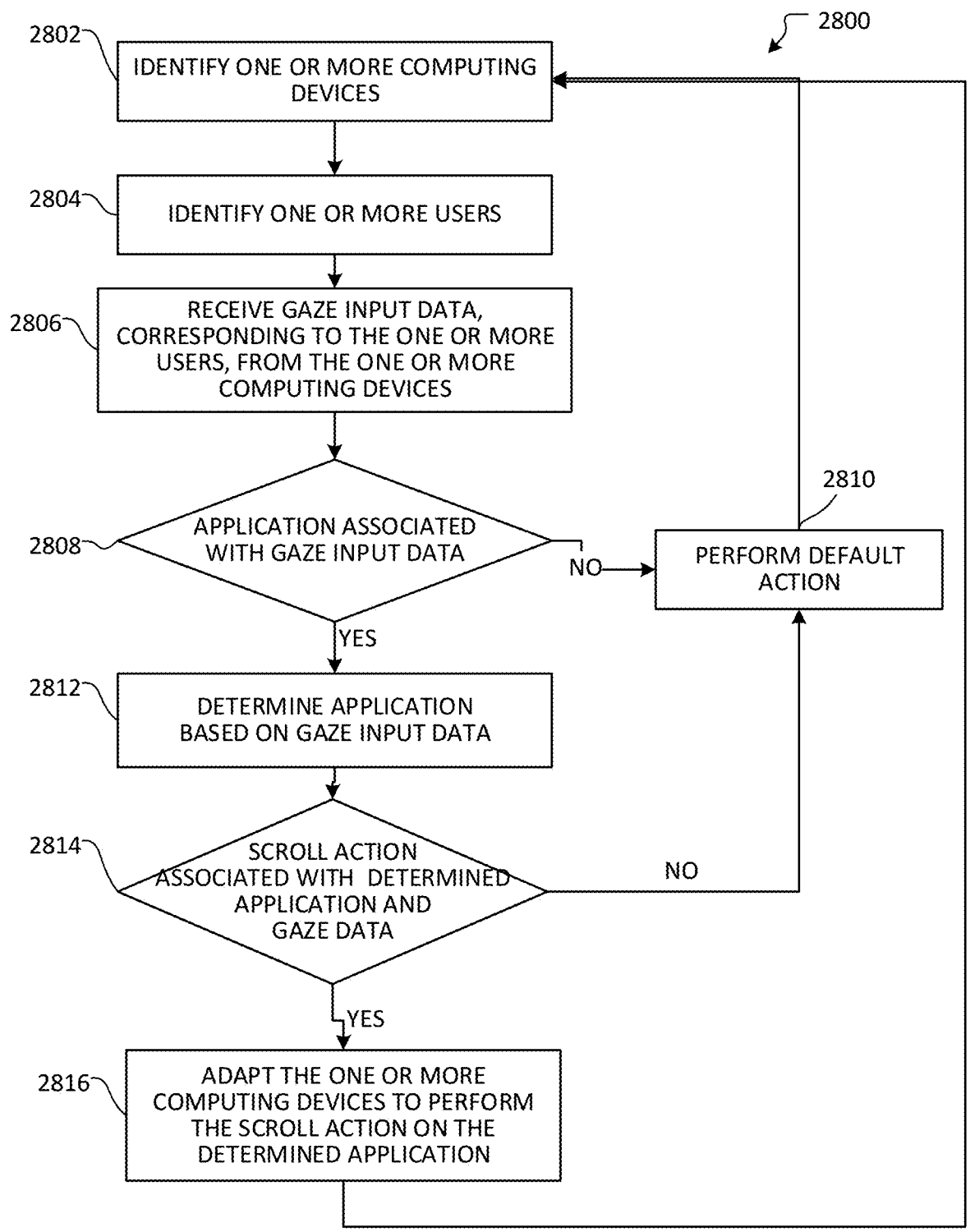
FIG. 28 illustrates an overview of an example method 2800 for processing gaze input data to perform an action to affect computing device behavior.

FIG. 28 illustrates an overview of an example method 2800 for processing gaze input data to perform an action to affect computing device behavior. In accordance with some examples, aspects of method 2800 are performed by a device, such as computing device 103, computing device 104, peripheral device 106, or peripheral device 108 discussed above with respect to FIG. 1.

Method 2800 begins at operation 2802, where one or more computing devices are identified. For example, a user may link one or more devices (e.g., devices 103-108, and/or device 2504) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices to be identified by method 2800 to identify the devices at operation 2802. Additionally, or alternatively, a network may be configured to automatically identify one or more devices that are connected to the network. In yet another example, a network may be configured to detect computing devices within a specified geographic proximity.

At operation 2804, one or more users are identified. The one or more users may be identified by one or more computing devices (e.g., device 103-106, and/or devices 2704). Specifically, the one or more computing devices may receive visual data from a sensor (e.g., a camera) to identify one or more users (e.g., user 2702). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 2804, the one or more users may be identified by engaging with a specific software (e.g., joining a call, joining a video call, joining a chat, opening an application, or the like). Further, some users may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 2804, the one or more users may be identified using a radio frequency identification tag (RFID), an ID badge, a bar code, a QR code, or some other means of identification that is capable of identifying a user via some technological interface.

Additionally, or alternatively, at operation 2804, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 2806, gaze input data is received, from the one or more computing devices (e.g., computing devices 103-108, and/or computing device 2704) that corresponds to the one or more users (e.g., user 2702). Once the one or more users are identified at 2804, the method 2800 may monitor the orientation of a user's eyes to determine their gaze, and thereby receive gaze input data. Such gaze input data can provide an indication to a multi-device gaze tracking system (e.g., system 2700 discussed above with respect to FIG. 27) of where a user may be looking relative to a display screen (e.g., a display screen of device 2704).

Still referring to operation 2806, the one or more computing devices (e.g., computing devices 103-108, and/or computing device 2704) may receive gaze input data from a plurality of users (e.g., the computing devices may track the orientation of multiple users' eyes and receive gaze data therefrom). Specifically, the one or more computing devices may track at which device (e.g., computing devices 103-108, and/or computing device 2704) each of the users are looking, and even further, may determine at what each of the users are looking, on the devices (e.g., an application, or some other element being displayed on one or more of the computing devices). The gaze input data may be received in real-time (e.g., providing a continuous stream of feedback regarding at what the plurality of users are gazing). Alternatively, the gaze input data may be received periodically (e.g., at regular, or irregular, time intervals that may be specified by a user).

Still further, with reference to operation 2806, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At determination 2808, it is determined whether there is an application associated with the gaze input data. For example, determination 2808 may comprise evaluating the received gaze input data to generate a set of user signals, which may be processed in view of an environmental context (e.g., applications currently being run on a device, or tasks currently being executed). Accordingly, the evaluation may identify an application as a result of an association between the gaze input data and the environmental context.

In some examples, at determination 2808, it is determined, for each user, whether there is an application associated with the gaze input data corresponding to that user. For example, determination 2808 may comprise evaluating the received gaze input data to generate a set of user signals, wherein each of the user signals correspond to one of the plurality of users. The user signals may be processed in view of an environmental context (e.g., applications currently being run on a device, or tasks currently being executed). Accordingly, the evaluation may identify one or more applications as a result of an association between the gaze input data for each user and the environmental context. It should be recognized that there may be different applications identified for each user, based on differed gaze input data (e.g., different users looking at different computing devices). Alternatively, there may be the same applications identified for each user, based on the same gaze input data (e.g., different users looking at the same computing device).

If it is determined that there is not an application associated with the gaze input data, flow branches "NO" to operation 2810, where a default action is performed. For example, the gaze input data may have an associated predetermined application. In some other examples, the method 2800 may comprise determining whether the gaze input data has an associated default application, such that, in some instances, no action may be performed as a result of the received gaze input data. Method 2800 may terminate at operation 2810. Alternatively, method 2800 may return to operation 2802, from operation 2810, to create a continuous feedback loop of gaze input data and identifying associated applications for a user.

If however, it is determined that there is an application associated with the received gaze input data, flow instead branches "YES" to operation 2812, where an application is determined based on the gaze input data. For example, referring to FIG. 27, when the user 2702 gazes at the word processing application 2706, it is determined that the user is gazing at the word processing application 2706.

At determination 2814, it is determined whether there is a scroll action associated with the gaze input data and the determined application. For example, determination 2614 may comprise evaluating the type of application that was determined from operation 2612. If the determined application requires reading, then it may be desirable for the application to be scrolled down when a user is looking at a bottom of the application. Similarly, it may be desirable for the application to be scrolled up, or to the right, or to the left, when a user is looking at a top, or right side, or left side of an application. Additionally, or alternatively, in some examples, a user may provide a user interface input (e.g., a keyboard input, a mouse input, trackpad input, etc.) to indicate whether or not the user desires to perform a scroll action on the determined application, and/or in which direction a scroll action is desired to be performed on the determined application.

If it is determined that there is not a scroll action associated with the gaze input data and the determined application, flow branches "NO" to operation 2810, where a default action is performed. For example, the gaze input data may have an associated pre-determined scroll action. In some other examples, the method 2800 may comprise determining whether the gaze input data and the determined application have an associated default scroll action, such that, in some instances, no action may be performed as a result of the received gaze input data and the determined application. Method 2800 may terminate at operation 2810. Alternatively, method 2800 may return to operation 2802, from operation 2810, to create a continuous feedback loop of gaze input data and identifying associated applications for a user.

If however, it is determined that there is a scroll action associated with the received gaze input data, flow instead branches "YES" to operation 2812, where the one or more computing devices are adapted to perform the scroll action on the determined application. For example, referring to FIG. 27, when the user 2702 gazes at a bottom of the word processing application 2506, it is determined that the user wants to scroll down on the word processing application 2706. Accordingly, a scroll operation is performed on the word processing application 2706 that is displayed on the computing device 2704.

Figure 29:
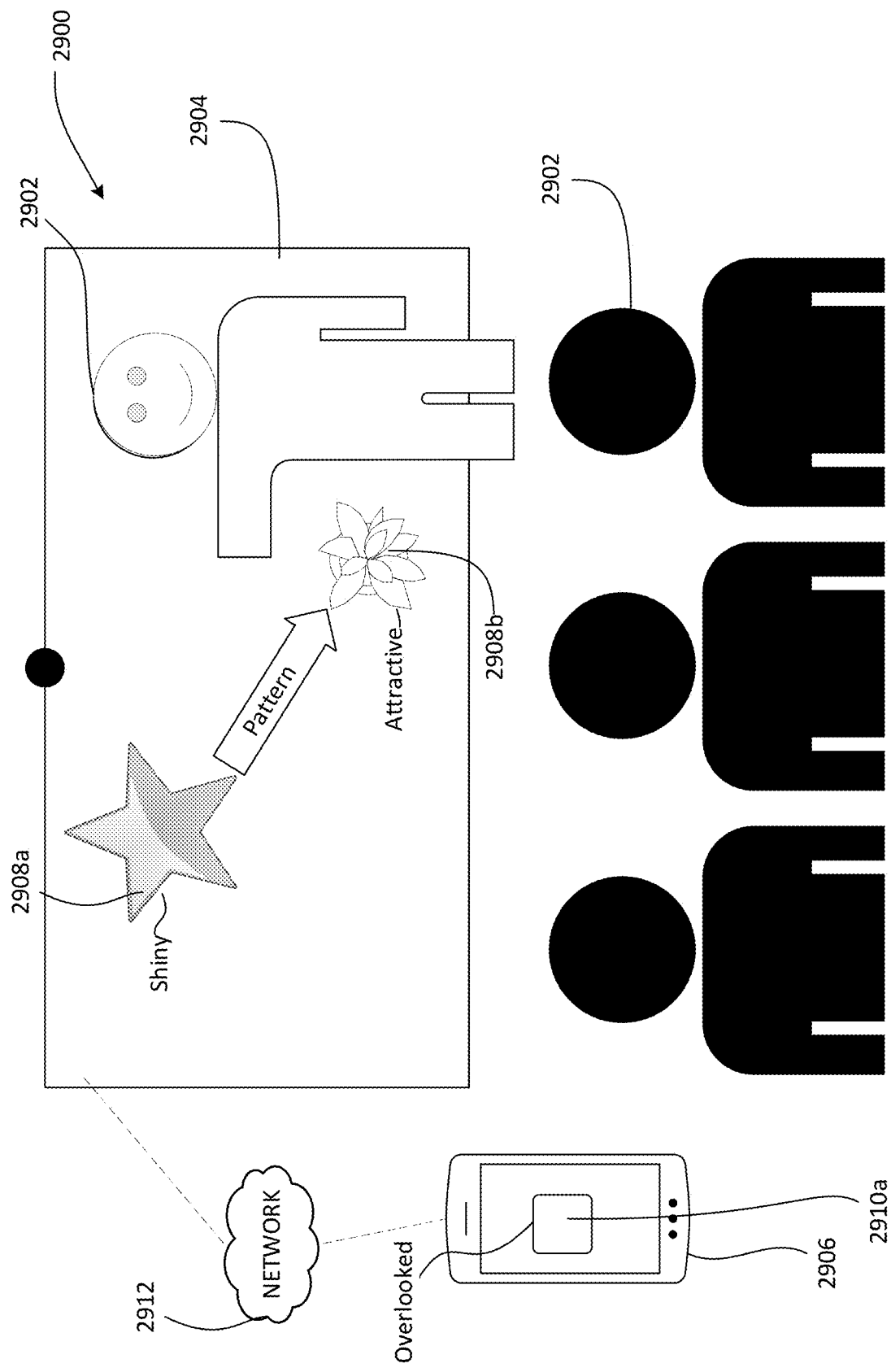
FIG. 29 illustrates an example system 2900 for device gaze tracking according to aspects described herein.

FIG. 29 illustrates an example system 2900 for device gaze tracking according to aspects described herein. System 2900 includes a plurality of user 2902 and a plurality of computing devices, such a first computing device 2904 and a second computing device 2906. The first computing device 2904 includes one or elements 2908 displayed thereon, such as a shiny element 2908a, and an attractive element 2908b. The second computing device 2904 includes one or more elements 2910 displayed thereon, such as an overlooked element 2910a. System 2900 further includes a network 2912 that may be configured to communicate information between the first computing device 2904 and the second computing device 2906. The computing device 2304 may be similar to devices 103-108 discussed earlier herein with respect to FIG. 1. Further, the network 2912 may be similar to the network 110 discussed earlier herein with respect to FIG. 1.

Mechanisms described herein provide the ability to gather useful metadata regarding where one or more users (e.g. users 2902) are looking on one or more computing devices (e.g., devices 2904, 2906). For example, the computing devices 2904, 2906 may receive gaze data corresponding to where the user 2302 is looking with respect to displays of the computing devices 2904, 2906. The displays may contain a plurality of elements (e.g., elements 2908, 2910) located thereon. Based on the received gaze data, metadata may be determined based on the plurality of elements. For example, an element that catches a plurality of user's first attention may be categorized as a shiny element (e.g., element 2908a). An element that is overlooked by a majority of users may be categorized as an overlooked element (e.g., element 2910a). An element that is paid the most attention by users may be categorized as an attractive element (e.g., 2908b). Further, a sequence in which elements are paid attention to by the users, may be identified as a pattern.

The determined metadata may be useful when organizing a display or presentation. For example, a user may alter which elements are displayed in a presentation, based on the amount of engagement that the elements have from users (e.g., audience members of the presentation). If an element is overlooked, then the element may be moved to another location in the display or presentation; alternatively, the overlooked element may be removed from the presentation. Additionally, or alternatively, an arrangement of elements in a presentation may be modified based on pattern metadata that has been received. For example if an element is "shiny" that is not meant to catch the first attention, then the "shiny" element may be moved to later in the presentation.

In some examples, the determined metadata from system 2900 may be useful in marketing displays. For example, it may be useful to track what elements are being paid attention to by users in order to customize what elements are advertised to those users. For example if a shiny element for one or more users is an article of apparel, then further elements may be presented to the user that are also articles of apparel. Conversely, if an overlooked element for one or more users is an article of apparel, then elements may no longer, or in less frequency, be presented to the user that are also articles of apparel.

It should be recognized by those of ordinary skill in the art that the elements discussed above with respect to system 2900 may be images, videos, animations, or any other form of graphic that may be displayed on a computing device.

Figure 30:
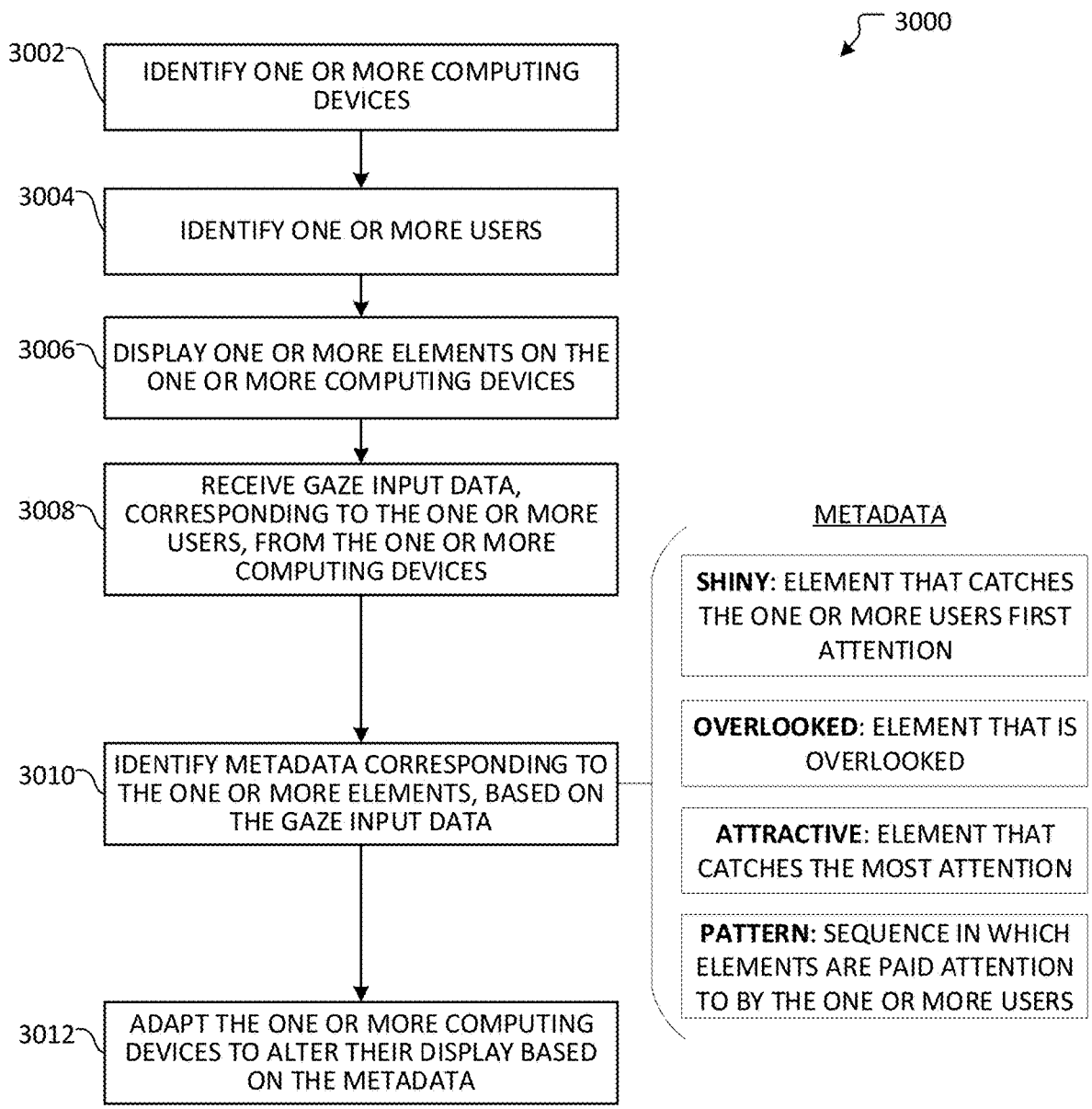
FIG. 30 illustrates an overview of an example method 3000 for processing gaze input data to perform an action to affect computing device behavior.

FIG. 30 illustrates an overview of an example method 3000 for processing gaze input data to perform an action to affect computing device behavior. In accordance with some examples, aspects of method 3000 are performed by a device, such as computing device 103, computing device 104, peripheral device 106, or peripheral device 108 discussed above with respect to FIG. 1.

Method 3000 begins at operation 3002, where one or more computing devices are identified. For example, a user may link one or more devices (e.g., devices 103-108, and/or devices 2904, 2906) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices to be identified by method 3000 to identify the devices at operation 3002. Additionally, or alternatively, a network (e.g., network 2912) may be configured to automatically identify one or more devices that are connected to the network. In yet another example, a network (e.g., network 2912) may be configured to detect computing devices within a specified geographic proximity.

At operation 3002, one or more users are identified. The one or more users may be identified by one or more computing devices (e.g., device 103-106, and/or devices 2904, 2906). Specifically, the one or more computing devices may receive visual data from a sensor (e.g., a camera) to identify one or more users (e.g., users 2902). The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheek-bone location, hair location, eye location, and/or eyelid location.

Additionally, or alternatively, at operation 3004, the one or more users may be identified by engaging with a specific software (e.g., joining a call, joining a video call, joining a chat, opening an application, or the like). Further, some users may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 3004, the one or more users may be identified using a radio frequency identification tag (RFID), an ID badge, a bar code, a QR code, or some other means of identification that is capable of identifying a user via some technological interface.

Additionally, or alternatively, at operation 3004, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 3006, one or more elements may be displayed on the one or more computing devices. The one or more elements may be images, videos, animations, or any other form of graphic that may be displayed on a computing device. Examples of one or more elements may be found in FIG. 29 (e.g., element 2908a, 2908b, 2910a).

At operation 3008, gaze input data is received, from the one or more computing devices (e.g., computing devices 103-108, and/or computing device 2904, 2906) that corresponds to the one or more users (e.g., user 2902). Once the one or more users are identified at 3004, the method 3000 may monitor the orientation of a user's eyes to determine their gaze, and thereby receive gaze input data. Such gaze input data can provide an indication to a multi-device gaze tracking system (e.g., system 2900 discussed above with respect to FIG. 29) of where a user may be looking relative to a display screen (e.g., a display screen of device 2904 or 2906), and/or at what element (e.g., element 2908a, 2908b, 2910a) a user may be looking on a display screen.

Still referring to operation 3008, the one or more computing devices (e.g., computing devices 103-108, and/or computing devices 2904, 2906) may receive gaze input data from a plurality of users (e.g., the computing devices may track the orientation of multiple users' eyes and receive gaze data therefrom). Specifically, the one or more computing devices may track at which device (e.g., computing devices 103-108, and/or computing devices 2904, 2906) each of the users are looking, and even further, may determine at what each of the users are looking, on the devices (e.g., an application, or some other element being displayed on one or more of the computing devices). The gaze input data may be received in real-time (e.g., providing a continuous stream of feedback regarding at what the plurality of users are gazing). Alternatively, the gaze input data may be received periodically (e.g., at regular, or irregular, time intervals that may be specified by a user).

Still further, with reference to operation 3008, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future, and/or to determine useful metadata corresponding to the gaze data).

At operation 3010, metadata corresponding to the one or more elements is identified, based on the gaze input data. For example, the gaze input data may evaluated to generate a set of user signals, which may be processed in view of metadata categories. Examples of metadata categories include: shiny, overlooked, attractive, and pattern. Shiny metadata refers to an element that catches the one or more users first attention. It should be recognized that of a plurality of users, not all of the users may look at the same element first. Therefore, there may be different elements that are categorized as shiny, for different users. Ultimately, an element that is categorized as shiny may be the element to which the majority of users first pay attention.

Overlooked metadata refers to an element that is overlooked (e.g., not gazed at by a user, gazed at last by a user, or gazed at for a relatively short period of time). It should be recognized that of a plurality of users, not all of the users may overlook the same element. Therefore, there may be different elements that are categorized as overlooked, for different users. Ultimately, an element that is categorized as overlooked may be the element that the majority of users overlook.

Attractive metadata refers to an element that catches the most attention (e.g., gazed at by the most users, or gazed at for a relatively long period of time). It should be recognized that of a plurality of users, not all of the users may find the same element to be attractive. Therefore, there may be different elements that are categorized as attractive, for different users. Ultimately, an element that is categorized as attractive may be the element that the majority of users find to be attractive.

Pattern metadata refers to the order in which elements are paid attention by a user (e.g., the shiny element may be first in the pattern, the attractive element may be second in the pattern, and the overlooked element may be third in the pattern, if the overlooked element is included in the pattern, at all). It should be recognized that of a plurality of users, not all of the users may look at elements in the same. Therefore, there may be different patterns that are determined, for different users, based on gaze data corresponding to each of the users. The patterns from the plurality of users may be aggregated to determine a dominant or common pattern (e.g., a pattern that the average user, or the majority of users may follow, when viewing a plurality of elements).

At operation 3012, the one or more computing devices may be adapted to alter their displays based on the metadata identified in operation 3010. For example, the determined metadata may be useful when organizing a display or presentation. A user may alter which elements are displayed in a presentation, based on the amount of engagement that the elements have from users (e.g., audience members of the presentation). If an element is overlooked, then the element may be moved to another location in the display or presentation; alternatively, the overlooked element may be removed from the presentation, or modified to be a new element. Additionally, or alternatively, an arrangement of elements in a presentation may be modified based on pattern metadata that has been received. For example if an element is "shiny" that is not meant to catch the first attention, then the "shiny" element may be moved to later in the presentation. Additionally, or alternatively, an "attractive" element may be presented at a moment when high user engagement is desired.

Still referring to operation 3012, and in other examples, the metadata identified in operation 3010 may be useful in marketing. For example, it may be useful to track what elements are being paid attention to by users in order to customize what elements are advertised to those users. For example if a shiny element for one or more users is an article of apparel, then further elements may be presented to the user, via a display on one or more computing devices, that are also articles of apparel. Conversely, if an overlooked element for one or more users is an article of apparel, then elements that are also articles of apparel may no longer, or in less frequency, be presented to the user, via a display on one or more computing devices.

Figure 31:
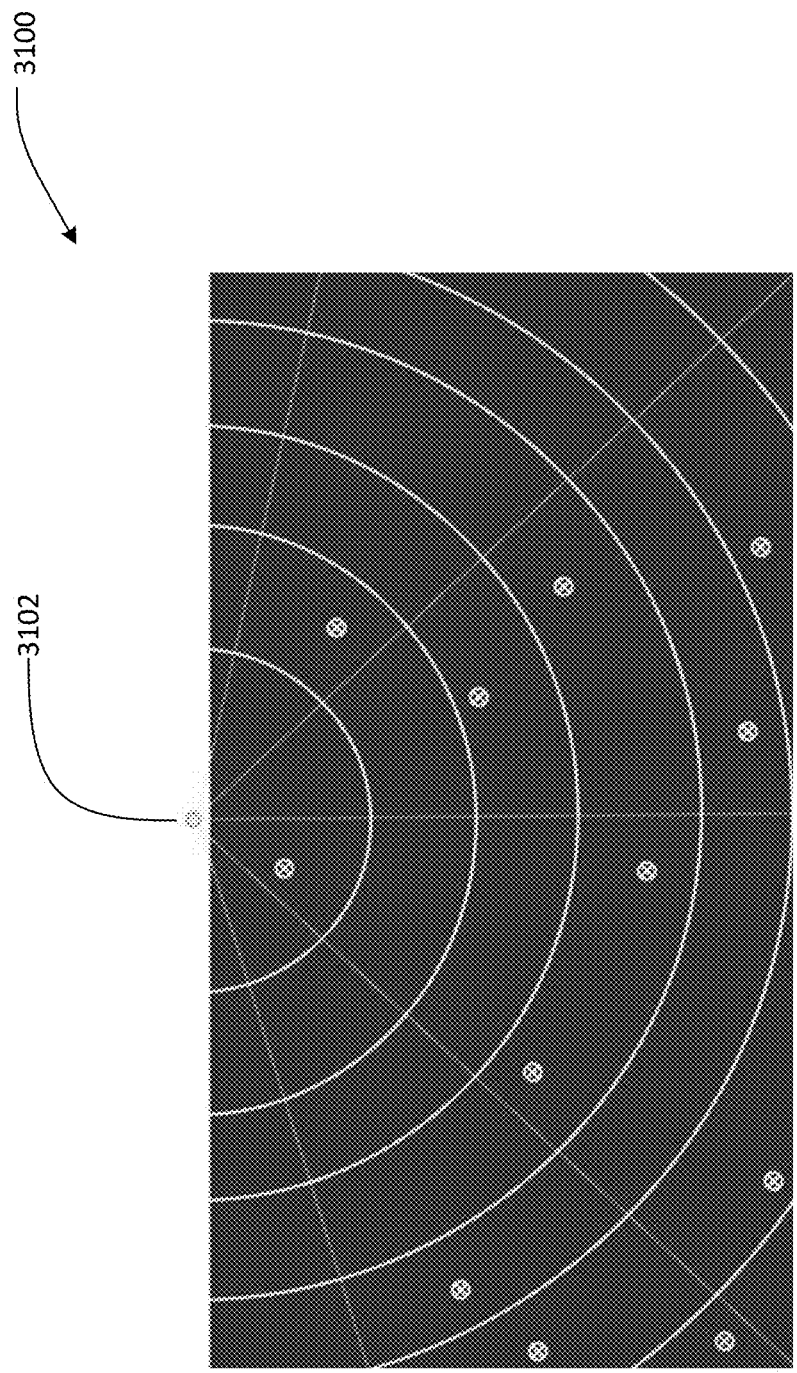
FIG. 31 illustrates an example grid used for gaze data collection according to aspects described herein.

FIG. 31 illustrates an example grid 3100 used for gaze data collection according to aspects described herein. Generally, an eye-tracker or sensor (e.g., camera) is located along a device's top edge. As a user's gaze reaches away from the sensor to the bottom edge of the device, occlusion may occur due to a user's closing eye lids. Such occlusion can be prevent using gaze correction as a pre-processing step over gaze data received via a sensor.

Further, as the angular distance from the sensor increases, a sensor's ability to track a user's gaze may diminish due to, for example, poor angular resolution. Using a polar coordinate system, with a sensor 3102 (e.g., camera) at its center, allows for a polar grid (e.g., grid 3100) to be created that controls data density. Data can be collected more densely as a user moves to the outer rings (e.g., moves away from the sensor that is collected gaze tracking data).

Figure 32:
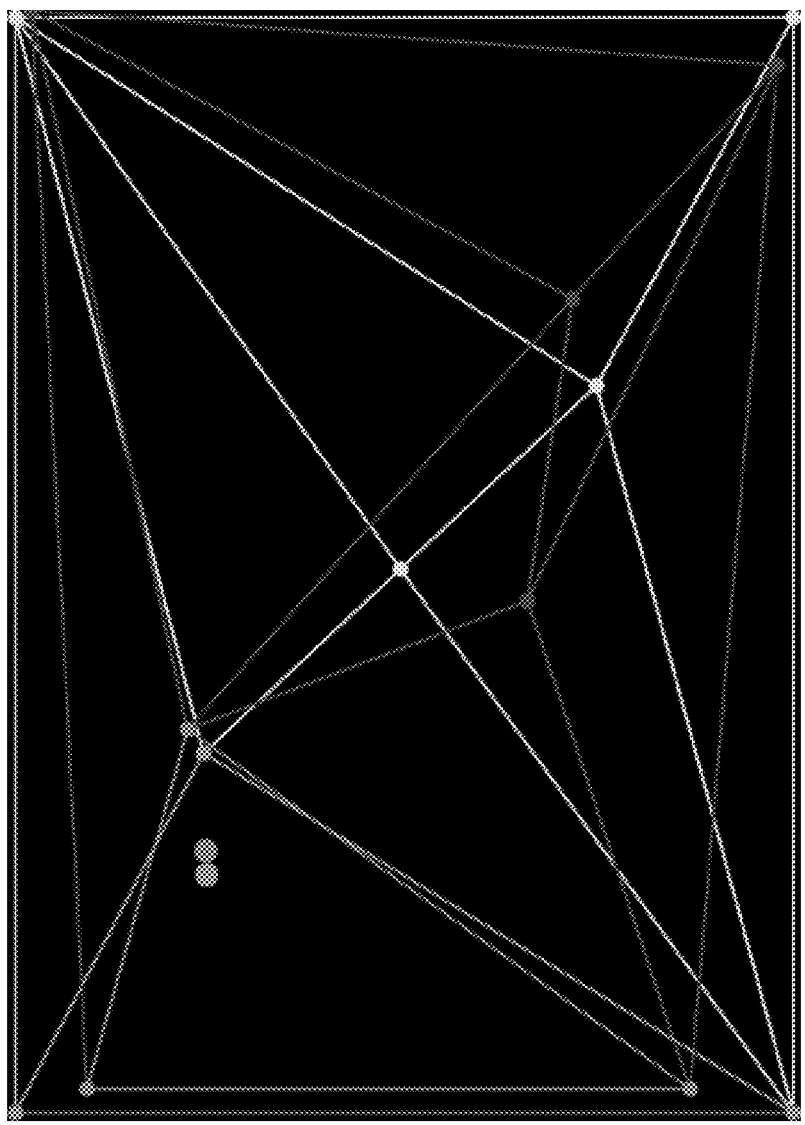
FIG. 32 illustrates an example of gaze calibration according to aspects described herein.

FIG. 32 illustrates an example of gaze calibration 3200 according to aspects described herein. Eye properties may vary across a plurality of users. For example, different users may have eyes with different kappa angles, prescriptions, or general eye anomalies. Therefore, to use methods and systems outlined herein throughout the disclosure, user specific calibrations may be made to personalize gaze tracking on a device (e.g., devices 103-108 discussed with respect to FIG. 1).

The gaze calibration example 3200 of FIG. 32 relies on Delaunay triangulation. Specifically, a set of predicted gaze points may be mapped against ground truth gaze points A Delaunay triangulation mesh may be constructed to map each triangle formed by the predicted gaze points to the corresponding triangles formed by the ground truth gaze points. Any difference between the predicted gaze points and the ground truth gaze points may be stored as error and used to calibrate gaze data that is received by a computing device according to any examples disclosed herein. Alternatively, conventional meshing methods may be recognized by those of ordinary skill in the art and substituted for Delaunay triangulation to be used for gaze calibration in accordance with examples disclosed herein.

Figure 33:
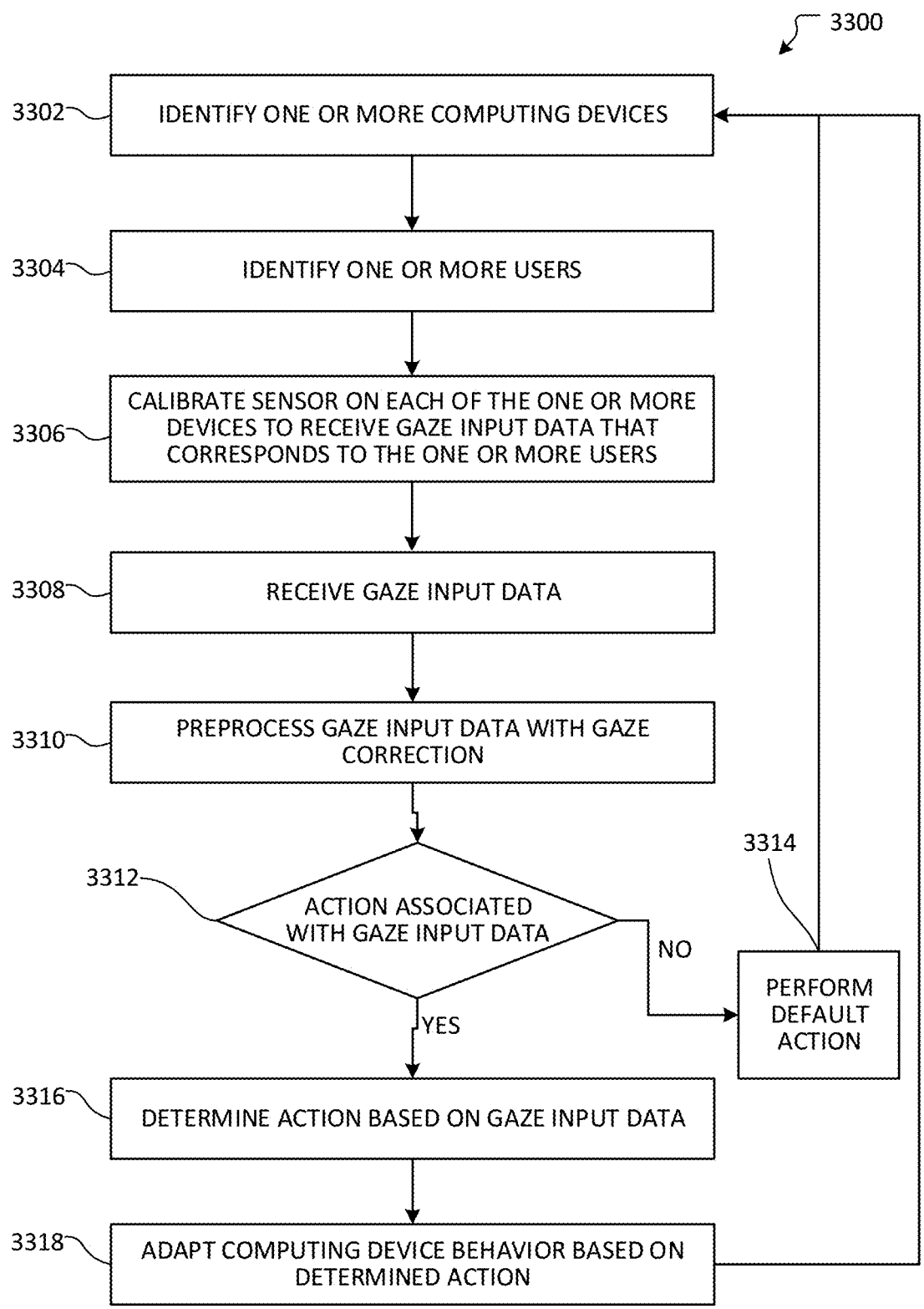
FIG. 33 illustrates an overview of an example method 3000 for processing gaze input data to perform an action to affect computing device behavior.

FIG. 33 illustrate an overview of an example method 3300 for processing gaze input data to perform an action to affect computing device behavior. In accordance with some examples, aspects of method 3300 are performed by a device, such as computing device 103, computing device 104, peripheral device 106, or peripheral device 108 discussed above with respect to FIG. 1.

Method 3300 begins at operation 3302, where one or more computing devices are identified. For example, a user may link one or more devices (e.g., devices 103-108) using any communication means discussed above, with respect to FIG. 1. The devices may be identified by a prior link association (e.g., indicated in a device profile or a shared profile). Alternatively, the one or more devices may be identified based upon user login information for the different devices (e.g., each device with the same user login may be linked). In still further aspects, the one or more devices may be identified based upon network connections (e.g., linking devices on the same network) or based upon device proximity. Device proximity may be determined based upon direct device communication (e.g., via RF or Bluetooth) or via determination of similar physical characteristics of device surroundings (e.g., based upon device camera feeds if the user has given the devices permission to use cameras for this purpose). In yet another example, a user may then manually select one or more devices to be identified by method 3300 to identify the devices at operation 3302. Additionally, or alternatively, a network may be configured to automatically identify one or more devices that are connected to the network. In yet another example, a network may be configured to detect computing devices within a specified geographic proximity.

At operation 3304, one or more users are identified. The one or more users may be identified by one or more computing devices (e.g., device 103-108). Specifically, the one or more computing devices may receive visual data from a sensor (e.g., a camera) to identify one or more users. The visual data may be processed, using mechanisms described herein, to perform facial recognition on the one or more users in instances where the one or more users have provided permission to do so. For example, the one or more computing devices may create a mesh over the face of each of the one or more users to identify facial characteristics, such as, for example nose location, mouth location, cheekbone location, hair location, eye location, and/or eyelid location.

Additionally, or alternatively, at operation 3304, the one or more users may be identified by engaging with a specific software (e.g., joining a call, joining a video call, joining a chat, opening an application, or the like). Further, some users may be identified by logging into one or more computing devices. For example, the user may be the owner of the computing device, and the computing device may be linked to the user (e.g., via a passcode, biometric entry, etc.). Therefore, when the computing device is logged into, the user is thereby identified. Similarly, a user may be identified by logging into a specific application (e.g., via a passcode, biometric entry, etc.). Therefore, when the specific application is logged into, the user is thereby identified. Additionally, or alternatively, at operation 3404, the one or more users may be identified using a radio frequency identification tag (RFID), an ID badge, a bar code, a QR code, or some other means of identification that is capable of identifying a user via some technological interface.

Additionally, or alternatively, at operation 3304, one or more users may be identified to be present within proximity of a computing device. In some examples, only specific elements (e.g., eyes, faces, bodies, hands, etc.) of the one or more users may be identified or recognized. In other examples, at least a portion of the one or more users may be identified or recognized. For example, systems disclosed herein may not have to identify the one or more users as a specific individual (e.g., an individual with a paired unique ID, for authentication or other purposes); rather systems disclosed herein may merely identify that one or more users are present within proximity of a computing device, such that the one or more users may be tracked and/or monitored by the computing device. Similarly, systems disclosed herein may not have to identify one or more features of interest on a user as specific features of interest (e.g., features of interest that have a paired unique ID, for authentication or other purposes); rather, systems disclosed herein may merely identify that one or more features of interest (e.g., eyes, faces, bodies, hands, etc.) are present within proximity of a computing device, such that the features of interest may be tracked and/or monitored by the computing device.

At operation 3306, a sensor (e.g., camera) is calibrated on each of the one or more devices (e.g., devices 103-108) to receive gaze input data that correspond to the one or more users. The sensors may be calibrated based on aspects disclosed herein with respect to FIG. 32. For example, a set of predicted gaze points may be mapped against ground truth gaze points. A Delaunay triangulation mesh may be constructed to map each triangle formed by the predicted gaze points to the corresponding triangles formed by the ground truth gaze points. Any difference between the predicted gaze points and the ground truth gaze points may be stored as error and used to calibrate gaze data that is received by a computing device. Alternatively, conventional meshing methods may be recognized by those of ordinary skill in the art and substituted for Delaunay triangulation to be used for gaze calibration in accordance with examples disclosed herein.

At operation 3308, gaze input data is received, from the one or more computing devices (e.g., computing devices 103-108) that corresponds to the one or more users. Once the one or more users are identified at 3304, the method 3300 may monitor the orientation of a user's eyes to determine their gaze, and thereby receive gaze input data. Such gaze input data can provide an indication to a multi-device gaze tracking system and/or a single-device gaze tracking system (such as any of those disclosed earlier herein) of where a user may be looking relative to a display screen (e.g., a display screen of any of computing devices 103-108).

Still referring to operation 3308, the one or more computing devices (e.g., computing devices 103-108) may receive gaze input data from a plurality of users (e.g., the computing devices may track the orientation of multiple users' eyes and receive gaze data therefrom). Specifically, the one or more computing devices may track at which device (e.g., computing devices 103-108) each of the users are looking, and even further, may determine at what each of the users are looking, on the devices (e.g., an application, or some other element being displayed on one or more of the computing devices, such as a passcode or login pattern). The gaze input data may be received in real-time (e.g., providing a continuous stream of feedback regarding at what the plurality of users are gazing). Alternatively, the gaze input data may be received periodically (e.g., at regular, or irregular, time intervals that may be specified by a user).

Still further, with reference to operation 3308, the gaze data can be stored (e.g., in gaze tracking data store 116, or another form of memory). In some examples, only the most recent gaze data is stored, such that as gaze data is received, older gaze data is overwritten (e.g., in memory) by new gaze data. Alternatively, in some examples, gaze data is stored from a specified duration of time (e.g., the last hour, the last day, the last week, the last month, the last year, or since gaze data first began being received). Generally, such an implementation allows for a history of gaze data from one or more users to be reviewed for further analysis (e.g., to infer or predict data that may be collected in the future).

At operation 3310, gaze input data may be preprocessed with gaze correction. As discussed with respect to FIG. 31, as a user's gaze moves away from the location of a sensor (e.g., camera) occlusion may occur due to, for example, closing eye lids. Accordingly, 3310 may determine when a users gaze is directed at a location that is a predetermined distance away from the sensor, such that an occlusion is gaze may be corrected.

Still referring to operation 3310, a radial grid may be used to control data density for data collection. Referring again FIG. 31, using a polar coordinate system, mechanisms disclosed herein may receive gaze input data based on a location on a polar coordinate system. Such an implementation allows for data to be collected more densely at locations that are relatively far away from a sensor. This may be beneficial to prevent poor angular resolution that may otherwise occur.

At determination 3312, it is determined whether there is an action associated with the gaze input data. For example, determination 3312 may comprise evaluating the received gaze input data to generate sets of user signals, which may be processed in view of an environmental context (e.g., applications currently being run on a device, or tasks currently being executed). Accordingly, the evaluation may identify an application, or a task, as a result of an association between the gaze input data and the environmental context.

In some examples, at determination 3312, it is determined, for each user, whether there is an action associated with the gaze input data, corresponding to that user. For example, determination 3312 may comprise evaluating the received gaze input data to generate one or more sets of user signals, wherein each of the user signals correspond to one of the plurality of users. The user signals may be processed in view of an environmental context (e.g., applications currently being run on a device, or tasks currently being executed). Accordingly, the evaluation may identify one or more actions as a result of an association between the gaze input data, for each user, as well as the environmental context. It should be recognized that there may be different actions identified for each user, based on differed gaze input data (e.g., different users looking at different computing devices). Alternatively, there may be the same actions identified for each user, based on the same gaze input data (e.g., different users looking at the same computing device).

If it is determined that there is not an application associated with the gaze input data, flow branches "NO" to operation 3314, where a default action is performed. For example, the gaze input data may have an associated predetermined action. In some other examples, the method 1300 may comprise determining whether the gaze input data has an associated default action, such that, in some instances, no action may be performed as a result of the received gaze input data. Method 3300 may terminate at operation 3314. Alternatively, method 3300 may return to operation 3302, from operation 3314, to create a continuous feedback loop of receiving gaze input data, and executing a command based on the gaze input data.

If however, it is determined that there is a gaze command associated with the received gaze input data, flow instead branches "YES" to operation 3316, where an action is determined based on the gaze input data. Examples of such actions may be found throughout the present disclosure.

Flow progresses to operation 3318, where the one or more computing devices are adapted to perform the determined action. In some examples, the one or more computing devices may be adapted to perform the determined action by the computing device at which method 3300 was performed. In another example, an indication of the determined action may be provided to another computing device. For example, aspects of method 3300 may be performed by a peripheral device, such that operation 3318 comprises providing an input to an associated computing device. As another example, operation 3318 may comprise using an application programming interface (API) call to perform the determined action (e.g., to transfer an application from a first computing device to a second computing device). Method 3300 may terminate at operation 3318. Alternatively, method 3300 may return to operation 3302, from operation 3318, to create a continuous feedback loop of receiving gaze input data and adapting one or more computing devices to perform an associated action.

FIG. 34-37 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 34:
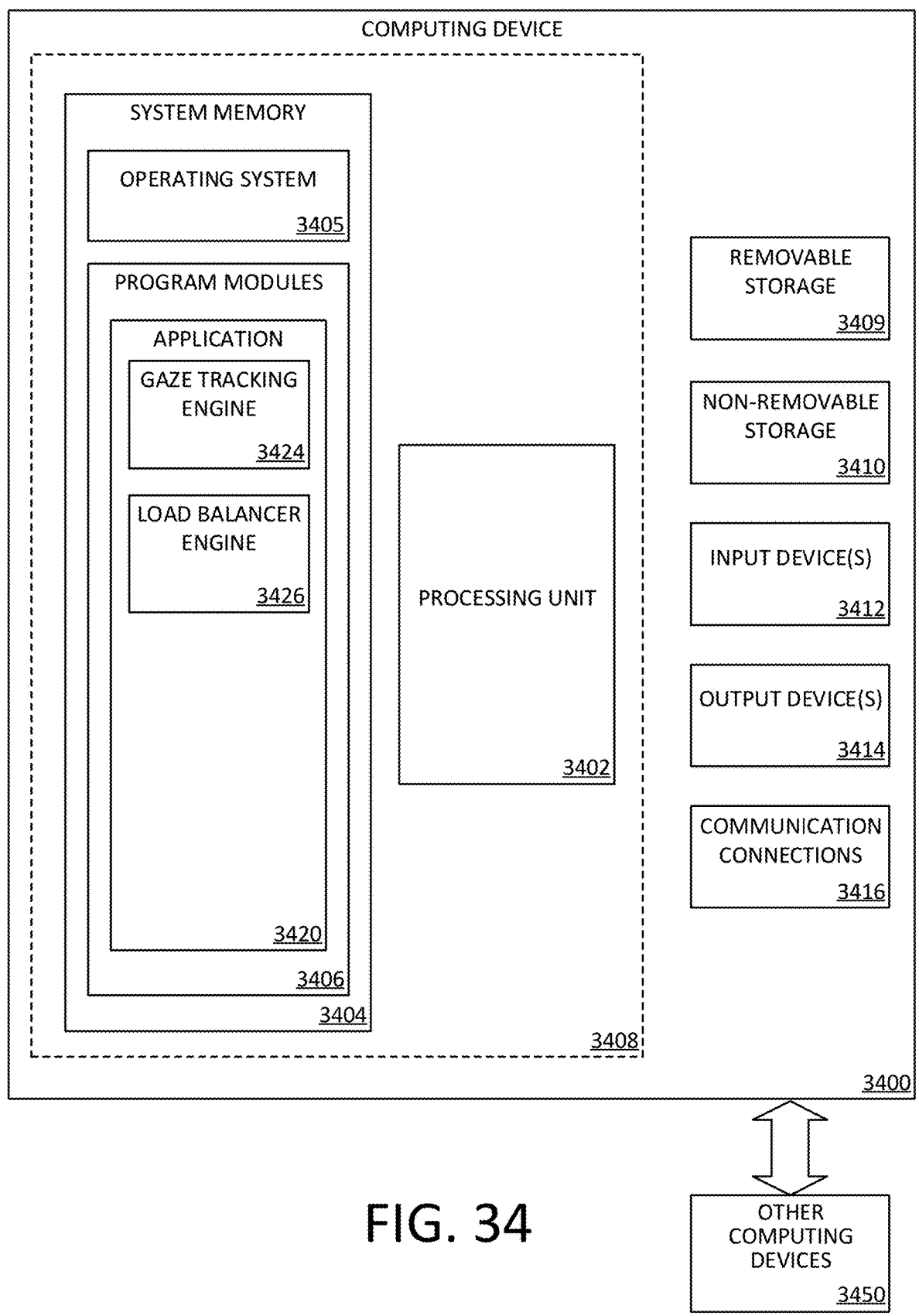
FIG. 34 is a block diagram illustrating physical components of a computing device with which aspects of the disclosure may be practiced.

FIG. 34 is a block diagram illustrating physical components (e.g., hardware) of a computing device 3400 with which aspects of the disclosure may be practiced. The computing device components described below may be suitable for the computing devices described above, including devices 102, 103, 104, 106, and/or 108 in FIG. 1. In a basic configuration, the computing device 3400 may include at least one processing unit 3402 and a system memory 3404. Depending on the configuration and type of computing device, the system memory 3404 may comprise, but is not limited to, volatile storage (e.g., random access memory), non-volatile storage (e.g., read-only memory), flash memory, or any combination of such memories.

The system memory 3404 may include an operating system 3405 and one or more program modules 3406 suitable for running software application 3420, such as one or more components supported by the systems described herein. As examples, system memory 3404 may store gaze tracking component 3424 and load balancer component 3426. The operating system 3405, for example, may be suitable for controlling the operation of the computing device 3400.

Furthermore, embodiments of the disclosure may be practiced in conjunction with a graphics library, other operating systems, or any other application program and is not limited to any particular application or system. This basic configuration is illustrated in FIG. 34 by those components within a dashed line 3408. The computing device 3400 may have additional features or functionality. For example, the computing device 3400 may also include additional data storage devices (removable and/or non-removable) such as, for example, magnetic disks, optical disks, or tape. Such additional storage is illustrated in FIG. 34 by a removable storage device 3409 and a non-removable storage device 3410.

As stated above, a number of program modules and data files may be stored in the system memory 3404. While executing on the processing unit 3402, the program modules 3406 (e.g., application 3420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 34 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 3400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 3400 may also have one or more input device(s) 3412 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 3400 may include one or more communication connections 3416 allowing communications with other computing devices 650. Examples of suitable communication connections 3416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 3404, the removable storage device 3409, and the non-removable storage device 3410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 3400. Any such computer storage media may be part of the computing device 3400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 35A:
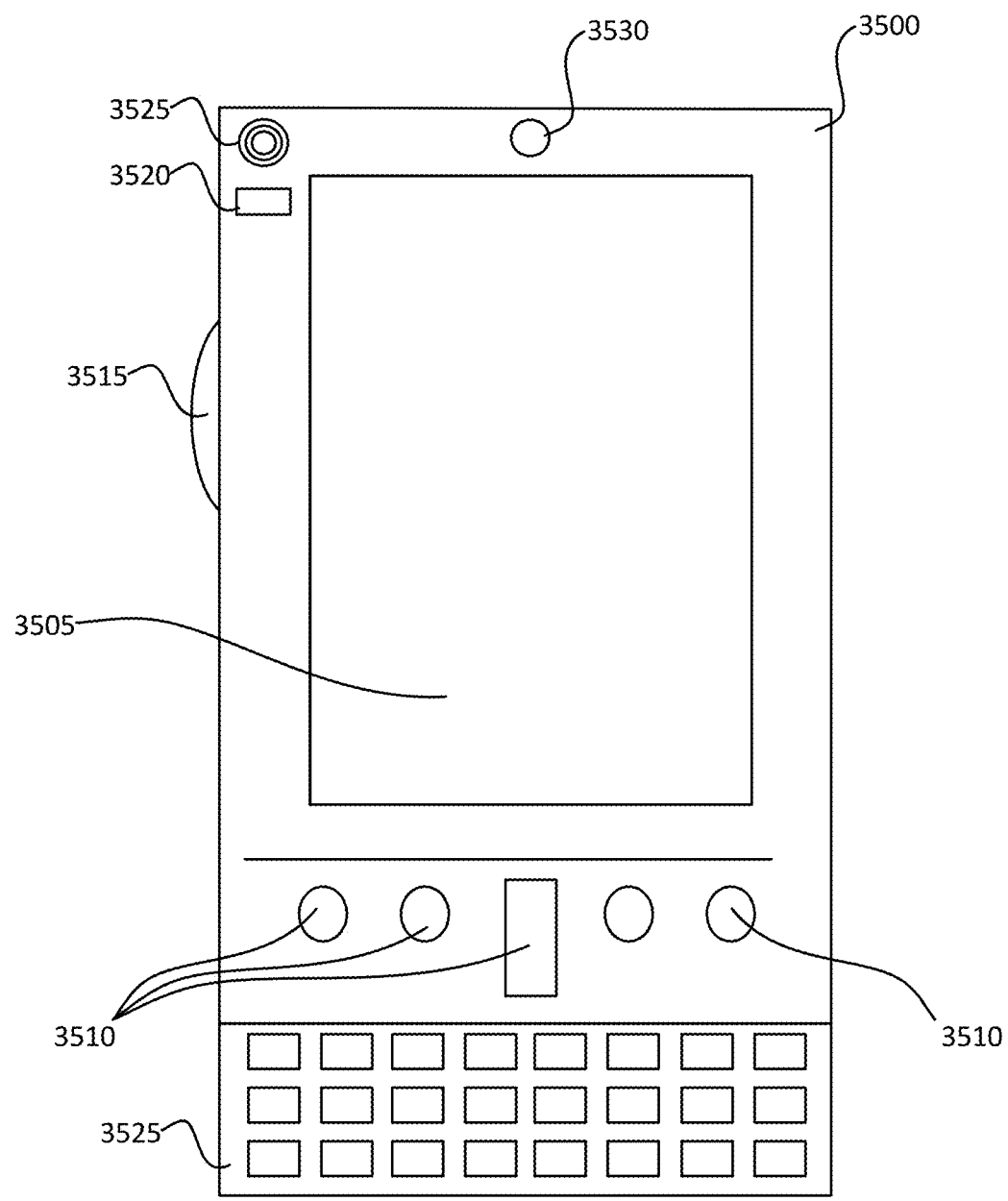
FIG. 35A illustrates a mobile computing device with which embodiments of the disclosure may be practiced.
Figure 35B:
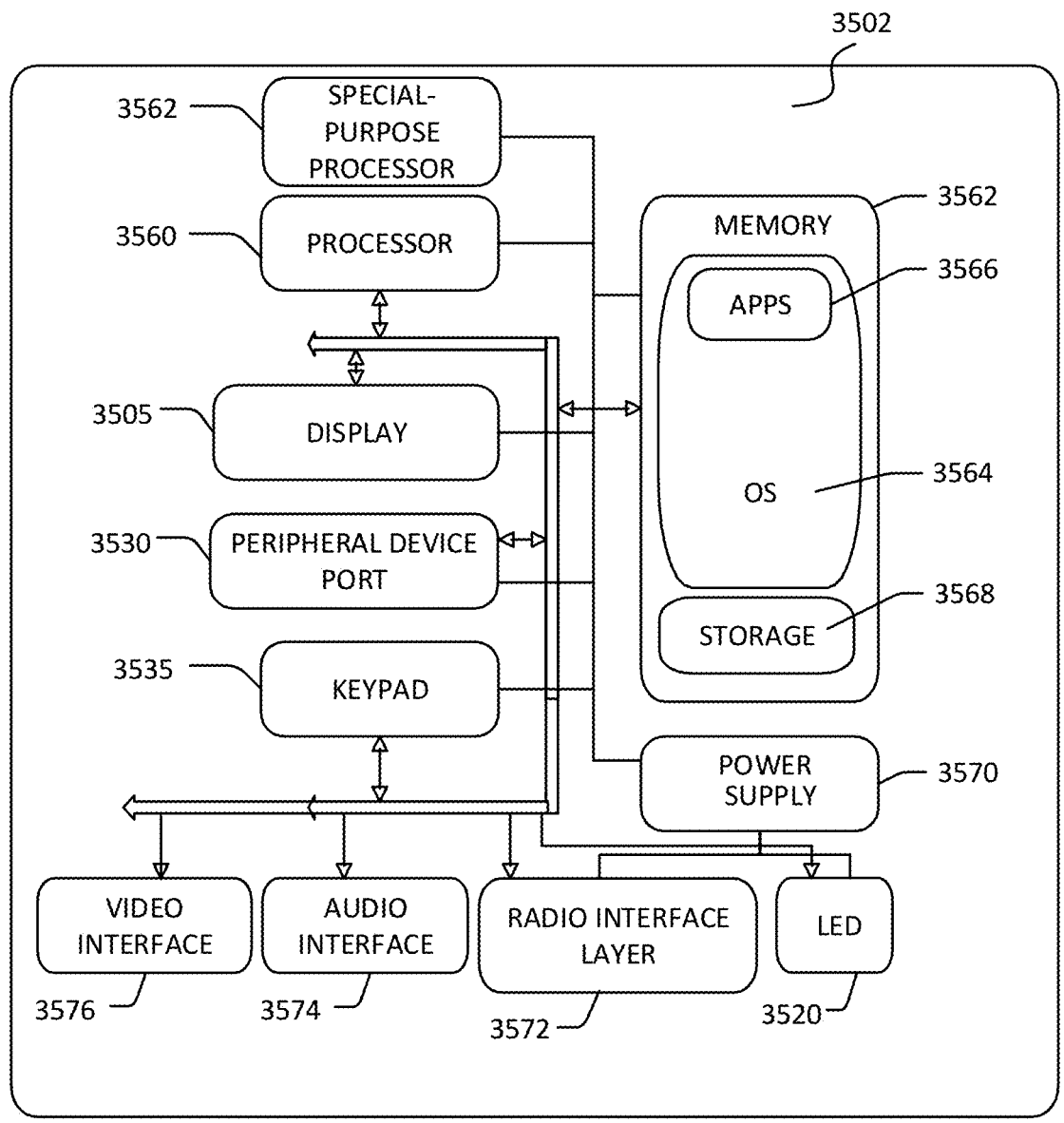
FIG. 35B is a block diagram illustrate the architecture of one aspect of a mobile computing device.

FIGS. 35A and 35B illustrate a mobile computing device 3500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 35A, one aspect of a mobile computing device 3500 for implementing the aspects is illustrated. In a basic configuration, the mobile computing device 3500 is a handheld computer having both input elements and output elements. The mobile computing device 3500 typically includes a display 3505 and one or more input buttons 3510 that allow the user to enter information into the mobile computing device 3500. The display 3505 of the mobile computing device 3500 may also function as an input device (e.g., a touch screen display).

If included, an optional side input element 3515 allows further user input. The side input element 3515 may be a rotary switch, a button, or any other type of manual input element. In alternative aspects, mobile computing device 3500 may incorporate more or less input elements. For example, the display 3505 may not be a touch screen in some embodiments.

In yet another alternative embodiment, the mobile computing device 3500 is a portable phone system, such as a cellular phone. The mobile computing device 3500 may also include an optional keypad 3535. Optional keypad 3535 may be a physical keypad or a "soft" keypad generated on the touch screen display.

In various embodiments, the output elements include the display 3505 for showing a graphical user interface (GUI), a visual indicator 3520 (e.g., a light emitting diode), and/or an audio transducer 3525 (e.g., a speaker). In some aspects, the mobile computing device 3500 incorporates a vibration transducer for providing the user with tactile feedback. In yet another aspect, the mobile computing device 3500 incorporates input and/or output ports, such as an audio input (e.g., a microphone jack), an audio output (e.g., a headphone jack), and a video output (e.g., a HDMI port) for sending signals to or receiving signals from an external device.

FIG. 35B is a block diagram illustrating the architecture of one aspect of a mobile computing device. That is, the mobile computing device 3500 can incorporate a system (e.g., an architecture) 3502 to implement some aspects. In one embodiment, the system 3502 is implemented as a "smart phone" capable of running one or more applications (e.g., browser, e-mail, calendaring, contact managers, messaging clients, games, and media clients/players). In some aspects, the system 3502 is integrated as a computing device, such as an integrated personal digital assistant (PDA) and wireless phone.

One or more application programs 3566 may be loaded into the memory 3562 and run on or in association with the operating system 3564. Examples of the application programs include phone dialer programs, e-mail programs, personal information management (PIM) programs, word processing programs, spreadsheet programs, Internet browser programs, messaging programs, and so forth. The system 3502 also includes a non-volatile storage area 3568 within the memory 3562. The non-volatile storage area 3568 may be used to store persistent information that should not be lost if the system 3502 is powered down. The application programs 3566 may use and store information in the non-volatile storage area 3568, such as e-mail or other messages used by an e-mail application, and the like. A synchronization application (not shown) also resides on the system 3502 and is programmed to interact with a corresponding synchronization application resident on a host computer to keep the information stored in the non-volatile storage area 3568 synchronized with corresponding information stored at the host computer. As should be appreciated, other applications may be loaded into the memory 3562 and run on the mobile computing device 3500 described herein (e.g., a signal identification component, a gaze tracker component, a shared computing component, etc.).

The system 3502 has a power supply 3570, which may be implemented as one or more batteries. The power supply 3570 might further include an external power source, such as an AC adapter or a powered docking cradle that supplements or recharges the batteries.

The system 3502 may also include a radio interface layer 3572 that performs the function of transmitting and receiving radio frequency communications. The radio interface layer 3572 facilitates wireless connectivity between the system 3502 and the "outside world," via a communications carrier or service provider. Transmissions to and from the radio interface layer 3572 are conducted under control of the operating system 3564. In other words, communications received by the radio interface layer 3572 may be disseminated to the application programs 3566 via the operating system 3564, and vice versa.

The visual indicator 3520 may be used to provide visual notifications, and/or an audio interface 3574 may be used for producing audible notifications via the audio transducer 3525. In the illustrated embodiment, the visual indicator 3520 is a light emitting diode (LED) and the audio transducer 3525 is a speaker. These devices may be directly coupled to the power supply 3570 so that when activated, they remain on for a duration dictated by the notification mechanism even though the processor 3560 and other components might shut down for conserving battery power. The LED may be programmed to remain on indefinitely until the user takes action to indicate the powered-on status of the device. The audio interface 3574 is used to provide audible signals to and receive audible signals from the user. For example, in addition to being coupled to the audio transducer 3525, the audio interface 3574 may also be coupled to a microphone to receive audible input, such as to facilitate a telephone conversation. In accordance with embodiments of the present disclosure, the microphone may also serve as an audio sensor to facilitate control of notifications, as will be described below. The system 3502 may further include a video interface 3576 that enables an operation of an on-board camera 3530 to record still images, video stream, and the like.

A mobile computing device 3500 implementing the system 3502 may have additional features or functionality. For example, the mobile computing device 3500 may also include additional data storage devices (removable and/or non-removable) such as, magnetic disks, optical disks, or tape. Such additional storage is illustrated in FIG. 35B by the non-volatile storage area 3568.

Data/information generated or captured by the mobile computing device 3500 and stored via the system 3502 may be stored locally on the mobile computing device 3500, as described above, or the data may be stored on any number of storage media that may be accessed by the device via the radio interface layer 3572 or via a wired connection between the mobile computing device 3500 and a separate computing device associated with the mobile computing device 3500, for example, a server computer in a distributed computing network, such as the Internet. As should be appreciated such data/information may be accessed via the mobile computing device 3500 via the radio interface layer 3572 or via a distributed computing network. Similarly, such data/information may be readily transferred between computing devices for storage and use according to well-known data/information transfer and storage means, including electronic mail and collaborative data/information sharing systems.

Figure 36:
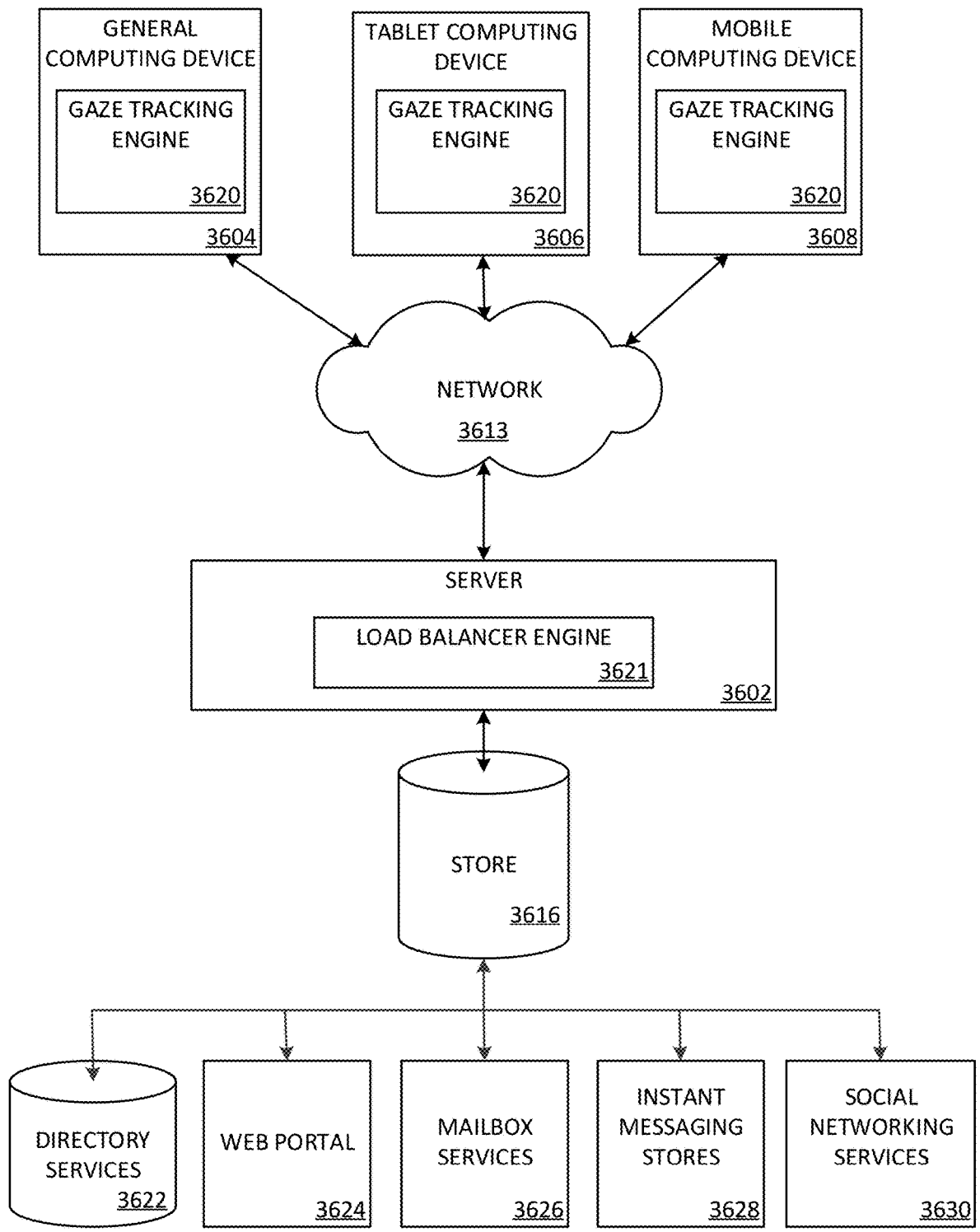
FIG. 36 illustrates one aspect of the architecture of a system for processing data received at a computing system from a remote source.

FIG. 36 illustrates one aspect of the architecture of a system for processing data received at a computing system from a remote source, such as a personal computer 3604, tablet computing device 3606, or mobile computing device 3608, as described above. Content displayed at server device 3602 may be stored in different communication channels or other storage types. For example, various documents may be stored using a directory service 3622, a web portal 3624, a mailbox service 3626, an instant messaging store 3628, or a social networking site 3630.

A gaze tracking component or engine 3620 may be employed by a client that communicates with server device 3602, and/or load balancer component or engine 3621 may be employed by server device 3602. The server device 3602 may provide data to and from a client computing device such as a personal computer 3604, a tablet computing device 3606 and/or a mobile computing device 3608 (e.g., a smart phone) through a network 3615. By way of example, the computer system described above may be embodied in a personal computer 3604, a tablet computing device 3606 and/or a mobile computing device 3608 (e.g., a smart phone). Any of these embodiments of the computing devices may obtain content from the store 3616, in addition to receiving graphical data useable to be either pre-processed at a graphic-originating system, or post-processed at a receiving computing system.

Figure 37:
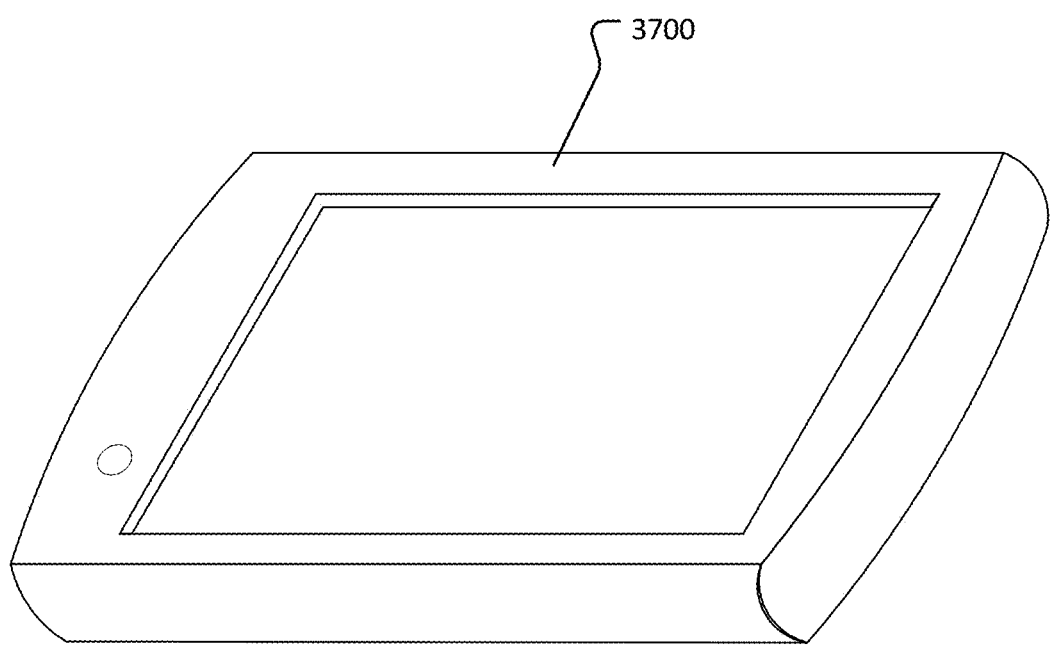
FIG. 37 illustrates an exemplary tablet computing device that may execute one or more aspects disclosed herein.

FIG. 37 illustrates an exemplary tablet computing device 3700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   identifying a plurality of computing devices associated with a shared computing engine, wherein the shared computing engine is configured to receive state information from each computing device of the plurality of computing devices;
   displaying one or more elements on at least one of the plurality of computing devices;
   identifying one or more users;
   receiving gaze input data and load data, from two or more computing devices of the plurality of computing devices, the gaze input data being accessible via both of the two or more computing devices, via the shared computing engine;

identifying at which of the one or more elements being displayed the one or more users are paying attention, based on the gaze input data; and performing load balancing between the plurality of devices, via the shared computing engine, wherein the load balancing comprises assigning one or more tasks from a first computing device of the plurality of computing devices to a second computing device of the plurality of computing devices based upon the which of the one or more elements the one or more users are paying attention, and updating the state information received by the shared computing engine, based on the assigning one or more tasks from the first computing device to the second computing device.

2. The system of claim 1, wherein the load data is processed to determine an efficiency of each computing device.

3. The system of claim 2, wherein the efficiency of each computing device is calculated as a ratio between processor usage data and processor capability data.

4. The system of claim 2, wherein gaze data is processed to determine which of the one or more computing devices is a focal device.

5. The system of claim 4, wherein the operation of assigning occurs if the focal device is above an efficiency threshold.

6. The system of claim 1, wherein the one or more users is a plurality of users.

7. The system of claim 1, wherein the operation of assigning is based on the gaze input data corresponding to the one or more users.

8. The system of claim 1, wherein the gaze input data is received by a sensor on each of the plurality of computing devices, and wherein the sensor is calibrated using a mesh, the mesh comprising predicted gaze points, and ground truth gaze points.

9. A system comprising:
at least one processor; and
memory storing instructions that, when executed by the at least one processor, causes the system to perform a set of operations, the set of operations comprising:
identifying two or more computing devices associated with a shared computing engine, wherein the shared computing engine is configured to receive state information from each computing device of the two or more computing devices;
identifying one or more users;
receiving gaze input data, corresponding to the one or more users, from a first computing device of the two or more computing devices, the gaze input data being accessible via a second computing device of the two or more computing devices, via the shared computing engine;
comparing the gaze input data received at the first computing device to locking data;
determining, based on the comparison, to unlock the second computing device of the two or more computing devices;
updating the state information received by the shared computing engine, based on the determination to unlock the second computing device; and
adapting the second computing device to be unlocked, based on the updated state information.

10. The system of claim 9, wherein the gaze input data comprises a pattern, wherein the locking data comprises a pattern, and wherein the comparing comprises authenticating the gaze input data pattern against the locking data pattern.

11. The method of claim 10, wherein the gaze input data is received by a sensor on each of the at least one of the two or more computing devices, and wherein the sensor is calibrated using a mesh, the mesh comprising predicted gaze points, and ground truth gaze points.

12. The system of claim 9, wherein the one or more users are a plurality of users.

13. The system of claim 12, wherein the gaze input data corresponding to each of the plurality of users is different between each of the plurality of users.

14. The system of claim 9, wherein:
the operation of receiving, further comprises receiving gesture input data corresponding to the one or more users, from the one or more computing devices, and
the operation of determining, further comprises determining, based on the gaze input data and the gesture input data, to unlock the particular computing device.

15. The system of claim 9, wherein:
the operation of receiving, further comprises receiving context data from the one or more computing devices, and
the operation of determining, further comprises determining, based on the gaze input data and the context input data, to unlock the particular computing device.

16. The method of claim 9, wherein the particular computing device is different than the at least one of the two or more computing devices.

17. A method for processing gaze input data to control a computing device, the method comprising:
identifying two or more computing devices associated with a shared computing engine, wherein the shared computing engine is configured to receive state information from each computing device of the two or more computing devices;
identifying a plurality of users;
displaying one or more elements on the two or more computing devices, including displaying a first element on a first computing device and a second element on a second computing device;
receiving gaze input data, corresponding to each of the plurality of users, from the two or more computing devices, wherein the gaze input data corresponding to each of the plurality of users is different between each of the plurality of users;
identifying metadata corresponding to at which of the one or more elements being displayed each of the plurality of users are paying attention, based on the gaze input data;
aggregating the metadata associated with each of the plurality of users, from the gaze input data received from the two or more computing devices; and
adapting at least one of the first computing device or the second computing device to alter their display, based on the aggregated metadata.

18. The method of claim 17, wherein the metadata that is identified corresponds to which of the one or more elements is paid attention to first by each of the plurality of users, and wherein the adapting at least one of the first computing device or the second computing device is based on which of the one or more elements is paid attention to first by a majority of the plurality of users.

19. The method of claim 17, wherein the metadata that is identified corresponds to which of the one or more elements is paid attention to the most by each of the plurality of users, and wherein the adapting the at least one of the first computing device or the second computing device is based on which of the one or more elements is paid attention to most by the majority of the plurality of users.

20. The method of claim 17, wherein the metadata that is identified corresponds to a sequence in which the one or more elements are viewed by each of the plurality of users, and wherein the adapting the at least one of the first computing device or the second computing device is based on a most common sequence in which the one or more elements are viewed by the plurality of users.

* * * * *